US008877954B2

(12) United States Patent
Giesenberg et al.

(10) Patent No.: US 8,877,954 B2
(45) Date of Patent: Nov. 4, 2014

(54) FUNCTIONALIZED NANOPARTICLES

(71) Applicant: BASF SE, Ludwigshafen (DE)

(72) Inventors: Thomas Giesenberg, Oberwil (CH);
Andreas Muhlebach, Frick (CH); Tunja
Jung, Rheinfelden-Herten (DE);
Francois Rime, Delemont (CH);
Laurent Michau, Pfetterhouse (FR);
Martin Muller, Lorrach (DE); Didier
Bauer, Kembs (FR)

(73) Assignee: BASF SE, Ludwigshafen (DE)

(*) Notice: Subject to any disclaimer, the term of this patent is extended or adjusted under 35 U.S.C. 154(b) by 0 days.

(21) Appl. No.: 13/930,848

(22) Filed: Jun. 28, 2013

(65) Prior Publication Data
US 2013/0296453 A1 Nov. 7, 2013

Related U.S. Application Data

(63) Continuation of application No. 11/665,627, filed as application No. PCT/EP2005/055287 on Oct. 17, 2005, now abandoned.

(30) Foreign Application Priority Data

Oct. 25, 2004 (EP) ..................................... 04105278

(51) Int. Cl.
C09D 7/12 (2006.01)
C09C 1/40 (2006.01)
C09C 1/30 (2006.01)
C08K 9/06 (2006.01)

(52) U.S. Cl.
CPC ........... *C09D 7/1233* (2013.01); C01P 2002/88 (2013.01); C01P 2004/64 (2013.01); *C09D 7/1241* (2013.01); C08K 9/06 (2013.01); *C09C 1/407* (2013.01); *C09C 1/40* (2013.01); *C09C 1/3081* (2013.01)
USPC ........... 556/413; 556/418; 556/419; 556/423; 556/427; 522/34; 428/402; 524/91; 524/99; 524/188; 544/216; 546/14; 548/110

(58) Field of Classification Search
CPC .................................................... C07F 7/1892
USPC ........................................................ 556/427
See application file for complete search history.

(56) References Cited

U.S. PATENT DOCUMENTS

| 4,122,233 | A | * | 10/1978 | Proskow ...................... 428/412 |
| 4,935,063 | A | | 6/1990 | Costanzi et al. |
| 5,258,024 | A | | 11/1993 | Chavel et al. |
| 5,374,138 | A | * | 12/1994 | Byles ........................... 405/38 |
| 6,015,843 | A | | 1/2000 | Van Vlasselaer et al. |
| 6,160,067 | A | | 12/2000 | Eriyama et al. |
| 6,586,483 | B2 | * | 7/2003 | Kolb et al. ....................... 521/91 |
| 2002/0094439 | A1 | | 7/2002 | Edelmann et al. |
| 2003/0194715 | A1 | | 10/2003 | Li et al. |
| 2004/0071998 | A1 | * | 4/2004 | Higuchi et al. ............... 428/504 |
| 2004/0204521 | A1 | | 10/2004 | Camenzind et al. |
| 2005/0059766 | A1 | | 3/2005 | Jones et al. |

FOREIGN PATENT DOCUMENTS

| DE | 3634949 A1 | 4/1990 |
| EP | 1195417 A2 | 4/2002 |
| GB | 2177093 A | 1/1987 |
| JP | 60042437 A | 3/1985 |
| JP | 60240769 A | 11/1985 |
| JP | 61-261365 A | 11/1986 |
| JP | 05-194932 | 8/1993 |
| JP | 6100313 A | 4/1994 |
| JP | 8012903 A | 1/1996 |
| JP | 8319400 A | 12/1996 |
| JP | 9151274 A | 6/1997 |
| JP | H01-103635 | 4/1998 |
| JP | 2002-509070 A | 3/2002 |
| JP | 2002-235019 A | 8/2002 |
| JP | 2002363436 A | 12/2002 |
| WO | 9936359 A1 | 7/1999 |
| WO | WO-03002652 A1 | 1/2003 |
| WO | WO-03087236 A1 | 10/2003 |

OTHER PUBLICATIONS

Office Action dated Jan. 15, 2013, issued in JP Application No. 2007-538364 (English Translation).
European Supplemental Search Report and Search Opinion dated Oct. 7, 2011, in related application EP 08168635.4.
Rong et al., "Graft polymerization of vinyl monomers onto nanosized alumina particles," European Polymer Journal 38 (2002), pp. 1573-1582.
Zhang et al, "Nitric Oxide-Releasing Fumed Silica Particles: Synthesis, Characterization, and Biomedial Application," J.Am.Chem. Soc., 2003, No. 125, pp. 5015-5024.

* cited by examiner

*Primary Examiner* — Rosalynd Keys
(74) *Attorney, Agent, or Firm* — Drinker Biddle & Reath

(57) ABSTRACT

The present invention discloses functionalized nanoparticles comprising on the surface a covalently bound radical of the formula (I) wherein the nanoparticles are $SiO_2$, $Al_2O_3$ or mixed $SiO_2$ and $Al_2O_3$ nanoparticles, and wherein the general symbols are as defined in claim 1. These functionalized nanoparticles are for example useful as stabilizers and/or compatibilizers in organic materials, or as photoinitiators in pre-polymeric or pre-crosslinking formulations, or as reinforcer of coatings and improver of scratch resistance in coating compositions for surfaces.

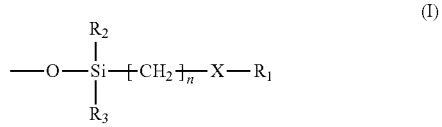

12 Claims, No Drawings

FUNCTIONALIZED NANOPARTICLES

CROSS-REFERENCE TO RELATED PATENT APPLICATION

This application is a continuation of U.S. application Ser. No. 11/665,627, filed Apr. 17, 2007, which a National Stage of PCT/EP/0555287, filed on Oct. 17, 2005, which claims benefit of European Application No, 04105278.8, filed Oct. 25, 2004, the disclosures of which are incorporated herein in their entirety by reference.

The present invention relates novel functionalized nanoparticles, to compositions comprising an organic material, preferably a synthetic polymer, and to the novel functionalized nanoparticles, as well as to the use thereof as stabilizers and/or flame-retarders and/or compatibilizers for organic materials which are subject to oxidative, thermal or light-induced degradation, in particular synthetic nanocomposite polymers or coatings; or as photoinitiators for the in-situ polymerization or hardening of pre-polymeric nanocomposites to nanocomposite materials.

The use of fillers in polymers has the advantage that it is possible to bring about improvement in, for example, the mechanical properties, especially the density, hardness, rigidity or impact strength of the polymer.

Using extremely small filler particles (<400 nm), so-called nano-scaled fillers, mechanical properties, long term stability or flame retardant property of the polymers can be improved at a much lower concentration of 5 to 10% by weight compared to 20 to 50% by weight with the micro-scaled normal filler particles. Polymers containing nano-scaled fillers show improved surface qualities like gloss, lower tool wear at processing and better conditions for recycling. Coatings and films comprising nano-scaled fillers show improved stability, flame resistance, gas barrier properties and scratch resistance.

Nano-scaled fillers possess an extremely large surface with high surface energy. The reduction of the surface energy and the compatibilization of the nano-scaled fillers with a polymeric substrate is therefore even more important than with a common micro-scaled filler in order to avoid aggregation and to reach an excellent dispersion of the nano-scaled filler in the polymer. The nano-scaled fillers like the phyllosilicates are made organophilic by ion exchange, for example with alkylammonium salts. Such nano-scaled organophilic phyllosilicates are better swellable and easier to disperse (exfoliate) into a polymer matrix [for example Nanomer® from Nanocor or Closite® from Southern Clay Products].

WO-A-03/002652 discloses the preparation of additive functionalized organophilic nano-scaled fillers.

It has now been found that a selected group of novel functionalized nanoparticles are especially useful as stabilizers and/or flame-retarders and/or compatibilizers for organic materials which are subject to oxidative, thermal or light-induced degradation, in particular synthetic nanocomposite polymers or coatings; or as photoinitiators for the in-situ polymerization or hardening of pre-polymeric nanocomposites to nanocomposite materials.

This invention therefore relates to a functionalized nanoparticle comprising on the surface a covalently bound radical of the formula I

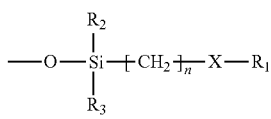
(I)

wherein
the nanoparticle is a $SiO_2$, $Al_2O_3$ or mixed $SiO_2$ and $Al_2O_3$ nanoparticle,
X is oxygen, sulfur or

$R_1$ is $C_1$-$C_{25}$alkyl, $C_3$-$C_{25}$alkyl which is interrupted by oxygen, sulfur or

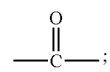

hydroxyl-substituted $C_2$-$C_{24}$alkyl which is interrupted by oxygen, sulfur or

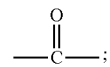

$C_2$-$C_{24}$alkenyl, $C_5$-$C_{12}$cycloalkyl, $C_5$-$C_{12}$cycloalkenyl, a polymerizable group, a polymer, or an additive selected from the group consisting of radical scavengers, hydroperoxide decomposers, UV-absorbers, light stabilizers, flame retardants and photoinitiators;
$R_2$ and $R_3$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl, —$OR_5$,

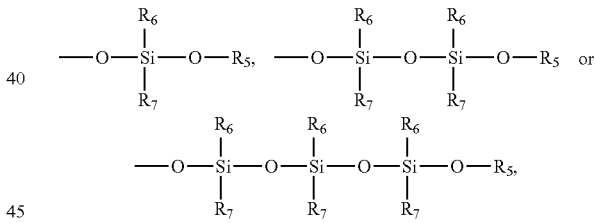

$R_4$ is hydrogen, $C_1$-$C_{25}$alkyl or $C_3$-$C_{25}$alkyl which is interrupted by oxygen or sulfur;
$R_5$ is hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl,

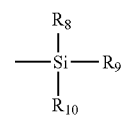

or the nanoparticle surface,
$R_6$ and $R_7$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl or —$OR_5$,
$R_8$, $R_9$ and $R_{10}$ independently of each other are hydrogen, $C_1$-$C_{25}$alkyl, $C_3$-$C_{25}$alkyl which is interrupted by oxygen or sulfur; $C_2$-$C_{24}$alkenyl, phenyl or $C_7$-$C_9$phenylalkyl, and
n is 1, 2, 3, 4, 5, 6, 7 or 8.

Highly preferred nanoparticles comprising a radical of formula (I) are those of formula

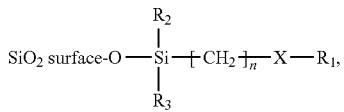 (I')

wherein $R_1$, $R_2$, $R_3$, X and n are as defined under formula (I) and wherein $R_5$ as nanoparticle surface is —$SiO_2$ surface.

Of interest is also a functionalized nanoparticle comprising on the surface a radical of the formula I and comprising on the surface additionally a covalently bound radical of the formula II

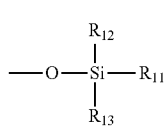 (II)

wherein
the nanoparticle is a $SiO_2$, $Al_2O_3$ or mixed $SiO_2$ and $Al_2O_3$ nanoparticle,
$R_{11}$ is $C_1$-$C_{25}$alkyl, $C_3$-$C_{25}$alkyl which is interrupted by oxygen, sulfur

or amino-, mercapto- or hydroxyl substituted $C_2$-$C_{24}$alkyl; amino-, mercapto- or hydroxyl substituted $C_2$-$C_{24}$alkyl which is interrupted by oxygen, sulfur or

$C_2$-$C_{24}$alkenyl, $C_5$-$C_{12}$cycloalkyl, $C_5$-$C_{12}$cycloalkenyl, a polymerizable group or a polymer,
$R_{12}$ and $R_{13}$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl, —$OR_{15}$,

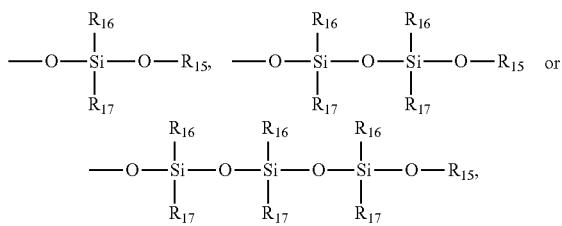

$R_{14}$ is hydrogen, $C_1$-$C_{25}$alkyl or $C_3$-$C_{25}$alkyl which is interrupted by oxygen or sulfur;
$R_{15}$ is hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl,

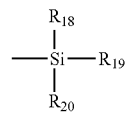

or the nanoparticle surface,
$R_{15}$ and $R_{17}$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl or $OR_{15}$,
$R_{18}$, $R_{19}$ and $R_{20}$ independently of each other are hydrogen, $C_1$-$C_{25}$alkyl, $C_3$-$C_{25}$alkyl which is interrupted by oxygen or sulfur; $C_2$-$C_{24}$alkenyl, phenyl or $C_7$-$C_9$phenylalkyl.

Highly preferred nanoparticles comprising a radical of formula (II) are those of formula

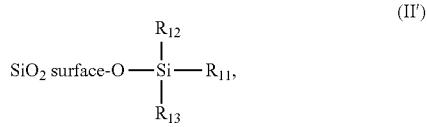 (II')

wherein $R_{11}$, $R_{12}$ and $R_{13}$ are as defined under formula (II) and wherein $R_{15}$ as nanoparticle surface is —$SiO_2$ surface.

Alkyl having up to 25 carbon atoms is a branched or unbranched radical, for example methyl, ethyl, propyl, isopropyl, n-butyl, sec-butyl, isobutyl, tert-butyl, 2-ethylbutyl, n-pentyl, isopentyl, 1-methylpentyl, 1,3-dimethylbutyl, n-hexyl, 1-methylhexyl, n-heptyl, isoheptyl, 1,1,3,3-tetramethylbutyl, 1-methyl heptyl, 3-methyl heptyl, n-octyl, 2-ethyl hexyl, 1,1,3-trimethylhexyl, 1,1,3,3-tetramethylpentyl, nonyl, decyl, undecyl, 1-methylundecyl, dodecyl, 1,1,3,3,5,5-hexamethylhexyl, tridecyl, tetradecyl, pentadecyl, hexadecyl, heptadecyl, octadecyl, icosyl or docosyl.

Hydroxyl-substituted $C_2$-$C_{24}$alkyl is a branched or unbranched radical which contains preferably 1 to 3, in particular 1 or 2, hydroxyl groups, such as, for example, hydroxyethyl, 3-hydroxypropyl, 2-hydroxypropyl, 4-hydroxybutyl, 3-hydroxybutyl, 2-hydroxybutyl, 5-hydroxypentyl, 4-hydroxypentyl, 3-hydroxypentyl, 2-hydroxypentyl, 6-hydroxyhexyl, 5-hydroxyhexyl, 4-hydroxyhexyl, 3-hydroxyhexyl, 2-hydroxyhexyl, 7-hydroxyheptyl, 6-hydroxyheptyl, 5-hydroxyheptyl, 4-hydroxyheptyl, 3-hydroxyheptyl, 2-hydroxyheptyl, 8-hydroxyoctyl, 7-hydroxyoctyl, 6-hydroxyoctyl, 5-hydroxyoctyl, 4-hydroxyoctyl, 3-hydroxyoctyl, 2-hydroxyoctyl, 9-hydroxynonyl, 10-hydroxydecyl, 11-hydroxyundecyl, 12-hydroxydodecyl, 13-hydroxytridecyl, 14-hydroxytetradecyl, 15-hydroxypentadecyl, 16-hydroxyhexadecyl, 17-hydroxyheptadecyl, 18-hydroxyoctadecyl, 20-hydroxyeicosyl or 22-hydroxydocosyl. A preferred definition of $R_{22}$, $R_{23}$, $R_{24}$ and $R_{25}$ is hydroxyl-substituted $C_2$-$C_{12}$alkyl, especially hydroxyl-substituted $C_4$-$C_8$alkyl.

$C_3$-$C_{25}$Alkyl which is interrupted by oxygen, sulfur,

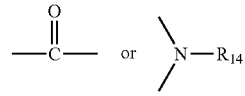

is, for example, $CH_3$—O—$CH_2CH_2$—, $CH_3$—NH—$CH_2CH_2$—, $CH_3$—NH($CH_3$)—$CH_2CH_2$—, $CH_3$—S—$CH_2CH_2$—, $CH_3$—O—$CH_2CH_2$—O—$CH_2CH_2$—, $CH_3$—O—$CH_2CH_2$—O—$CH_2CH_2$—, $CH_3$—(O—

CH$_2$CH$_2$—)$_2$O—CH$_2$CH$_2$—, CH$_3$—(O—CH$_2$CH$_2$—)$_3$O—CH$_2$CH$_2$, —CH$_3$—(O—CH$_2$CH$_2$—)$_4$O—CH$_2$CH$_2$—, CH$_3$—(O—CH$_2$CH$_2$—)$_4$O—CH$_2$CH$_2$—O(CO)—CH$_2$CH$_2$— or CH$_3$CH$_2$—(O—CH$_2$CH$_2$—)$_4$O—CH$_2$CH$_2$—O(CO)—CH$_2$CH$_2$—.

Hydroxyl-substituted C$_2$-C$_{24}$alkyl which is interrupted by oxygen, sulfur or

is, for example, —CH$_2$—CH(OH)—CH$_2$—O—CH$_3$, —CH$_2$—CH(OH)—CH$_2$—O—CH$_2$CH$_3$, —CH$_2$—CH(OH)—CH$_2$—O—CH(CH$_3$)$_2$ or —CH$_2$CH$_2$—CO—O—CH$_2$CH$_2$—O—CO—(CH$_2$)$_5$—O—CO—(CH$_2$)$_5$—OH.

Amino-, mercapto- or hydroxyl substituted C$_2$-C$_{24}$alkyl is, for example, —CH$_2$—CH(NH$_2$)—CH$_2$—O—CH$_3$, —CH$_2$—CH(SH)—CH$_2$—O—CH$_2$CH$_3$ or —CH$_2$—CH(OH)—CH$_2$—O—CH(CH$_3$)$_2$.

Amino-, mercapto- or hydroxyl substituted C$_2$-C$_{24}$alkyl which is interrupted by oxygen, sulfur or

is, for example, HO—CH$_2$CH$_2$—O—CH$_2$CH$_2$—, H$_2$NCH$_2$CH$_2$—NH—CH$_2$CH$_2$—, HOCH$_2$CH$_2$—NH(CH$_3$)—CH$_2$CH$_2$—, HOCH$_2$CH$_2$—S—CH$_2$CH$_2$—, H$_2$NCH$_2$CH$_2$—O—CH$_2$CH$_2$—O—CH$_2$CH$_2$—, HOCH$_2$CH$_2$—O—CH$_2$CH$_2$—O—CH$_2$CH$_2$—, HSCH$_2$CH$_2$—(O—CH$_2$CH$_2$—)$_2$O—CH$_2$CH$_2$—, H$_2$NCH$_2$CH$_2$—(O—CH$_2$CH$_2$—)$_3$O—CH$_2$CH$_2$—, H$_2$NCH$_2$CH$_2$—(O—CH$_2$CH$_2$—)$_4$O—CH$_2$CH$_2$—, HSCH$_2$CH$_2$—(O—CH$_2$CH$_2$—)$_4$O—CH$_2$CH$_2$—O(CO)—CH$_2$CH$_2$— or HOCH$_2$CH$_2$CH$_2$CH$_2$—(O—CH$_2$CH$_2$—)$_4$O—CH$_2$CH$_2$—O(CO)—CH$_2$CH$_2$—.

Alkenyl having 2 to 24 carbon atoms is a branched or unbranched radical such as, for example, vinyl, propenyl, 2-butenyl, 3-butenyl, isobutenyl, n-2,4-pentadienyl, 3-methyl-2-butenyl, n-2-octenyl, n-2-dodecenyl, iso-dodecenyl, oleyl, n-2-octadecenyl or n-4-octadecenyl. Preference is given to alkenyl having 3 to 18, especially 3 to 12, for example 3 to 6, especially 3 to 4 carbon atoms.

C$_5$-C$_{12}$cycloalkyl is, for example, cyclopentyl, cyclohexyl, cycloheptyl, cyclooctyl, cyclononyl, cyclodecyl, cycloundecyl or cyclododecyl. Preference is given to cyclohexyl.

C$_5$-C$_{12}$cycloalkenyl is, for example, cyclopentenyl, cyclohexenyl, cycloheptenyl, cyclooctenyl, cyclononenyl, cyclodecenyl, cycloundecenyl or cyclododecenyl. Preference is given to cyclohexenyl.

A polymerizable group is, for example,

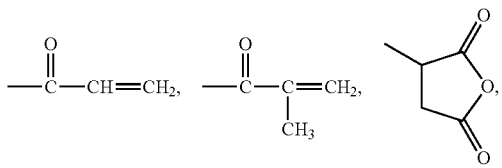

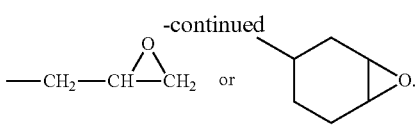

A polymer is the polymerization product when a polymerizable group, as for example outlined above, is polymerized.

C$_7$-C$_9$Phenylalkyl is, for example, benzyl, α-methylbenzyl, α,α-dimethylbenzyl or 2-phenylethyl. Preference is given to benzyl.

Examples of photoinitiators, from which the residue R$_1$ may be derived, are the following: camphor quinone; benzophenone, benzophenone derivatives, such as 2,4,6-trimethylbenzophenone, 2-methylbenzophenone, 3-methylbenzophenone, 4-methylbenzophenone, 2-methoxycarbonylbenzophenone 4,4'-bis(chloromethyl)benzophenone, 4-chlorobenzophenone, 4-phenylbenzophenone, 3,3'-dimethyl-4-methoxybenzophenone, [4-(4-methylphenylthio)phenyl]-phenylmethanone, methyl-2-benzoylbenzoate, 3-methyl-4'-phenylbenzophenone, 2,4,6-trimethyl-4'-phenylbenzophenone, 4,4'-bis(dimethylamino)benzophenone, 4,4'-bis(diethylamino)benzophenone; ketal compounds, as for example benzyldimethylketal (IRGACURE® 651);

acetophenone, acetophenone derivatives, for example α-hydroxycycloalkyl phenyl ketones or 2-hydroxy-2-methyl-1-phenyl-propanone (DAROCUR® 1173), 1-hydroxy-cyclohexyl-phenyl-ketone (IRGACURE® 184) 1-(4-dodecylbenzoyl)-1-hydroxy-1-methyl-ethane, 1-(4-isopropylbenzoyl)-1-hydroxy-1-methyl-ethane, 1-[4-(2-Hydroxyethoxy)-phenyl]-2-hydroxy-2-methyl-1-propan-1-one (IRGACURE®2959); 2-Hydroxy-1-{4-[4-(2-hydroxy-2-methyl-propionyl)-benzyl]-phenyl}-2-methyl-propan-1-one (IRGACURE®127); 2-Hydroxy-1-{4-[4-(2-hydroxy-2-methyl-propionyl)-phenoxy]-phenyl}-2-methyl-propan-1-one;

dialkoxyacetophenones, α-hydroxy- or α-aminoacetophenones, e.g. (4-methylthiobenzoyl)-1-methyl-1-morpholino-ethane (IRGACURE® 907), (4-morpholinobenzoyl)-1-benzyl-1-dimethylaminopropane (IRGACURE® 369), (4-morpholinobenzoyl)-1-(4-methylbenzyl)-1-dimethylaminopropane (IRGACURE® 379), (4-(2-hydroxyethyl)aminobenzoyl)-1-benzyl-1-dimethylaminopropane), (3,4-dimethoxybenzoyl)-1-benzyl-1-dimethylaminopropane;

4-aroyl-1,3-dioxolanes, benzoin alkyl ethers and benzil ketals, e.g. dimethyl benzil ketal, phenylglyoxalic esters and derivatives thereof, e.g. oxo-phenyl-acetic acid 2-(2-hydroxyethoxy)-ethyl ester, dimeric phenylglyoxalic esters, e.g. oxo-phenyl-acetic acid 1-methyl-2-[2-(2-oxo-2-phenyl-acetoxy)-propoxy]-ethyl ester (IRGACURE® 754);

oximeesters, e.g. 1,2-octaneclione 1-[4-(phenylthio)phenyl]-2-(O-benzoyloxime) (IRGACURE® OXE01), ethanone 1-[9-ethyl-6-(2-methylbenzoyl)-9H-carbazol-3-yl]-1-(O-acetyloxime) 9H-thioxanthene-2-carboxaldehyde 9-oxo-2-(O-acetyloxime), peresters, e.g. benzophenone tetracarboxylic peresters as described for example in EP 126541, monoacyl phosphine oxides, e.g. (2,4,6-trimethylbenzoyl)diphenylphosphine oxide (DAROCUR® TPO), bisacylphosphine oxides, e.g. bis(2,6-dimethoxybenzoyl)-(2,4,4-trimethyl-pentyl)phosphine oxide, bis(2,4,6-trimethylbenzoyl)-phenylphosphine oxide (IRGACURE® 819), bis(2,4,6-trimethylbenzoyl)-2,4-dipentoxyphenylphosphine oxide, trisacylphosphine oxides, halomethyltriazines, 2-[2-(4-methoxy-phenyl)-vinyl]-4,6-bis-trichloromethyl-[1,3,5]triazine, 2-(4-methoxy-phenyl)-4,6-bis-trichloromethyl-[1,3,5]triazine, 2-(3,4-dimethoxyphenyl)-4,6-bis-trichloromethyl-[1,3,5]triazine, 2-methyl-4,6-bis-trichloromethyl-[1,3,5]triazine, hexaarylbisimidazoles, e.g. ortho-chlorohexaphenyl-bisimidazole, ferrocenium compounds, or titanocenes, e.g. bis(cyclopentadienyl)-bis(2,6-difluoro-3-pyrrylphenyl)titanium (IRGACURE® 784).

Examples of flame retardants, from which the residue $R_1$ may be derived, are the following: Representative organohalogen flame-retardants are for example:

Polybrominated diphenyl oxide (DE-60F, Great Lakes Corp.), decabromoidiphenyl oxide (DBDPO; SAYTEX® 102E), tris[3-bromo-2,2-bis(bromomethyl)propyl]phosphate (PB 370®, FMC Corp.), tris(2,3-dibromopropyl)phosphate, tris(2,3-dichloropropyl)phosphate, chlorendic acid, tetrachlorophthalic acid, tetrabromophthalic acid, bis-(N,N'-hydroxyethyl)tetrachlorphenylene diamine, poly-β-chloroethyl triphosphonate mixture, tetrabromobisphenol A bis(2,3-dibromopropyl ether) (PE68), brominated epoxy resin, ethylene-bis(tetrabromophthalimide) (SAYTEX® BT-93), bis(hexachlorocyclopentadieno)-cyclooctane (DECLORANE PLUS®), chlorinated paraffins, octabromodiphenyl ether, hexachlorocyclopentadiene derivatives, 1,2-bis(tribromophenoxy)ethane (FF680), tetrabromo-bisphenol A (SAYTEX® RB100), ethylene bis-(dibromo-norbornanedicarboximide) (SAYTEX®BN-451), bis-(hexachlorocycloentadeno) cyclooctane, PTFE, tris-(2,3-dibromopropyl)-isocyanurate, and ethylene-bis-tetrabromophthalimide.

Suitable phosphorus containing flame-retardants are for example:

Tetraphenyl resorcinol diphosphite (FYROLFLEX® RDP, Akzo Nobel), tetrakis(hydroxymethyl)phosphonium sulphide, triphenyl phosphate, diethyl-N,N-bis(2-hydroxyethyl)-amino-methyl phosphonate, hydroxyalkyl esters of phosphorus acids, ammonium polyphosphate (APP) or (HOSTAFLAM® AP750), resorcinol diphosphate oligomer (RDP), phosphazene flame-retardants, ethylenediamine diphosphate (EDAP), phosphonates and their metal salts and phosphinates and their metal salts.

Nitrogen containing flame-retardants such as isocyanurate flame-retardants include polyisocyanurate, esters of isocyanuric acid and isocyanurates. For example, an hydroxyalkyl isocyanurate such as tris-(2-hydroxyethyl)isocyanurate, tris (hydroxymethyl)isocyanurate, tris(3-hydroxy-n-proyl)isocyanurate or triglycidyl isocyanurate.

Nitrogen containing flame-retardants include melamine based flame-retardants, examples of which are:

Melamine cyanurate, melamine borate, melamine phosphates, melamine polyphosphate, melamine pyrophosphate, melamine ammonium polyphosphate and melamine ammonium pyrophosphate.

Nitrogen-containing flame-retardants comprise compounds of formulae III to VIIIa

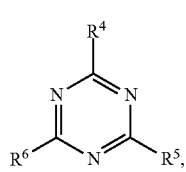
(III)

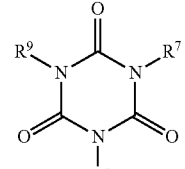
(IV)

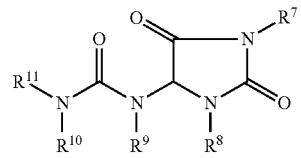
(V)

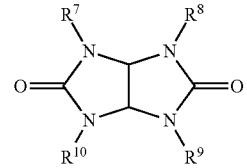
(VI)

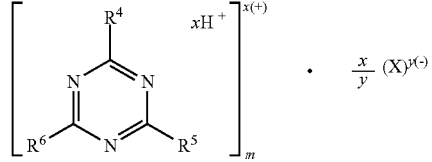
(VII)

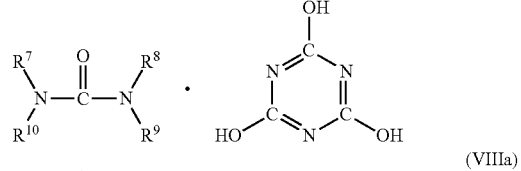
(VIII)

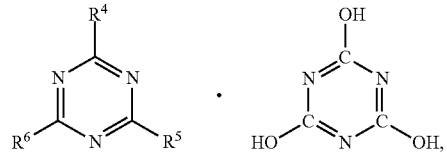
(VIIIa)

wherein $R^4$ to $R^6$ are each independently of the others hydrogen, $C_1$-$C_8$alkyl, $C_5$-$C_6$cycloalkyl or $C_1$-$C_4$alkyl-$C_5$-$C_6$cycloalkyl, each unsubstituted or substituted by hydroxy or $C_1$-$C_4$-hydroxyalkyl; $C_2$-$C_8$alkenyl, $C_1$-$C_8$-alkoxy, -acyl, -acyloxy, $C_6$-$C_{12}$aryl, —O—$R^2$ or —N($R^2$)$R^3$, and $R^2$ and $R^3$ are hydrogen, $C_1$-$C_4$alkyl, $C_5$-$C_6$cycloalkyl, $C_2$-$C_8$alkenyl, $C_1$-$C_4$-hydroxyalkyl or $C_8$-$C_{12}$aryl, with the proviso that $R^4$ to $R^6$ are not simultaneously hydrogen and also, in formula III, not simultaneously —$NH_2$, and in formula VII at least one group is present which is capable of adding a proton;

$R^7$ to $R^{11}$, each independently of the other, have the same possible meanings as $R^4$ to $R^6$ with the exception of —N($R^2$) $R^3$, X is the anion of a proton donating acid, x is the number of protons transferred from the latter to the triazine compound and y is the number of protons abstracted from the proton donating acid;

or represent ammonium polyphosphate, a melamine ammonium phosphate, a melamine ammonium polyphosphate, melamine ammonium pyrophosphate, a condensation product melamine or/and a reaction product of melamine with phosphoric acid or/and a reaction product of a condensation product of melamine with phosphoric acid or mixtures thereof.

Examples are benzoguanamine, tris(hydroxyethyl) isocyanurate, allantoin, glycoluril, melamine cyanurate, melamine phosphate, dimelamine phosphate, melamine pyrophosphate, urea cyanurate, melamine polyphosphate, melamine borate, ammonium polyphosphate, melamine ammonium polyphosphate or melamine ammonium pyrophosphate, preferably a condensation product of melamine from the series melem, melam, melon and/or a higher condensed compound or a reaction product of melamine with phosphoric acid and/or a reaction product of condensation products of melamine with phosphoric acid or a mixture thereof. Special emphasis should be given to: dimelamine pyrophosphate, melamine polyphosphate, melem polyphosphate, melam polyphosphate, and/or a mixed polysalt of such a type, more especially melamine polyphosphate.

Halogenated flame-retardants may be selected from organic aromatic halogenated compounds such as halogenated benzenes, biphenyls, phenols, ethers or esters thereof, bisphenols, diphenyloxides, aromatic carboxylic acids or polyacids, anhydrides, amides or imides thereof; organic cycloaliphatic or polycycloaliphatic halogenated compounds; and organic aliphatic halogenated compounds such as halogenated paraffins, oligo- or polymers, alkylphosphates or alkylisocyanurates. These components are largely known in the art, see e.g. U.S. Pat. No. 4,579,906 (e.g. col. 3, lines 30-41), U.S. Pat. No. 5,393,812; see also *Plastics Additives Handbook, Ed.* by H. Zweifel, 5$^{th}$ Ed., Hanser Publ., Munich 2001, pp. 681-698. Halogen contained in these compounds usually is chloro and/or bromo; preferred are brominated flame-retardants for such systems.

Phosphorus containing flame-retardant may be selected from phosphazene flame-retardants, which are well known in the art. They are disclosed for example in EP1104766, JP07292233, DE19828541, DE1988536, JP11263885, U.S. Pat. Nos. 4,107,108, 4,108,805 and 4,079,035 and 6,265,599.

The phosphorus containing flame-retardant may be selected from metal or metalloid salts of a phosphonic add of formula X

(X)

wherein R is hydrogen, $C_1$-$C_{18}$alkyl, $C_5$-$C_6$cycloalkyl, $C_2$-$C_6$alkenyl, $C_6$-$C_{10}$aryl or $C_7$-$C_{11}$aralkyl and R' is hydrogen, $C_1$-$C_8$alkyl, $C_6$-$C_{10}$aryl or $C_7$-$C_{11}$aralkyl, the substituents R and R' that are other than hydrogen being unsubstituted or substituted by halogen, hydroxyl, amino, $C_1$-$C_4$alkylamino, di-$C_1$-$C_4$alkylamino, $C_1$-$C_4$alkoxy, carboxy or $C_2$-$C_5$alkoxycarbonyl; and the metal or metalloid is from Group IA, IB, IIA, IIB, IIIA, IVA, VA or VIII of the Periodic Table. The salts may be present as simple ionic compounds comprising anions of phosphonic acid and cations of the metal or metalloid. When R' is hydrogen and the metal or metalloid has a valency of more than one, the salt can have a polymeric structure according to the following formula XI

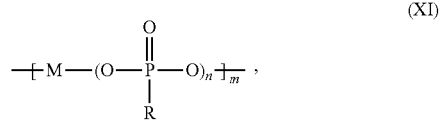
(XI)

wherein R is as defined hereinbefore, M is a metal or metalloid, n has a value corresponding to the valency of M minus 1, m is a number from 2 to 100 and wherein each group

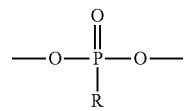

is bonded only to M atoms.

The phosphonic acid salts according to the definition either are known or can be prepared in accordance with methods known per se. Examples of such methods are to be found in, inter alia, EP-A-245 207, pages 4 and 5 to 7 (Examples 1 to 14).

PTFE, polytetrafluoroethylene (for example Teflon® 6C; E.I. Du Pont), may also be mentioned, as disclosed in WO 03/016388.

Of interest are functionalized nanoparticles comprising on the surface at least a radical of the formula I and optionally a radical of the formula II, wherein $R_1$ is an additive selected from the group consisting of phenolic antioxidants, benzofuran-2-ones, sterically hindered amines, aminic antioxidants, 2-(2'-hydroxyphenyl)benzotriazoles, 2-hydroxybenzophenones, 2-(2-hydroxyphenyl)-1,3,5-triazines, phosphites, phosphonites, thioethers, benzophenones, α-activated acetophenones, bisacylphosphinoxides (BAPO), monoacylphosphinoxides (MAPO), alkoxamines, thioxanthones, benzoins, benzil ketals, benzoin ethers, α-hydroxy-alkylphenones and α-aminoalkylphenones.

Of special interest are functionalized nanoparticles comprising on the surface at least a radical of the formula I and optionally a radical of the formula II, wherein $R_1$ is

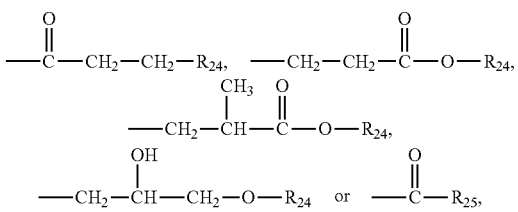

$R_{24}$ is $C_1$-$C_{25}$alkyl, hydroxyl-substituted $C_2$-$C_{24}$alkyl; hydroxyl-substituted $C_2$-$C_{24}$alkyl which is interrupted by oxygen, sulfur or

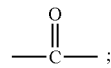

$C_3$-$C_{25}$alkyl which is interrupted by oxygen, sulfur or
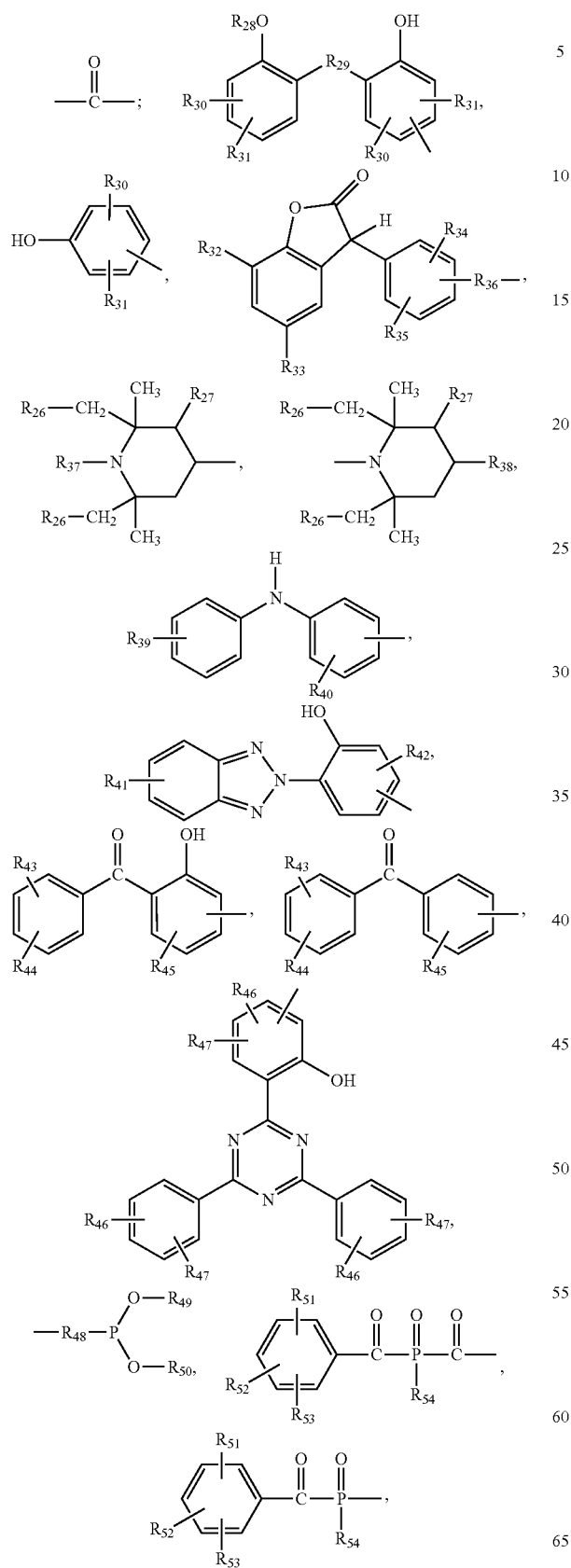
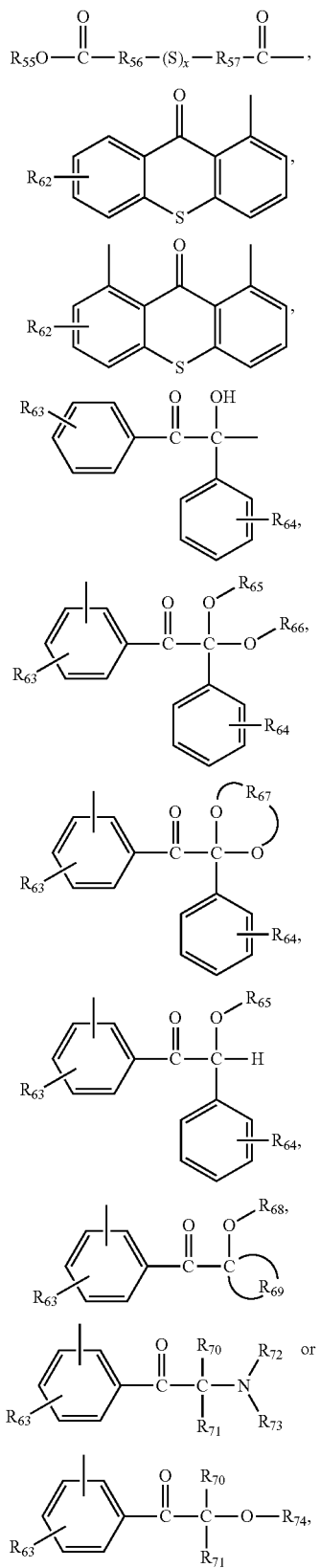
$R_{25}$ is $C_1$-$C_{25}$alkyl or $C_2$-$C_{25}$alkenyl,
$R_{26}$ is hydrogen or methyl, $R_{27}$ is hydrogen or methyl,
$R_{28}$ is hydrogen or

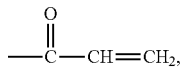

$R_{29}$ is $C_1$-$C_4$alkylene,
$R_{30}$ and $R_{31}$ are each independently of the other hydrogen, $C_1$-$C_{18}$alkyl, $C_7$-$C_9$phenylalkyl, phenyl or $C_5$-$C_8$cycloalkyl,
$R_{32}$ and $R_{33}$ are each independently of the other hydrogen, $C_1$-$C_{18}$alkyl, $C_7$-$C_9$phenylalkyl, phenyl or $C_5$-$C_8$cycloalkyl,
$R_{34}$ and $R_{35}$ are each independently of the other hydrogen, halogen, $C_1$-$C_4$alkyl, —CN, trifluoromethyl or $C_1$-$C_4$alkoxy,
$R_{36}$ is a direct bond or —O—,
$R_{37}$ is hydrogen, —O*, $C_1$-$C_{25}$alkyl, $C_2$-$C_{20}$alkenyl, $C_2$-$C_{20}$alkinyl, $C_1$-$C_{20}$alkoxy, $C_5$-$C_{12}$cycloalkoxy, $C_7$-$C_{25}$aralkoxy, $C_8$-$C_{12}$aryloxy, $C_7$-$C_9$phenylalkyl, $C_5$-$C_{12}$cycloalkyl, phenyl, naphthyl, hydroxyethyl, $C_2$-$C_{25}$alkanoyl, benzoyl, naphthoyl or $C_2$-$C_{20}$alkoxyalkanoyl,
$R_{38}$ is hydrogen or an organic radical,
$R_{39}$ and $R_{40}$ are each independently of the other hydrogen, $C_1$-$C_{18}$alkyl, $C_7$-$C_9$phenylalkyl or phenyl,
$R_{41}$ is hydrogen, halogen or $C_1$-$C_{18}$alkyl,
$R_{42}$ is hydrogen, $C_1$-$C_{18}$alkyl or $C_7$-$C_9$phenylalkyl,
$R_{43}$ and $R_{44}$ are each independently of the other hydrogen, $C_1$-$C_{18}$alkyl, $C_1$-$C_{18}$alkoxy, di($C_1$-$C_4$alkyl)amino, hydroxyl or

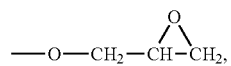

$R_{45}$ is hydrogen, $C_1$-$C_{18}$alkyl, $C_1$-$C_{18}$alkoxy or

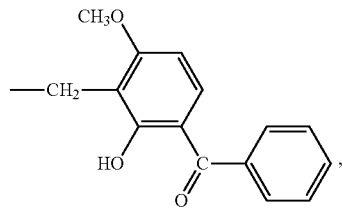

$R_{46}$ and $R_{47}$ are each independently of the other hydrogen, hydroxyl, $C_1$-$C_{18}$alkyl, phenyl, $C_1$-$C_{18}$alkoxy or $C_7$-$C_9$phenylakyl,
$R_{48}$ is a direct bond or oxygen,
$R_{49}$ and $R_{50}$ are each independently of the other $C_1$-$C_{18}$alkyl, $C_7$-$C_9$phenylalkyl, cyclohexyl, phenyl, or phenyl substituted by 1 to 3 alkyl radicals having in total 1 to 18 carbon atoms,
$R_{51}$, $R_{52}$ and $R_{53}$ are each independently of the others hydrogen, halogen $C_1$-$C_4$alkyl or $C_1$-$C_4$alkoxy,
$R_{54}$ is $C_1$-$C_{20}$alkyl, $C_5$-$C_8$cycloalkyl, $C_7$-$C_9$phenylalkyl or phenyl,
$R_{55}$ is $C_1$-$C_{25}$alkyl,
$R_{56}$ is methylene or ethylene,
$R_{57}$ is methylene or ethylene,
$R_{62}$ is hydrogen or $C_1$-$C_{18}$alkyl,
$R_{63}$ and $R_{64}$ are each independently of the other hydrogen, $C_1$-$C_{18}$alkyl, $C_1$-$C_{18}$alkoxy, $C_1$-$C_4$alkylthio, morpholinyl, $C_7$-$C_9$phenylalkyl or phenyl,
$R_{65}$ and $R_{66}$ are each independently of the other $C_1$-$C_{18}$alkyl,
$R_{67}$ is $C_2$-$C_4$alkylene,
$R_{68}$ is hydrogen or $C_1$-$C_{18}$alkyl,
$R_{69}$ is $C_3$-$C_7$alkylene,
$R_{70}$ and $R_{71}$ are each independently of the other $C_1$-$C_8$alkyl or $C_7$-$C_9$phenylalkyl,
$R_{72}$ and $R_{73}$ are each independently of the other $C_1$-$C_8$alkyl or $R_{72}$ and $R_{73}$ are together $CH_2CH_2$—O—$CH_2CH_2$— thus forming with the nitrogen atom to which they are attached a morpholinyl ring,
$R_{74}$ is hydrogen, $C_1$-$C_{18}$alkyl or $C_7$-$C_9$phenylalkyl, and
x is 1, 2 or 3.

Of very special interest are functionalized nanoparticles comprising on the surface at least a radical of the formula I wherein n is 3.

Also of interest are functionalized nanoparticles comprising on the surface at least a radical of the formula I wherein $R_4$ is hydrogen or $C_1$-$C_4$alkyl.

Of very special interest are functionalized nanoparticles comprising on the surface at least a radical of the formula I and optionally a radical of the formula II, wherein
$R_{11}$ is $C_1$-$C_{18}$alkyl, $C_3$-$C_{18}$alkyl which is interrupted by oxygen or sulfur; or 3-aminopropyl.

The functionalized nanoparticles according to the present invention have preferably a spherical shape.

Preferably, the nanoparticles have particle size below 1000 nm, especially below 500 nm and more preferably below 400 nm. A particle size below 300 nm, especially below 100 nm, is preferred. For example, the nanoparticles have a particle size of 10 to 1000 nm, preferably 10 to 500 nm, and more preferably 40 to 500 nm. Highly preferred is a particle size of 40 to 400 nm.

The organic content of the nanoparticles according to the present invention is, for example, 5 to 80 percent by weight, especially 10 to 70 percent by weight, based on the total weight of the nanoparticle.

Nanoparticles are typically silicon dioxide, aluminum oxide, a heterogeneous mixture thereof or silicon aluminum oxide as mixed oxides. The silicon aluminum oxide nanoparticles according to the present invention can show silicon contents in between 1 to 99 metal-atom %.

It is preferred that the functionalized nanoparticle is a silica ($SiO_2$) or alumina ($Al_2O_3$) nanoparticle, especially a silica nanoparticle.

Relating to a specific application the expert would preferably use particles showing an index of refraction close to the matrix material. Using pure silicon dioxide ($n_D$ 1.48 to 1.50) or pure aluminum oxide ($n_D$ 1.61) or silicon aluminum oxides with the whole range of silicon to aluminum ratio covers material with an index of refraction from 1.48 to 1.61.

Unmodified nanoparticles are commercially available from different suppliers such as Degussa, Hanse Chemie, Nissan Chemicals, Clariant, H. C. Starck, Nanoproducts or Nyacol Nano Technologies as powder or as dispersions. Examples of commercially available silica nanoparticles are Aerosil® from Degussa, Ludox® from DuPont, Snowtex® from Nissan Chemical, Levasil® from Bayer, or Sylysia® from Fuji Silysia Chemical. Examples of commercially available $Al_2O_3$ nanoparticles are Nyacol® products from Nyacol Nano Technologies Inc., or Disperal® products from Sasol.

The artisan is aware of different well-established processes to access particles in different sizes, with different physical properties and with different compositions such as flame-hydrolysis (Aerosil-Process), plasma-process, arc-process and hot-wall reactor-process for gas-phase or solid-phase reactions or ionicexchange processes and precipitation processes for solution-based reactions. Reference is made to several references describing the detailed processes, such as EP-A-1 236 765, U.S. Pat. No. 5,851,507, U.S. Pat. No. 6,719,821, US-A-2004-178530 or U.S. Pat. No. 2,244,325, WO-A-05/026068, EP-A-1 048 617.

The preparation of the functionalized nanoparticles comprising on the surface at least a radical of the formula I is preferably carried out by the reaction of corresponding nanoparticles (like unfunctionalized silica or alumina nanoparticles) with a compound of the formula (Ia)

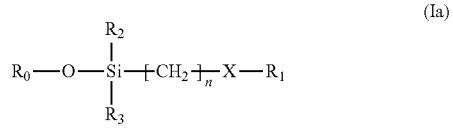
(Ia)

wherein
X is oxygen, sulfur or

$R_0$ is $C_1$-$C_{25}$alkyl.
$R_1$ is hydrogen,
$R_2$ and $R_3$ independently of each other are hydrogen, $C_1$-$C_{25}$alkyl, $C_3$-$C_{25}$alkyl which is interrupted by oxygen or sulfur; $C_2$-$C_{24}$alkenyl, phenyl, $C_7$-$C_9$phenylalkyl or —$OR_5$,
$R_4$ is hydrogen, $C_1$-$C_{25}$alkyl or $C_3$-$C_{25}$alkyl which is interrupted by oxygen or sulfur;
$R_5$ is hydrogen or $C_1$-$C_{25}$alkyl, and
n is 1, 2, 3, 4, 5, 6, 7 or 8.

The reaction of the compound of formula (Ia) with the nanoparticles can be carried out in analogy to known processes. The reaction can, for example, be carried out in an organic medium or preferably a mixture of water with an organic medium. As organic medium solvents like alcohols, especially methanol or ethanol can be used. It is preferred to carry out the reaction at temperatures like 20 to 90° C., especially 40 to 60° C. As to the compounds of formula (Ia) it is preferred to use those, wherein at least one of $R_0$, $R_2$ and $R_3$ is methoxy or ethoxy, especially wherein $R_0$, $R_2$ and $R_3$ are methoxy or ethoxy. It is highly preferred that $R_0$, $R_2$ and $R_3$ are methoxy. If desired, the products obtained can be redispersed in a suitable medium, like ethanol, toluene or xylol.

In a further step the reaction product of the nanoparticles with the compound of formula (Ia) can easily be derivatized to obtain nanoparticles comprising radicals of the formula (I) by known processes such as for example esterification, amidation, Michael addition or opening of epoxides.

In the following some examples of such reactions are given in general terms:
a) Nanoparticles, showing active linkage groups such as SH or $NH_2$ (for example nanoparticles as prepared in Example 1) can easily surface modified with additives bearing for instance ester-, epoxy-, carboxy-, carbonyl-, acrylic-, methacrylic-, alkylhalogenide-, alkylsulfate-, anhydride-, terminal double bond-, nitrile- and for instance α,β-unsaturated carbonyl-groups. The chemistry of these substances and the molecular organic syntheses (like nucleophilic substitutions, nucleophilic additions, Michael additions, ring-opening reactions, radical addition, etc.) are well known and can easily be adapted to the solid phase organic chemistry.
b) Nanoparticles, showing functional groups on their surfaces, such as ester-, epoxy-, carboxy-, carbonyl-, acrylic-, methacrylic-, alkyl halogenide-, alkylsulfate-, anhydride-, terminal double bond-, nitrile- and for instance α,β-unsaturated carbonyl-groups can easily further reacted with additives bearing —SH, —RNH(R=organic group) or —$NH_2$ groups with the chemical reactions mentioned above under a) [e.g. Example 23].
c) Additives showing —OH, —RNH(R=organic group) or —$NH_2$ groups can be activated by using acryloylchloride under basic conditions to generate additive-acrylates (acylation), that can easily be reacted with particles bearing —SH or $NH_2$ groups by using a Michael addition [e.g. Examples 5, 14]. Other syntheses that are leading to functional groups mentioned in a) and b) are well known.
d) Additives can be functionalized by using reactive alkoxysilanes showing functional groups and mechanisms as mentioned in a), b) or c) and then being grafted onto the particle surface using a state of the art silanisation reaction [e.g. Example 17].

According to an alternative process for the preparation of nanoparticles comprising radicals of formula (I) corresponding unfunctionalized nanoparticles, like commercially available silica or $Al_2O_3$ nanoparticles, can be reacted with a compound of the formula (Ia), wherein $R_0$, $R_2$ and $R_3$ are as defined above under formula (Ia) and n, X and $R_1$ are as defined above under formula (I). By this route the nanoparticles of formula (I) can be obtained directly, without further derivatization. The reaction conditions can be chosen as given above for the reaction of the nanoparticles with the compound of formula (Ia). The reaction can, for example, be carried out in analogy to the preparation process described in WO-A-03/002652.

The radical of formula (II) can be introduced in analogy to the above preparation processes. These reactions can be carried out simultaneously with the introduction of the radical of formula (I), or stepwise.

The functionalized nanoparticles of the present invention comprising on the surface at least a radical of the formula I and optionally a radical of the formula II are suitable for stabilizing or flame-retarding and/or compatibilizing organic materials, which are subject to oxidative, thermal or light-induced degradation, in particular synthetic polymers or coatings, or for photoinitiating in-situ polymerization or hardening of pre-polymeric nanocomposites or sols to nanocomposite materials.

Examples of such materials are:
1. Polymers of monoolefins and diolefins, for example polypropylene, polyisobutylene, polybut-1-ene, poly-4-methylpent-1-ene, polyvinylcyclohexane, polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, hemi-isotactic or atactic; where atactic polymers are preferred. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethyl styrene, propyl styrene, vinyl biphenyl, vinyl naphthalene, and vinyl anthracene, and mixtures thereof. Homopolymers and copolymers may have any stereostructure including syndiotactic, isotactic, hemi-isotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactc, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lecterns, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

29. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acrylate, POM/MBS, PPO/HIPS, PPO/PA 6.6 and copolymers, PA/HDPE, PA/PP, PA/PPO, PBT/PC/ABS or PBT/PET/PC.

30. Naturally occurring and synthetic organic materials which are pure monomeric compounds or mixtures of such compounds, for example mineral oils, animal and vegetable fats, oil and waxes, or oils, fats and waxes based on synthetic esters (e.g. phthalates, adipates, phosphates or trimellitates) and also mixtures of synthetic esters with mineral oils in any weight ratios, typically those used as spinning compositions, as well as aqueous emulsions of such materials.

31. Aqueous emulsions of natural or synthetic rubber, e.g. natural latex or lattices of carboxylated styrene/butadiene copolymers.

32. Pre-polymeric monomers or oligomers of the aforementioned polymers or blends.

33. Sols, especially organosols, as stable liquid suspensions of colloidal nano-particles in a diluent, a reactive (e.g. crosslinking) diluent or in a polymerizable or crosslinking monomer, or in a mixture of all.

The present invention relates therefore also to a composition comprising
a) an organic material subject to oxidative, thermal or light-induced degradation [component a)], and
b) at least a functionalized nanoparticle of the present invention comprising on the surface at least a radical of the formula I and optionally a radical of the formula II [component b)].

Preferred organic materials are polymers, for example a pre-polymer for a nanocomposite material, in particular synthetic polymers, for example thermoplastic polymers. Polyamides, polyurethanes and polyolefins are particularly preferred. Examples of preferred polyolefins are polypropylene or polyethylene.

The incorporation of the functionalized nanoparticles of the invention and optional further components into the polymer is carried out by known methods such as dry blending in the form of a powder, or wet mixing in the form of solutions, dispersions or suspensions for example in an inert solvent, water or oil. The functionalized nanoparticles of the invention and optional further additives may be incorporated, for example, before or after molding or also by applying the dissolved or dispersed additive or additive mixture to the polymer material, with or without subsequent evaporation of the solvent or the suspension/dispersion agent. They may be added directly into the processing apparatus (e.g. extruders, internal mixers, etc.), e.g. as a dry mixture or powder or as solution or dispersion or suspension or melt.

The incorporation can be carried out in a heatable container, equipped with a stirrer, e.g. in a closed apparatus such as a kneader, mixer or stirred vessel. The incorporation is preferably carried out in an extruder or in a kneader. It is immaterial whether processing takes place in an inert atmosphere or in the presence of oxygen.

The addition of the functionalized nanoparticles or additive blend to the polymer can be carried out in all customary mixing machines in which the polymer is melted and mixed with the additives. Suitable machines are known to those skilled in the art. They are predominantly mixers, kneaders and extruders.

The process is preferably carried out in an extruder by introducing the additive during processing.

Particularly preferred processing machines are single-screw extruders, contra rotating and co rotating twin-screw extruders, planetary-gear extruders, ring extruders or co kneaders. It is also possible to use processing machines provided with at least one gas removal compartment to which a vacuum can be applied.

Suitable extruders and kneaders are described, for example, in *Handbuch der Kunststoffextrusion, Vol.* 1 *Grundlagen*, Editors F. Hansen, Knappe, H. Potente, 1989, pp. 3-7, ISBN:3-446-14339-4 (Vol. 2 Extrusionsanlagen 1986, ISBN 3-446-14329-7).

For example, the screw length is 1-60 screw diameters, preferably 35-48 screw diameters. The rotational speed of the screw is preferably 10-600 rotations per minute (rpm), very particularly preferably 25-300 rpm.

The maximum throughput is dependent on the screw diameter, the rotational speed and the driving force. The process can also be carried out at a level lower than maximum throughput by varying the parameters mentioned or employing weighing machines delivering dosage amounts.

If a plurality of components is added, these can be premixed or added individually.

The functionalized nanoparticles of the invention and optional further additives can also be sprayed onto the polymer material. They are able to dilute other additives (for example the conventional additives indicated below) or their melts so that they can be sprayed also together with these additives onto the material. Addition by spraying during the deactivation of the polymerisation catalysts is particularly advantageous; in this case, the steam evolved may be used for deactivation of the catalyst. In the case of spherically polymerised polyolefins it may, for example, be advantageous to apply the functionalized nanoparticles of the invention, optionally together with other additives, by spraying.

The functionalized nanoparticles of the invention and optional further additives can also be added to the polymer in the form of a masterbatch ("concentrate") which contains the components in a concentration of, for example, about 1.0% to about 40.0% and preferably 2.0% to about 20.0% by weight incorporated in a polymer. The polymer must not be necessarily of identical structure than the polymer where the additives are added finally. In such operations, the polymer can be used in the form of powder, granules, solutions, and suspensions or in the form of lattices.

Incorporation can take place prior to or during the shaping operation. The materials containing the functionalized nanoparticles of the invention described herein preferably are used for the production of molded articles, for example rotomolded articles, injection molded articles, profiles and the like.

Of special interest are also compositions wherein the composition is a coating composition and component (a) is an organic film-forming binder.

Of special interest are transparent coating compositions which after curing lead to transparent coatings.

The coating composition is preferably a coating material or paint, especially an aqueous coating material or an aqueous paint.

Examples of coating materials are lacquers, paints or varnishes. These always contain an organic film-forming binder in addition to other, optional components.

Preferred organic film-forming binders are epoxy resins, polyurethane resins, amino resins, acrylic resins, acrylic copolymer resins, polyvinyl resins, phenolic resins, styrene/butadiene copolymer resins, vinyl/acrylic copolymer resins, polyester resins, UV-curable resins or alkyd resins, or a mixture of two or more of these resins, or an aqueous basic or acidic dispersion of these resins or mixtures of these resins, or an aqueous emulsion of these resins or mixtures of these resins.

Of particular interest are organic film-forming binders for aqueous coating compositions, such as, for example, alkyd resins; acrylic resins, two-component epoxy resins; polyurethane resins; polyester resins, which are usually saturated; water-dilutable phenolic resins or derived dispersions; water-dilutable urea resins; resins based on vinyl/acrylic copolymers; and hybrid systems based on, for example, epoxy acrylates.

More specifically, the alkyd resins can be water-dilutable alkyd resin systems which can be employed in air-drying form or in the form of stoving systems, optionally in combination with water-dilutable melamine resins; the systems may also be oxidatively drying, air-drying or stoving systems which are optionally employed in combination with aqueous dispersions based on acrylic resins or copolymers thereof, with vinyl acetates, etc.

The acrylic resins can be pure acrylic resins, epoxy acrylate hybrid systems, acrylic acid or acrylic ester copolymers, combinations with vinyl resins, or copolymers with vinyl monomers such as vinyl acetate, styrene or butadiene. These systems can be air-drying systems or staving systems.

In combination with appropriate polyamine crosslinkers, water-dilutable epoxy resins exhibit excellent mechanical and chemical resistance. If liquid epoxy resins are used, the addition of organic solvents to aqueous systems can be omitted. The use of solid resins or solid-resin dispersions usually necessitates the addition of small amounts of solvent in order to improve film formation.

Preferred epoxy resins are those based on aromatic polyols, especially those based on bisphenols. The epoxy resins are employed in combination with crosslinkers. The latter may in particular be amino- or hydroxy-functional compounds, an acid, an acid anhydride or a Lewis acid. Examples thereof are polyamines, polyaminoamides, polysulfide-based polymers, polyphenols, boron fluorides and their complex compounds, polycarboxylic acids, 1,2-dicarboxylic anhydrides or pyromellitic dianhydride.

Polyurethane resins are derived from polyethers, polyesters and polybutadienes with terminal hydroxyl groups, on the one hand, and from aliphatic or aromatic polyisocyanates on the other hand.

Preferably, the polyurethanes are prepared in situ from polyethers, polyesters and polybutadienes with terminal hydroxyl groups, on the one hand, and from aliphatic or aromatic polyisocyanates on the other hand.

Examples of suitable polyvinyl resins are polyvinylbutyral, polyvinyl acetate or copolymers thereof.

Suitable phenolic resins are synthetic resins in the course of hose construction phenols are the principal component, i.e. in particular phenol-, cresol-, xylenol- and resorcinol-formaldehyde resins, alkylphenolic resins, and condensation products of phenols with acetaldehyde, furfurol, acrolein or other aldehydes. Modified phenolic resins are also of interest.

UV-(ultraviolet) curable resins may contain one or more olefinic double bonds. They may be of low (monomeric) or relatively high (oligomeric) molecular mass. Examples of monomers containing a double bond are alkyl or hydroxyalkyl acrylates or methacrylates, such as methyl, ethyl, butyl, 2-ethylhexyl or 2-hydroxyethyl acrylate, isobornyl acrylate, methyl methacrylate or ethyl methacrylate. Other examples are acrylnitrile, acrylamide, methacrylamide, N-substituted (meth)acrylamides, vinyl esters such as vinyl acetate, vinyl ethers such as isobutyl vinyl ether, styrene, alkylstyrenes and halostyrenes, N-vinylpyrrolidone, vinyl chloride or vinylidene chloride.

Examples of monomers containing two or more double bonds are ethylene glycol, propylene glycol, neopentyl glycol, hexamethylene glycol and bisphenol A diacrylates, 4,4'-bis(2-acryl-oyloxyethoxy)diphenylpropane, trimethylolpropane triacrylate, pentaerythritol triacrylate or tetraacrylate, vinyl acrylate, divinylbenzene, divinyl succinate, diallyl phthalate, triallyl phosphate, triallyl isocyanurate or tris(2-acryloylethyl)isocyanurate.

Examples of relatively high molecular mass (oligomeric) polyunsaturated compounds are acrylated epoxy resin and acrylated or vinyl ether- or epoxy-functional polyesters, polyurethanes and polyethers. Further examples of unsaturated oligomers are unsaturated polyester resins, generally prepared from maleic acid, phthalic acid and one or more dials and having molecular weights of from about 500 to 3000. In addition to these it is also possible to use vinyl ether monomers and oligomers, and also maleate-terminated oligomers with polyesters, polyurethane, polyether, polyvinyl ether and epoxide main chains. Especially suitable are combinations of polymers and oligomers which carry vinyl ether groups, as described in WO-A-90/01512. Also suitable, however, are copolymers of monomers functionalized with maleic acid and vinyl ether.

Also suitable are compounds containing one or more free-radically polymerizable double bonds. In these compounds the free-radically polymerizable double bonds are preferably in the form of (meth)acryloyl groups. (Meth)acryloyl and, respectively, (meth)acrylic here and below means acryloyl and/or methacryloyl, and acrylic and/or methacrylic, respectively. Preferably, at least two polymerizable double bonds are present in the molecule in the form of (meth)acryloyl groups. The compounds in question may comprise, for example, (meth)acryloyl-functional oligomeric and/or polymeric compounds of poly(meth)acrylate. The number-average molecular mass of this compound may be for example from 300 to 10 000, preferably from 800 to 10 000. The compounds preferably containing free-radically polymerizable double bonds in the form of (meth)acryloyl groups may be obtained by customary methods, for example by reacting poly(meth)acrylates with (meth)acrylic acid. These and other preparation methods are described in the literature and are known to the person skilled in the art. Unsaturated oligomers of this kind may also be referred to as prepolymers.

Functionalized acrylates are also suitable. Examples of suitable monomers which are normally used to form the backbone (the base polymer) of such functionalized acrylate and methacrylate polymers are acrylate, methyl acrylate, methyl methacrylate, ethyl acrylate, ethyl methacrylate, n-butyl acrylate, n-butyl methacrylate, isobutyl acrylate, isobutyl methacrylate, 2-ethylhexyl acrylate, 2-ethylhexyl methacrylate etc. Additionally, appropriate amounts of functional monomers are copolymerized during the polymerization in order to give the functional polymers. Acid-functionalized acrylate or methacrylate polymers are obtained using acid-functional monomers such as acrylic acid and methacrylic acid. Hydroxy-functional acrylate or methacrylate polymers are formed from hydroxy-functional monomers, such as 2-hydroxyethyl methacrylate, 2-hydroxypropyl methacrylate and 3,4-dihydroxybutyl methacrylate. Epoxy-functionalized acrylate or methacrylate polymers are obtained using epoxy-functional monomers such as glycidyl methacrylate, 2,3-epoxybutyl methacrylate, 3,4-epoxybutyl methacrylate, 2,3-epoxycyclohexyl methacrylate, 10,11-epoxyundecyl methacrylate etc. Similarly, for example, isocyanate-functionalized polymers may be prepared from isocyanate-functionalized monomers, such as meta-isopropenyl-α,α-dimethylbenzyl isocyanate, for example.

Particularly suitable compounds are, for example, esters of ethylenically unsaturated monofunctional or polyfunctional carboxylic acids and polyols or polyepoxides, and polymers containing ethylenically unsaturated groups in the chain or in side groups, such as unsaturated polyesters, polyamides and polyurethanes and copolymers thereof, alkyd resins, polybutadiene and butadiene copolymers, polyisoprene and isoprene copolymers, polymers and copolymers containing (meth)acrylic groups in side chains, and also mixtures of one or more such polymers.

Examples of suitable monofunctional or polyfunctional unsaturated carboxylic acids are acrylic acid, methacrylic acid, crotonic acid, itaconic acid, cinnamic acid, maleic acid, fumaric acid, unsaturated fatty acids such as linolenic acid or oleic acid. Acrylic acid and methacrylic acid are preferred.

It is, however, also possible to use saturated dicarboxylic or polycarboxylic acids in a mixture with unsaturated carboxylic acids. Examples of suitable saturated dicarboxylic or polycarboxylic acids include tetrachlorophthalic acid, tetrabromophthalic acid, phthalic acid, trimellitic acid, heptanedicarboxylic acid, sebacic acid, dodecanedicarboxylic acid, hexahydrophthalic acid, etc.

Suitable polyols include aromatic and especially aliphatic and cycloaliphatic polyols. Preferred Examples of aromatic polyols are hydroquinone, 4,4'-dihydroxybiphenyl, 2,2-di(4-hydroxyphenyl)propane, and also novolaks and resols. Examples of polyepoxides are those based on the aforementioned polyols, especially the aromatic polyols, and epichlorhydrin. Further suitable polyols include polymers and copolymers containing hydroxyl groups in the polymer chain or in side groups, such as polyvinyl alcohol and copolymers thereof or polyhydroxyalkyl methacrylates or copolymers thereof, for example. Oligoesters containing hydroxyl end groups are further suitable polyols.

Examples of aliphatic and cycloaliphatic polyols are alkylenediols having preferably from 2 to 12 carbon atoms, such as ethylene glycol, 1,2- or 1,3-propanediol, 1,2-, 1,3- or 1,4-butanediol, pentanediol, hexanediol, octanediol, dodecanediol, diethylene glycol, triethylene glycol, polyethylene glycols having molecular weights of preferably from 200 to 1500, 1,3-cyclopentanediol, 1,2-, 1,3- or 1,4-cyclohexanediol, 1,4-dihydroxymethylcyclohexane, glycerol, tris(β-hydroxyethyl)amine, trimethylolethane, trimethylolpropane, pentaerythritol, dipentaerythritol and sorbitol.

The polyols may have been partly or fully esterified with one or more different unsaturated carboxylic acids, the free hydroxyl groups in partial esters possibly having been modified, e.g. etherified or esterified with other carboxylic acids. Examples of such esters are for example trimethylolpropane triacrylate, trimethylolethane triacrylate, trimethylolpropane trimethacrylate, trimethylolethane trimethacrylate, tetramethylene glycol dimethacrylate, triethylene glycol dimethacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, pentaerythritol dimethacrylate, pentaerythritol trimethacrylate, dipentaerythritol dimethacrylate, dipentaerythritol tetramethacrylate, tri pentaerythritol octamethacrylate, pentaerythritol diitaconate, dipentaerythritol trisitaconate, dipentaerythritol pentaitaconate, dipentaerythritol hexaitaconate, ethylene glycol diacrylate, 1,3-butanediol diacrylate, 1,3-butanediol dimethacrylate, 1,4- butanediol diitaconate, sorbitol triacrylate, sorbitol tetraacrylate, modified pentaerythritol triacrylate, sorbitol tetramethacrylate, sorbitol pentaacrylate, sorbitol hexaacrylate, oligoester acrylates and methacrylates, glycerol diacrylate and triacrylate, 1,4-cyclohexane diacrylate, bisacrylates and bismethacryletes of polyethylene glycol having a molecular weight from 200 to 1500, or mixtures thereof.

Suitable UV-curable resins include the amides of identical or different unsaturated carboxylic acids with aromatic, cycloaliphatic and aliphatic polyamines having preferably from 2 to 6, particularly from 2 to 4 amino groups. Examples of such polyamines are ethylenediamine, 1,2- or 1,3-propylenediamine, 1,2-, 1,3- or 1,4-butylenediamine, 1,5-pentylenediamine, 1,6-hexylenediamine, octylenediamine, dodecylenediamine, 1,4-diaminocyclohexane, isophoronediamine, phenylenediamine, bisphenylenediamine, di-β-aminoethyl ether, diethylenetriamine, triethylenetetramine, di(β-aminoethoxy)- or di(β-aminopropoxy)ethane. Further suitable polyamines are polymers and copolymers containing possibly additional amino groups in the side chain, and oligoamides having amino end groups. Examples of such unsaturated amides are methylenebisacrylamide, 1,6-hexamethylenebisacrylamide, diethylenetriaminetrismethacrylamide, bis(methacrylamidopropoxy)ethane, β-methacrylamidoethyl methacrylate, and N-[(β-hydroxyethoxy)ethyl]acrylamide.

Suitable unsaturated polyesters and polyamides are derived, for example, from maleic acid and diols or diamines. The maleic acid may have been replaced in part by other dicarboxylic acids. They may be used together with ethylenically unsaturated comonomers, e.g. styrene. The polyesters and polyamides may also be derived from dicarboxylic acids and ethylenically unsaturated diols or diamines, especially from relatively long chain ones having, for example, from 6 to 20 carbon atoms. Examples of polyurethanes are those synthesized from saturated or unsaturated diisocyanates and unsaturated or saturated diols, respectively.

Polybutadiene and polyisoprene and copolymers thereof are known. Examples of suitable comonomers are olefins such as ethylene, propene, butene, hexene, (meth)acrylates, acrylonitrile, styrene or vinyl chloride. Polymers containing (meth)acrylate groups in the side chain are likewise known. They may comprise, for example, reaction products of novolak-based epoxy resins with (meth)acrylic acid, homopolymers or copolymers of vinyl alcohol or the hydroxyalkyl derivatives thereof that have been esterified with (meth)acrylic acid, or homopolymers and copolymers of (meth)acrylates esterified with hydroxyalkyl (meth)acrylates.

The UV-curable resins may be used alone or in any desired mixtures. Preference is given to using mixtures of polyol (meth)acrylates.

It is also possible to add binders to the compositions of the invention, which is especially appropriate when the photopolymerizable compounds are liquid or viscous substances. The amount of the binder can be for example 5-95, preferably 10-90 and especially 40-90% by weight, based on the overall solids. The choice of binder is made depending on the field of use and the properties required for that field, such as developability in aqueous and organic solvent systems, adhesion to substrates, and oxygen sensitivity, for example.

The unsaturated compounds may also be used in a mixture with non-photopolymerizable film-forming components. These may be, for example, physically, drying polymers or their solutions in organic solvents, such as nitrocellulose or cellulose acetobutyrate, for example. They may also, however, be chemically and/or thermally curable resins, such as polyisocyanates, polyepoxides or melamine resins, for example. By melamine resins are meant not only condensates of melamine (1,3,5-triazine-2,4,6-triamine) but also those of melamine derivatives. In general, the components comprise a film-forming binder based on a thermoplastic or thermosettable resin, predominantly on a thermosettable resin. Examples thereof are alkyd, acrylic, polyester, phenolic, melamine, epoxy and polyurethane resins and mixtures thereof. The additional use of thermally curable resins is of importance for use in what are known as hybrid systems, which may be both photopolymerized and also thermally crosslinked.

Component (a) may comprise, for example, a coating composition comprising (a1) compounds containing one or more free-radically polymerizable double bonds and further containing at least one other functional group which is reactive in the sense of an addition reaction and/or condensation reaction (examples have been given above), (a2) compounds containing one or more free-radically polymerizable double bonds and further containing at least one other functional group which is reactive in a sense of an addition reaction and/or condensation reaction, the additional reactive functional group being complementary to or reactive toward the additional reactive functional groups of component (a1), (a3) if desired, at least one monomeric, oligomeric and/or polymeric compound containing at least one functional group which is reactive in the sense of an addition reaction and/or condensation reaction toward the functional groups from component (a1) or component (a2) that are present in addition to the free-radically polymerizable double bonds.

Component (a2) carries in each case the groups which are reactive toward or complementary to component (a1). In this context it is possible in each case for different kinds of functional groups to be present in one component. In component (a3) there is a further component available containing functional groups which are reactive in the sense of addition reactions and/or condensation reactions and which are able to react with the functional groups of (a1) or (a2) that are present in addition to the free-radically polymerizable double bonds. Component (a3) contains no free-radically polymerizable double bonds. Examples of such combinations of (a1), (a2), (a3) can be found in WO-A-99/55785. Examples of suitable reactive functional groups are selected, for example, from hydroxyl, isocyanate, epoxide, anhydride, carboxyl or blocked amino groups. Examples have been described above.

In addition, the following coating systems are of interest as component (a) of the coating compositions:
1. surface coatings based on cold- or hot-crosslinkable alkyd, acrylate, polyester, epoxy or melamine resins or mixtures of such resins, optionally with the addition of a curing catalyst;
2. two-component polyurethane surface coatings based on hydroxyl-group-containing acrylate, polyester or polyether resins and aliphatic or aromatic isocyanates, isocyanurates or polyisocyanates;
3. two-component polyurethane surface coatings based on thiol-group-containing acrylate, polyester or polyether resins and aliphatic or aromatic isocyanates, isocyanurates or polyisocyanates;
4, one-component polyurethane surface coatings based on blocked isocyanates, isocyanurates or polyisocyanates which are deblocked during stoving; the addition of melamine resins is also possible, if desired;
5. one-component polyurethane surface coatings based on aliphatic or aromatic urethanes or polyurethanes and hydroxyl-group-containing acrylate, polyester or polyether resins;

6. one-component polyurethane surface coatings based on aliphatic or aromatic urethane acrylates or polyurethane acrylates having free amine groups in the urethane structure and melamine resins or polyether resins, optionally with the addition of a curing catalyst;
7. two-component surface coatings based on (poly)ketimines and aliphatic or aromatic isocyanates, isocyanurates or polyisocyanates;
8. two-component surface coatings based on (poly)ketimines and an unsaturated acrylate resin or a polyacetoacetate resin or a methacrylamidoglycolate methyl ester;
9. two-component surface coatings based on carboxyl- or amino-group-containing polyacrylates and polyepoxides;
10. two-component surface coatings based on anhydride-group-containing acrylate resins and a polyhydroxy or polyamino component;
11. two-component surface coatings based on acrylate-containing anhydrides and polyepoxides;
12. two-component surface coatings based on (poly)oxazolines and anhydride-group-containing acrylate resins or unsaturated acrylate resins or aliphatic or aromatic isocyanates, isocyanurates or polyisocyanates;
13. two-component surface coatings based on unsaturated (poly)acrylates and (poly)malonates;
14. thermoplastic polyacrylate surface coatings based on thermoplastic acrylate resins or extrinsically crosslinking acrylate resins in combination with etherified melamine resins;
15. surface-coating systems, especially clearcoats, based on malonate-blocked isocyanates with melamine resins (e.g. hexamethoxymethylmelamine) as crosslinkers (acid-catalysed);
16. UV-curable systems based on oligomeric urethane acrylates and/or acylate acrylates, optionally with the addition of other oligomers or monomers;
17. dual-cure systems, which are cured first thermally and then by UV, or vice versa, the constituents of the surface-coating formulation containing double bonds that can be caused to react by UV light and photoinitiators and/or by electron-beam curing.

Furthermore, there come into consideration coating systems which are based on siloxanes. Such coating systems are described, for example, in WO-A-98/56852, WO-A-98/56853, DE-A-2914427 and DE-A-4338361.

Component (b) can also find use in resists, micro resists or solder masks for printed circuit boards, especially for improving the scratch resistance thereof.

Preferably, component (b) is added to the material to be stabilized, compatibilized, flame-retarded and/or polymerization regulated in an amount from 0.01 to 80%, in particular 1 to 50%, for example 2 to 20%, relative to the weight of the organic material to be stabilized, compatibilized, flame-retarded and/or polymerization regulated.

In general, the compositions according to the invention can contain, in addition to components (a) and (b), additional additives, for example, from the group consisting of pigments, dyes, fillers, flow control agents, dispersants, thixotropic agents, adhesion promoters, antioxidants, light stabilizers and curing catalysts such as, for example, the following:

1. Antioxidants
1.1. Alkylated monophenols, for example 2,6-di-tert-butyl-4-methylphenol, 2-tert-butyl-4,6-dimethylphenol, 2,6-di-tert-butyl-4-ethylphenol, 2,6-di-tert-butyl-4-n-butylphenol, 2,6-di-tert-butyl-4-isobutyl phenol, 2,6-dicyclopentyl-4-methyl phenol, 2-(α-methylcyclohexyl)-4,6-dimethylphenol, 2,6-dioctadecyl-4-methylphenol, 2,4,6-tricyclohexylphenol, 2,6-di-tert-butyl-4-methoxymethylphenol, nonylphenols which are linear or branched in the side chains, for example, 2,6-di-nonyl-4-methylphenol, 2,4-dimethyl-6-(1'-methylundec-1'-yl)phenol, 2,4-dimethyl-6-(1'-methyl heptadec-1'-yl)phenol, 2,4-dimethyl-6-(1'-methyltridec-1'-yl)phenol and mixtures thereof.

1.2. Alkylthiomethylphenols, for example 2,4-dioctylthiomethyl-6-tert-butylphenol, 2,4-dioctylthiomethyl-6-methyl phenol, 2,4-dioctylthiomethyl-6-ethyl phenol, 2,6-di-dodecylthiomethyl-4-nonylphenol, 1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl)adipate.

1.4. Tocopherols, for example α-tocopherol, β-tocopherol, γ-tocopherol, δ-tocopherol and mixtures thereof (vitamin E).

1.5. Hydroxylated thiodiphenyl ethers, for example 2,2'-thiobis(6-tart-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidenebisphenols, for example 2,2-methylenebis(6-tart-butyl-4-methylphenol), 2,2'-methylenebis(6-tert-butyl-4-ethylphenol), 2,2'-methylenebis[4-methyl-6-(α-methylcyclohexyl)phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl) butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methyl phenyl]terephthalate, 1,1-bis-(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra-(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzylmercaptoacetate.

1.8. Hydroxybenzylated malonates, for example dioctadecyl-2,2-bis(3,5-di-tert-butyl-2-hydroxybenzyl)malonate, di-octadecyl-2-(3-tert-butyl-4-hydroxy-5-methylbenzyl)malonate, di-dodecylmercaptoethyl-2,2-bis(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

1.9. Aromatic hydroxybenzyl compounds, for example 1,3,5-tris(3,5-di-tert-butyl-4-hydroxybenzyl)-2,4,6-trimethyl benzene, 1,4-bis(3,5-di-tert-butyl-4-hydroxybenzyl)-2,3,5,6-tetramethylbenzene, 2,4,6-tris(3,5-di-tert-butyl-4-hydroxybenzyl)phenol.

1.10. Triazine compounds, for example 2,4-bis(octylmercapto)-6-(3,5-di-tert-butyl-4-hydroxyanilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris(3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3,5-triazine, 1,3,5-tris(3,5-dicyclohexyl-4-hydroxybenzyl)isocyanurate.

1.11. Benzylphosphonates, for example dimethyl-2,5-di-tert-butyl-4-hydroxybenzylphosphonate, diethyl-3,5-di-tert-buty-4-hydroxybenzyl phosphonate, dioctadecyl3,5-di-tert-buty-4-hydroxybenzylphosphonate, dioctadecyl-5-tert-buty-4-hydroxy-3-methyl benzylphosphonate, the calcium salt of the monoethyl ester of 3,5-di-tert-butyl-4-hydroxybenzylphosphonic acid.

1.12. Acylaminophenols, for example 4-hydroxylauranilide, 4-hydroxystearanilide, octyl N-(3,5-di-tert-butyl-4-hydroxyphenyl)carbamate.

1.13. Esters of β-(3,5-di-tert-butyl-4-hydroxyphenyl)propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or polyhydric alcohols, e.g. with methanol, ethanol, n-octanol, i-octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]-undecane.

1.15. Esters β-(3,5-dicyclohexyl-4-hydroxyphenyl)propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl)oxamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide, N,N'-bis[2-(3-[3,5-di-tert-butyl-4-hydroxyphenyl]propionyloxy)ethyl]oxamide (Naugaurd® XL-1, supplied by Uniroyal).

1.18. Ascorbic acid (vitamin C)

1.19. Aminic antioxidants, for example N,N'-di-isopropyl-p-phenylenediamine, N,N'-di-secbutyl-p-phenylenediamine, N,N'-bis(1,4-dimethylpentyl)-p-phenylenediamine, N,N'-bis (1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-bis(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfamoyl)diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, bis(4-methoxyphenyl)amine, 2,6-di-tert-butyl-4-dimethylaminomethylphenol, 2,4'-diaminadiphenylmethane, 4,4'-diaminodiphenylmethane, N,N,N'N'-tetramethyl-4,4'-diaminodiphenylmethane, 1,2-bis[(2-methylphenyl)amino] ethane, 1,2-bis(phenylamino)propane, (o-tolyl)biguanide, bis[4-(1',3'-dimethylbutyl)phenyl]amine, tert-octylated N-phenyl-1-naphthylamine, a mixture of mono- and dialkylated tert-butyl/tert-octyldiphenyl-amines, a mixture of mono- and dialkylated nonyldiphenylamines, a mixture of mono- and dialkylated dodecyldiphenylamines, a mixture of mono- and dialkylated isopropyl/isohexyl-diphenylamines, a mixture of mono- and dialkylated tert-butyldiphenylamines, 2,3-dihydro-3,3-dimethyl-4H-1,4-benzothiazine, phenothiazine, a mixture of mono- and dialkylated tert-butyl/tert-octylphenothiazines, a mixture of mono- and dialkylated tert-octyl-phenothiazines, N-allylphenothiazine, N,N,N',N'-tetraphenyl-1,4-diaminobut-2-ene.

2. UV Absorbers and Light Stabilizers 2.1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'-tert-butyl-2'-hydroxyphenyl)benzotriazole, 2-(2'-hydroxy-5'-(1,1,3,3-tetramethylbutyl)phenyl)benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxyphenyl)benzotriazole, 2-(3',5'-bis-(α,α-dimethylbenzyl)-2'-hydroxyphenyl)benzotriazole, 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2-hydroxy-5'-(2-methoxycarbonylethyl)phenyl)benzotriazole, 2-(3'-tert-butyl-2'-hydroxy-5'-(2-octyloxycarbonylethyl)phenyl)benzotriazole, 2-(3'-tert-butyl-5'-[2-(2-ethylhexyloxy)carbonylethyl]-2'-hydroxy-phenyl) benzotriazole, 2-(3'-dodecyl-2'-hydroxy-5'-methylphenyl)

benzotriazole, 2-(3'-tert-butyl-2'-hydroxy-5'-(2-isooctyloxycarbonylethyl)phenylbenzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300; [R—CH$_2$CH$_2$—COO—CH$_2$CH$_2$—]$_2$], where R=3'-tert-butyl-4'-hydroxy-5'-2H-benzotriazol-2-yl phenyl, 2-[2'-hydroxy-3'-(α,α-dimethylbenzyl)-5'-(1,1,3,3-tetramethylbutyl)phenyl]benzotriazole; 2-[2'-hydroxy-3'-(1,1,3,3-tetramethylbutyl)-5'-(α,α-dimethylbenzyl)phenyl]benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy and 2'-hydroxy-4,4'-dimethoxy derivatives.

2.3. Esters of substituted and unsubstituted benzoic acids, for example 4-tert-butyl-phenyl salicylate, phenyl salicylate, octylphenyl salicylate, dibenzoyl resorcinol, bis(4-tert-butylbenzoyl)resorcinol, benzoyl resorcinol, 2,4-di-tert-butylphenyl 3,5-di-tert-buty-4-hydroxybenzoate, hexadecyl 3,5-di-tert-butyl-4-hydroxybenzoate, octadecyl 3,5-di-tert-butyl-4-hydroxybenzoate, 2-methyl-4,6-di-tert-butylphenyl 3,5-di-tert-butyl-4-hydroxybenzoate.

2.4. Acrylates, for example ethyl α-cyano-β,β-diphenylacrylate, isooctyl α-cyano-β,β-diphenylacrylate, methyl α-carbomethoxycinnamate, methyl α-cyano-β-methyl-p-methoxycinnamate, butyl α-cyano-β-methyl-p-methoxycinnamate, methyl α-carbomethoxy-p-methoxycinnamate, N-(β-carbomethoxy-β-cyanovinyl)-2-methylindoline, neopentyl tetra(α-cyano-β,β-diphenylacrylate.

2.5. Nickel compounds, for example nickel complexes of 2,2'-thio-bis[4-(1,1,3,3-tetramethylbutyl)phenol], such as the 1:1 or 1:2 complex, with or without additional ligands such as n-butylamine, triethanolamine or N-cyclohexyldiethanolamine, nickel dibutyldithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenylundecylketoxime, nickel complexes of 1-phenyl-4-lauroyl-5-hydroxypyrazole, with or without additional ligands.

2.6. Sterically hindered amines, for example bis(2,2,6,6-tetramethyl-4-piperidyl)sebacate, bis(2,2,6,6-tetramethyl-4-piperidyl)succinate, bis(1,2,2,6,6-pentamethyl-4-piperidyl)sebacate, bis(1-octyloxy-2,2,6,6-tetramethyl-4-piperidyl) sebacate, bis(1,2,2,6,6-pentamethyl-4-piperidyl) n-buty-3,5-di-tert-butyl-4-hydroxybenzylmalonate, the condensate of 1-(2-hydroxyethyl)-2,2,6,6-tetramethyl-4-hydroxypiperidine and succinic acid, linear or cyclic condensates of N,N'-bis(2,2,6,6-tetramethyl-4-piperidyl)hexamethylenediamine and 4-tert-octylamino-2,6-dichloro-1,3,5-triazine, tris(2,2,6,6-tetramethyl-4-piperidyl)nitrilotriacetate, tetrakis(2,2,6,6-tetramethyl-4-piperidyl)-1,2,3,4-butanetetracarboxylate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl)malonate, 3-n-octyl-7,7,9,9-tetramethyl-1,3,8-triazaspiro[4.5]decane-2,4-dione, bis(1-octyloxy-2,2,6,6-tetramethylpiperidyl)sebacate, bis(1-octyloxy-2,2,6,6-tetramethylpiperidyl)succinate, linear or cyclic condensates of N,N'-bis(2,2,6,6-tetramethyl-4-piperidyl)hexamethylenediamine and 4-morpholino-2,6-dichloro-1,3,5-triazine, the condensate of 2-chloro-4,6-bis(4-n-butylamino-2,2,6,6-tetramethylpiperidyl)-1,3,5-triazine and 1,2-bis(3-aminopropylamino)ethane, the condensate of 2-chloro-4,6-di-(4-n-butylamino-1,2,2,6,6-pentamethylpiperidyl)-1,3,5-triazine and 1,2-bis(3-aminopropylamino)ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl) pyrrolidine-2,5-dione, a mixture of 4-hexadecyloxy- and 4-stearyloxy-2,2,6,6-tetramethylpiperidine, a condensate of N,N'-bis(2,2,6,6-tetra methyl-4-piperidyl)hexamethylenediamine and 4-cyclohexylamino-2,6-dichloro-1,3,5-triazine, a condensate of 1,2-bis(3-aminopropylamino)ethane and 2,4,6-trichloro-1,3,5-triazine as well as 4-butylamino-2,2,6,6-tetramethylpiperidine (CAS Reg. No. [136504-96-6]); a condensate of 1,6-hexanediamine and 2,4,6-trichloro-1,3,5-triazine as well as N,N-dibutylamine and 4-butylamino-2,2,6,6-tetramethylpiperidine (CAS Reg. No. [192268-64-7]); N-(2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxospiro[4,5]decane, a reaction product of 7,7,9,9-tetramethyl-2-cycloundecyl-1-oxa-3,8-diaza-4-oxospiro-[4,5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, a diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, a reaction product of maleic acid anhydride-α-olefin copolymer with 2,2,6,6-tetramethyl-4-aminopiperidine or 1,2,2,6,6-pentamethyl-4-aminopiperidine, 2,4-bis[N-(1-cyclohexyloxy-2,2,6,6-tetramethylpiperidine-4-yl)-N-butylamino]-6-(2-hydroxyethyl)amino-1,3,5-triazine, 1-(2-hydroxy-2-methylpropoxy)-4-octadecanoyloxy-2,2,6,6-tetramethylpiperidine, 5-(2-ethylhexanoyl)oxymethyl-3,3,5-trimethyl-2-morpholinone, Sanduvor (Clariant; CAS Reg. No. 106917-31-1], 5-(2-ethylhexanoypoxymethyl-3,3,5-trimethyl-2-morpholinone, the reaction product of 2,4-bis[(1-cyclohexyloxy-2,2,6,6-piperidine-4-yl)butylamino]-6-chloro-s-triazine with N,N'-bis(3-aminopropyl)ethylenediamine), 1,3,5-tris(N-cyclohexyl-N-(2,2,6,6-tetramethylpiperazine-3-one-4-yl)amino)-s-triazine, 1,3,5-tris(N-cyclohexyl-N-(1,2,2,6,6-pentamethylpiperazine-3-one-4-yl)amino)-s-triazine.

2.7. Oxamides, for example 4,4'-dioctyloxyoxanilide, 2,2'-diethoxyoxanilide, 2,2-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tort-butoxanilide, mixtures of o- and p-methoxy-disubstituted oxanilides and mixtures of o- and p-ethoxy-disubstituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropoxy)phenyl]-4,6-bis(2,4-dimethyl)-1,3,5-triazine, 2-[2-hydroxy-4-(2-hydroxy-3-octyloxypropyloxy)phenyl]-4,6-bis(2,4-dimethyl)-1,3,5-triazine, 2-[4-(dodecyloxy/tridecyloxy-2-hydroxypropoxy)-2-hydroxyphenyl]-4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)-1,3,5-triazine, 2-(2-hydroxy-4-hexyloxy)

phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine, 2,4-bis(4-[2-ethylhexyloxy]-2-hydroxyphenyl)-6-(4-methoxyphenyl)-1,3,5-triazine.

3. Metal deactivators, for example N,N'-diphenyloxamide, N-salicylal-N'-salicyloyl hydrazine, N,N'-bis(salicyloyl)hydrazine, N,N'-bis(3,5-di-tert-butyl-4-hydroxyphenylpropionyl)hydrazine, 3-salicyloylamino-1,2,4-triazole, bis(benzylidene)oxalyl dihydrazide, oxanilide, isophthaloyl dihydrazide, sebacoyl bisphenylhydrazide, N,N'-diacetyledipoyl dihydrazide, N,N'-bis(salicyloyl)oxalyl dihydrazide, N,N'-bis(salicyloyl)thiopropionyl dihydrazide.

4. Phosphites and phosphonites, for example triphenyl phosphite, diphenylalkyl phosphites, phenyldialkyl phosphites, tris(nonylphenyl)phosphite, trilauryl phosphite, trioctadecyl phosphite, distearylpentaerythritol diphosphite, tris(2,4-di-tert-butylphenyl)phosphite, diisodecyl pentaerythritol diphosphite, bis(2,4-di-tert-butylphenyl)pentaerythritol diphosphite, bis(2,4-di-cumylphenyl)pentaerythritol diphosphite, bis(2,6-di-tert-butyl-4-methylphenyl)pentaerythritol diphosphite, diisodecyloxypentaerythritol diphosphite, bis(2,4-di-tert-butyl-6-methylphenyl)pentaerythritol diphosphite, bis(2,4,6-tris(tert-butylphenyl)pentaerythritol diphosphite, tristearyl sorbitol triphosphate, tetrakis(2,4-di-tert-butylphenyl) 4,4'-biphenylene diphosphonite, 6-isooctyloxy-2,4,8,10-tetra-tert-butyl-12H-dibenz[d,g]-1,3,2-dioxaphosphocin, bis(2,4-di-tert-butyl-6-methylphenyl) methyl phosphite, bis(2,4-di-tert-butyl-6-methylphenyl) ethyl phosphite, 6-fluoro-2,4,8,10-tetra-tert-butyl-12-methyl-dibenz[d,g]-1,3,2-dioxaphosphocin, 2,2',2''-nitrilo[triethyltris(3,3',5,5'-tetra-tert-butyl-1,1'-biphenyl-2,2'-diyl) phosphite], 2-ethylhexyl(3,3',5,5'-tetra-tert-butyl-1,1'-biphenyl-2,2'-diyl)phosphite, 5-butyl-5-ethyl-2-(2,4,6-tri-tert-butyl phenoxy)-1,3,2-dioxaphosphirane.

5. Hydroxyamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecylhydroxylamine, N,N-dioctadecylhydroxylamine, N-hexadecyl-N-octadecylhydroxylamine, N-heptadecyl-N-octadecylhydroxylamine, N,N-dialkylhydroxyamine derived from hydrogenated tallow amine.

6. Nitrones, for example, N-benzyl-alpha-phenylnitrone, N-ethyl-alpha-methylnitrone, N-octyl-alpha-heptylnitrone, N-lauryl-alpha-undecylnitrone, N-tetradecyl-alpha-tridecylnnitrone, N-hexadecyl-alpha-pentadecylnitrone, N-octadecyl-alpha-heptadecylnitrone, N-hexadecylalpha-heptadecylnitrone, N-ocatadecyl-alpha-pentadecylnitrone, N-heptadecyl-alpha-heptadecylnitrone, N-octadecyl-alpha-hexadecylnitrone, nitrone derived from N,N-dialkylhydroxylamine derived from hydrogenated tallow amine.

7. Thiosynergists, for example dilauryl thiodipropionate, dimistryl thiodipropionate, distearyl thiodipropionate or distearyl disulfide.

8. Peroxide scavengers, for example esters of β-thiodipropionic acid, for example the lauryl, stearyl, myrislyl or tridecyl esters, mercaptobenzimidazole or the zinc salt of 2-mercaptobenzimidazole, zinc dibutyldithiocarbamate, dioctadecyl disulfide, pentaerythritol tetrakis(β-dodecyl mercapto)propionate.

9. Polyamide stabilizers, for example copper salts in combination with iodides and/or phosphorus compounds and salts of divalent manganese.

10. Basic co-stabilizers, for example melamine, polyvinylpyrrolidone, dicyandiamide, triallyl cyanurate, urea derivatives, hydrazine derivatives, amines, polyamides, polyurethanes, alkali metal salts and alkaline earth metal salts of higher fatty adds, for example calcium stearate, zinc stearate, magnesium behenate, magnesium stearate, sodium ricinoleate and potassium palmitate, antimony pyrocatecholate or zinc pyrocatecholate.

11. Nucleating agents, for example inorganic substances, such as talcum, metal oxides, such as titanium dioxide or magnesium oxide, phosphates, carbonates or sulfates of, preferably, alkaline earth metals; organic compounds, such as mono- or polycarboxylic acids and the salts thereof, e.g. 4-tert-butylbenzoic acid, adipic acid, diphenylacetic acid, sodium succinate or sodium benzoate; polymeric compounds, such as ionic copolymers (ionomers). Especially preferred are 1,3:2,4-bis(3',4'-dimethylbenzylidene)sorbitol, 1,3:2,4-di(paramethyldibenzylidene)sorbitol, and 1,3:2,4-di(benzylidene)sorbitol.

12. Fillers and reinforcing agents, for example calcium carbonate, silicates, glass fibres, glass beads, asbestos, talc, kaolin, mica, barium sulfate, metal oxides and hydroxides, carbon black, graphite, wood flour and flours or fibers of other natural products, synthetic fibers.

13. Other additives, for example plasticisers, lubricants, emulsifiers; pigments, rheology additives, catalysts, flow-control agents, optical brighteners, flameproofing agents, antistatic agents and blowing agents.

14. Benzofuranones and indolinones, for example those disclosed in U.S. Pat. No. 4,325,863; U.S. Pat. No. 4,338,244; U.S. Pat. No. 5,175,312; U.S. Pat. No. 5,216,052; U.S. Pat. No. 5,252,643; DE-A-4316611; DE-A-4316622; DE-A-4316876; EP-A-0589839, EP-A-0591102; EP-A-1291384 or 3-[4-(2-acetoxyethoxy)phenyl]-5,7-di-tert-butyl benzofuran-2-one, 5,7-di-tert-butyl-3-[4-(2-stearoyloxyethoxy)phenyl]benzofuran-2-one, 3,3'-bis[5,7-di-tert-butyl-3-(4-[2-hydroxyethoxy]phenyl)benzofuran-2-one], 5,7-di-tert-butyl-3-(4-ethoxyphenyl)benzofuran-2-one, 3-(4-acetoxy-3,5-dimethylphenyl)-5,7-di-tert-butylbenzofuran-2-one, 3-(3,5-dimethyl-4-piveloyloxyphenyl)-5,7-di-tert-butyl benzofuran-2-one, 3-(3,4-dimethyl phenyl)-5,7-di-tert-butyl benzofuran-2-one, 3-(2,3-dimethylphenyl)-5,7-di-tert-butyl-benzofuran-2-one, 3-(2-acetyl-5-isooctyl phenyl)-5-isooctylbenzofuran-2-one.

The additional additives are added, for example, in concentrations of 0.01 to 10%, relative to the total weight of the material to be stabilized, flame protected and/or compatibilized.

In general, incorporation of component (b) and, if desired, further additives into the polymeric, organic material is carried out by known methods, for example before or during moulding or else by applying the dissolved or dispersed compounds to the polymeric, organic material, if appropriate with subsequent slow evaporation of the solvent. Component (b) can also be added to the materials to be stabilized in the form of a masterbatch or a colloidal sol or organosol containing for example 5 to 50% by weight of component (b).

Component (b) can also be added before or during polymerisation or before crosslinking.

Component (b) can be incorporated into the material to be stabilized and/or compatibilized in pure form or encapsulated in waxes, oils or polymers.

Component (b) can also be sprayed onto the material to be stabilized, compatibilized, flame-retarded and/or polymerized.

The materials thus treated as mentioned above can be used in various forms, for example as films, fibres, ribbons, moulded materials, profiles, coatings or as binders for paints, adhesives or cement.

The present invention further provides a process for stabilizing, flame-retarding and/or compatibilizing an organic material which is subject to oxidative, thermal or light-induced degradation, which comprises incorporating therein, or applying thereto, at least a functionalized nanoparticle of the present invention comprising on the surface at least a radical of the formula I and optionally a radical of the formula II.

The present invention also provides a process for photoinitiating in-situ polymerization or hardening of a pre-polymeric nanocomposite or sol to a nanocomposite material, which comprises incorporating therein, or applying thereto, at least a functionalized nanoparticle of the present invention comprising on the surface at least a radical of the formula I and optionally a radical of the formula II.

A further embodiment of the present invention is the use of a functionalized nanoparticle of the present invention comprising on the surface at least a radical of the formula I and optionally a radical of the formula II as stabilizer and/or flame-retarder and/or compatibilizer for organic materials which are subject to oxidative, thermal or light-induced degradation.

The present invention also provides the use of a functionalized nanoparticle of the present invention comprising on the surface at least a radical of the formula I and optionally a radical of the formula II as photoinitiator for the in-situ polymerization or hardening of pre-polymeric nanocomposites or sols to nanocomposite materials.

A preferred embodiment of the present invention is also the use of component (b) as reinforcer of coatings and improver of scratch resistance in coating compositions for surfaces.

The present invention also relates to a process for protecting a substrate, which comprises applying thereto a coating composition comprising components (a) and (b) and then drying and/or curing it.

The present invention likewise relates to a process for preparing a reinforced coating with improved scratch resistance on a surface, which comprises treating this surface with a coating composition comprising components (a) and (b), and then drying and/or curing it.

The preferred functionalized nanoparticles and organic materials for the process and use are the same as those for the compositions according to the invention.

The following Examples illustrate the invention in more detail. Parts or percentages are by weight.

EXAMPLE 1

Preparation of 3-Aminopropylsilane Modified Silica Nanoparticles 510 g of Ludox TMA® [available from Helm AG; 34% nanosilica dispersion in water] is mixed with 2490 g of ethanol. 345 g 3-aminopropyltrimethoxysilane (Fluka purum) is added dropwise to this homogeneous mixture. After the addition, the mixture is heated at 50° C. for 18 hours. The volume of this mixture is then reduced to ca. 1 liter by evaporating ethanol/water in the rotary evaporator. A total of 4 liter of hexane is added, the mixture is shaken vigorously and the two phases separated in a separation funnel to remove unreacted aminosilane. The aqueous/ethanolic lower phase is concentrated to a wet paste in the rotary evaporator in vacuo and then resuspended in 1 liter of ethanol. A total of 1199 g solution is obtained with a solid content of 27.3 wt. %. Thermographimetric analysis (TGA; heating rate: 10° C./min from 50®C to 600° C.): Weight loss: 25.2% corresponding to the organic material. Elemental analysis: found: C, 17.68%, H, 4.65%, N, 6.73%: corresponding to an organic content of 28.1% in relatively good agreement to the TGA value. Transmission Electron Microscopy (TEM): An average diameter of 35-40 nm is obtained for the individual nanoparticles. Dynamic light scattering (DLS): Average diameter d=90-110 nm.

EXAMPLE 2

Preparation of Propylsilane and 3-Aminopropylsilane Modified Silica Nanoparticles 50 g of Ludox TMA® [available from Helm AG, 34% nanosilica dispersion in water] is mixed with 250 ml of ethanol. Then is added a mixture of 2.29 g (12.8 mmol) 3-aminopropyltrimethoxysilane (Fluka purum) and 8.42 g (51.3 mmol) of propyltrimethoxysilane (Fluka purum) dropwise during 15 minutes with stirring. After the addition, the mixture is heated at 50° C. for 16 hours. The reaction mixture is centrifuged (1 hour, 2000 rpm) and the sedimented product redispersed in 200 ml of ethanol followed by a second centrifugation (1 hour, 2000 rpm). The sedimented product is re-dispersed in 70 ml toluene to give a dispersion with a solid content of 13.5 wt. %. Thermographimetric analysis (TGA; heating rate: 10° C./min from 50° C. to 600° C.): Weight loss: 5.9% corresponding to the organic material. Elemental analysis: found: C, 4.70%, H, 1,22%, N, 0.37%: corresponding to an aminopropyl content of 2.36 wt. % and a n-propyl content of 3.53 wt. %. Dynamic light scattering (DLS): Average diameter d=69 nm.

EXAMPLE 3

Preparation of Hexadecylsilane and 3-Aminopropylsilane Modified Silica Nanoparticles 138.8 g of Ludox TMA® [available from Helm AG, 34% nanosilica dispersion in water] is mixed with 1.4 liter of ethanol. Then is added a mixture of 47.2 g (263.3 mmol) of 3-aminopropyltrimethoxysilane (Fluka purum) and 47.2 g (1362 mmol) of hexadecyltrimethoxysilane (Fluka purum) and heated at 50° C. for 16 hours. The reaction mixture is centrifuged (1 hour, 3000 rpm) and the sedimented product is redispersed in 200 ml of ethanol. This is repeated two more times. The sedimented product is re-dispersed in 250 ml of xylene to give a dispersion with a solid content of 23.9 wt. %. Thermographimetric analysis (TGA; heating rate: 10° C./min from 50° C. to 600° C.): Weight loss: 26.2% corresponding to the organic material. Elemental analysis: found: C, 17.43%, H, 3.69%, N, 1.81%: corresponding to an aminopropyl content of 7.5 wt. % and a n-propyl content of 18.7 wt %. Dynamic light scattering (DLS): Average diameter d=97 nm.

EXAMPLE 4

Preparation of Methylsilane and 3-Aminopropylsilane Modified Silica Nanoparticles 50 g of Ludox TMA® [available from Helm AG, 34% nanosilica dispersion in water] is mixed with 250 ml of ethanol. Then is added a mixture of 2.29 g (12.8 mmol) of 3-aminopropyltrimethoxysilane (Fluka purum) and 7.0 g (51.3 mmol) of methyltrimethoxysilane (Fluka purum) dropwise during 15 min with stirring. After the addition, the mixture is heated at 50° C. for 16 hours. The reaction mixture is centrifuged (1 h, 2000 rpm) and the sedimented product is re-dispersed in 200 ml of ethanol followed by a second centrifugation (1 hour, 2000 rpm). The sedimented product is re-dispersed in 80 ml toluene to give 177.4 g of a dispersion with a solid content of 10.0 wt. %. Thermographimetric analysis (TGA; heating rate: 10° C./min from 50° C. to 600° C.): Weight loss: 5.9% corresponding to the organic material. Elemental analysis: found: C, 3.96%, H, 1.20%, N, 0.67%; corresponding to an aminopropyl content of 2.77 wt. % and a methyl content of 3.08 wt. %.

EXAMPLE 5

Preparation of UV-Absorber and HALS Modified Silica Nanoparticles 20 g of the dispersion according to Example 1 is concentrated with the rotary evaporator to a wet paste and redispersed in 20 ml of dimethylacetamide. 3.92 g (13.1 mmol) of the HALS-acrylate [see reaction scheme; prepared from the 4-hydroxy HALS derivative by acylation with acryloylchloride] dissolved in 80 ml of dimethylacetamide and 7.75 g (13.1 mmol) of the UV-absorber acrylate [see reaction scheme] dissolved in 20 ml of dimethylacetamide is added and the mixture stirred at 50° C. for 19 hours. The reaction mixture is concentrated in the rotary evaporator to about half the volume and 800 ml of ethanol is added which leads to the precipitation of the modified particles. The product is isolated by centrifugation (20 minutes at 2000 rpm) and the sedimented product redispersed in 60 ml toluene. Yield: 100 g dispersion with 12.3 wt. % solid content. Thermographimetric analysis (TGA; heating rate: 10° C./min from 50° C. to

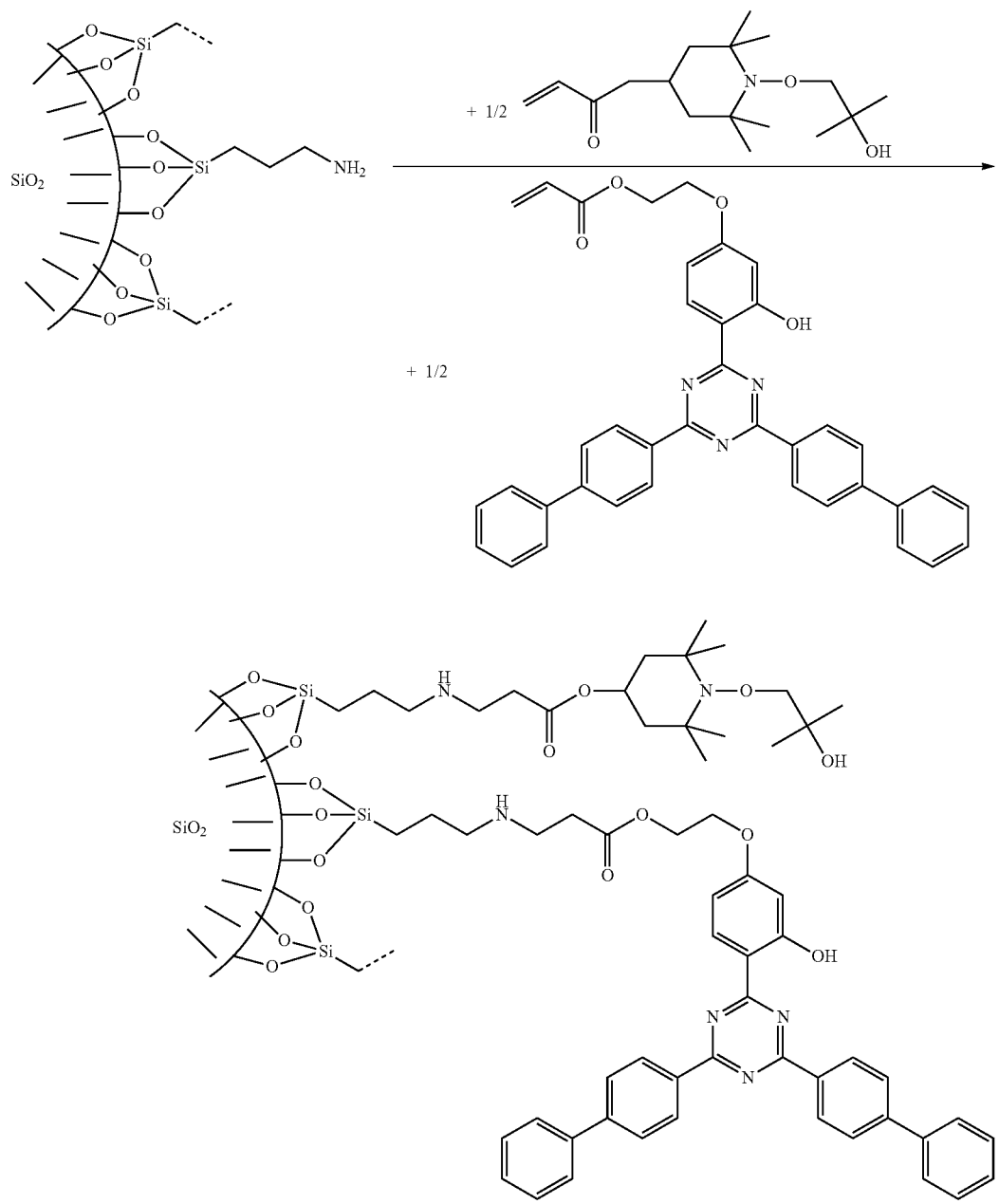

800° C.): Weight loss: 73.0% corresponding to the organic material. Elemental analysis: found: C, 52.53%, H, 5.61%, N, 6.27%: corresponding to an organic content of 73.9% in relatively good agreement to the TGA value. Dynamic light scattering (DLS): Average diameter d=100 nm.

EXAMPLE 6

Preparation of UV-Absorber and HALS Modified Silica Nanoparticles 4-hydroxy HALS derivative by acylation with acryloylchloride] dissolved in 20 ml of dimethylacetamide and 6.59 g (13.3 mmol) of the UV-absorber acrylate [see reaction scheme] dissolved in 60 ml of dimethylacetamide is added and the mixture stirred at 50° C. for 18 hours. The reaction mixture is concentrated in the rotary evaporator to about half the volume and 400 ml of ethanol is added which leads to the precipitation of the modified particles. The product is isolated by centrifugation (1 hour, 2000 rpm) and the sedimented product redispersed in 70 ml of toluene. Yield: 74.1 g dispersion with 15.7 wt. % solid content. Thermographimetric

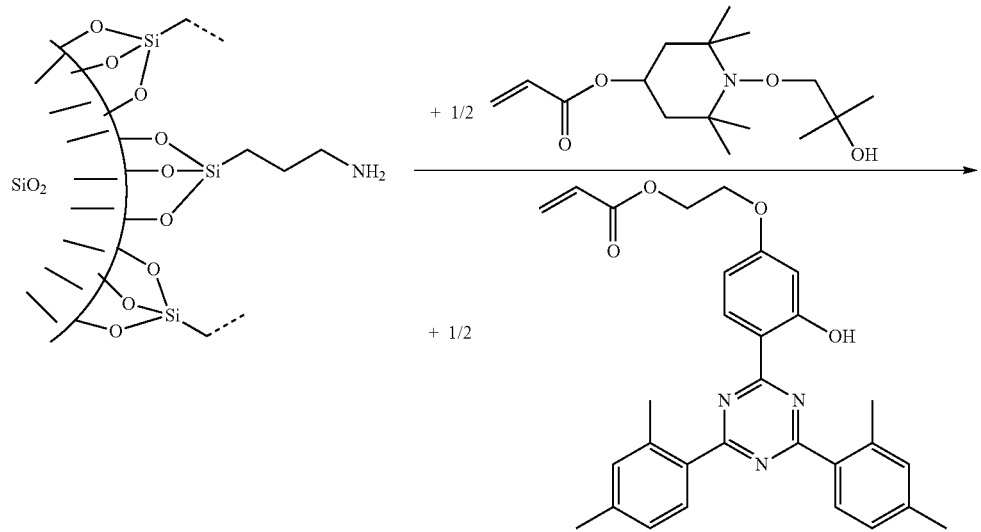

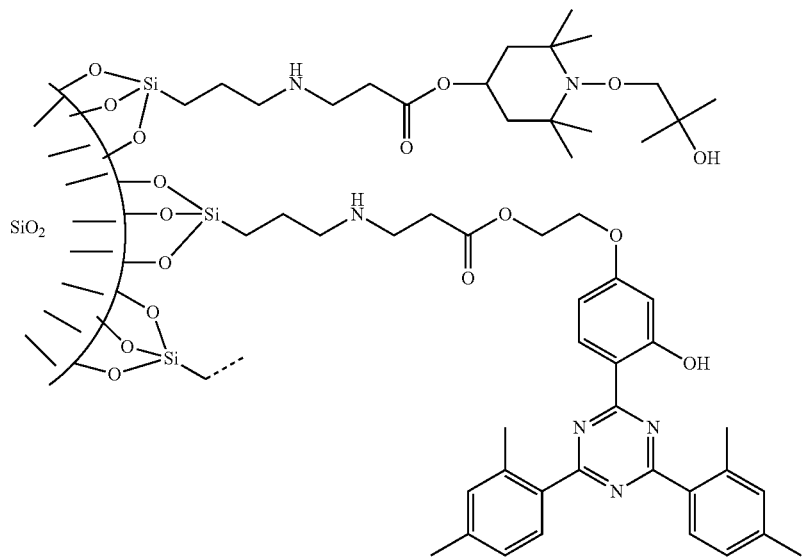

20 g of the dispersion according to Example 1 is concentrated with the rotary evaporator to a wet paste and redispersed in 20 ml of dimethylacetamide. 3.98 g (13.3 mmol) of the HALS-acrylate [see reaction scheme; prepared from the analysis (TGA; heating rate: 10° C./min from 50° C. to 800° C.): Weight loss: 71.4% corresponding to the organic material. Elemental analysis: found: C, 49.20%, H, 5.83%, N, 6.60%: corresponding to an organic content of 71.0% in good agreement to the TGA value. Dynamic light scattering (DLS): Average diameter d=99 nm.

EXAMPLE 7

Preparation of Hydroxyether Modified Silica Nanoparticles

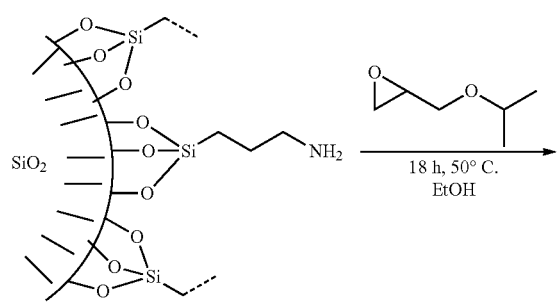

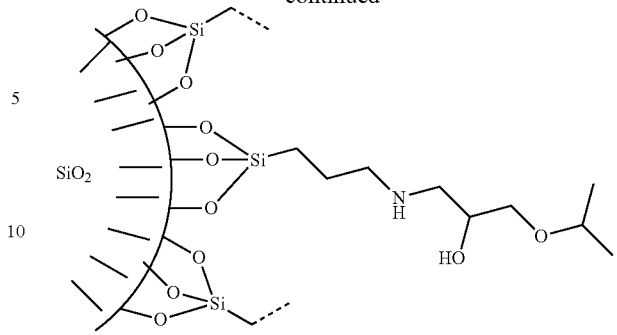

100 g of the dispersion according to Example 1 is mixed with 13.9 g (120.5 mmol) of glycidyl-isopropylether (Fluka, purum) and stirred at 50° C. for 18 h. The mixture is concentrated in the rotary evaporator to give 38.05 g of a paste. The product is re-dispersed in all kind of organic solvents (e.g. toluene). Thermographimetric analysis (TGA; heating rate: 10° C./min from 50° C. to 600° C.): Weight loss: 50.2% corresponding to the organic material. Elemental analysis: found: C: 34,23%, H, 6.55%, N, 4.22%: corresponding to an organic content of 54.7%.

EXAMPLE 8

Preparation of UV-Absorber and Hydroxyether Modified Silica Nanoparticles

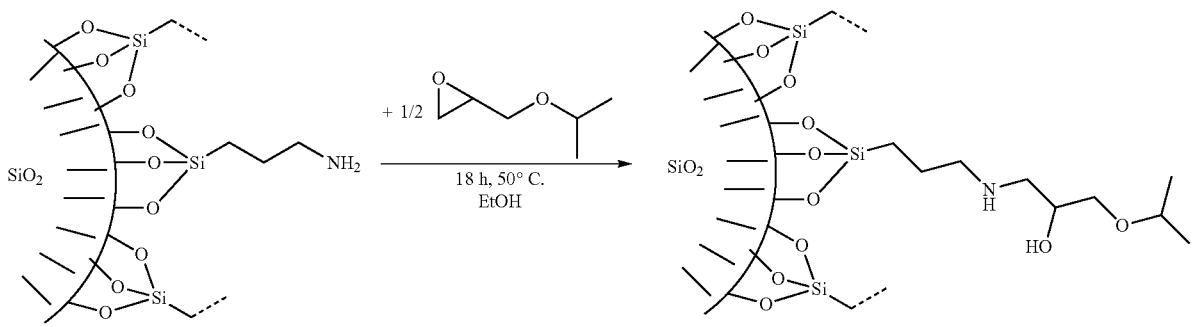

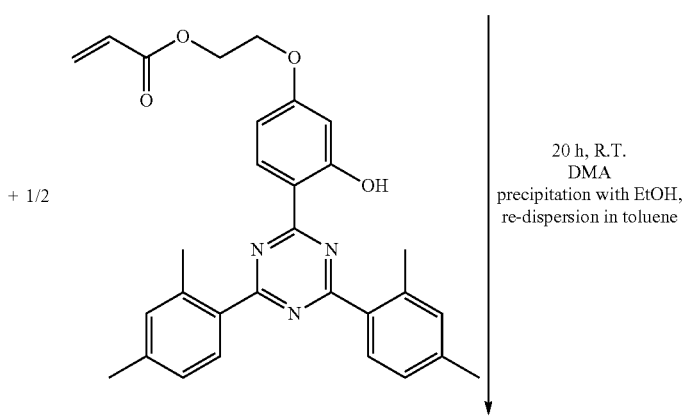

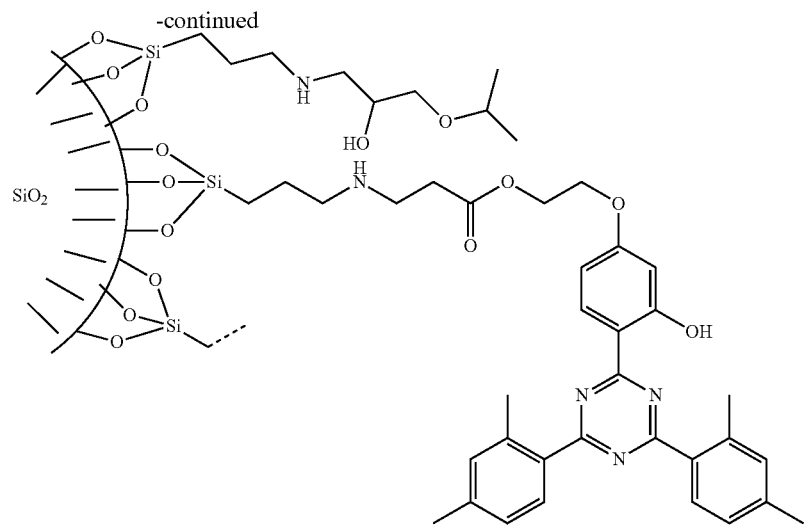

19.28 g of the dispersion according to Example 1 is mixed with 125 g (10.8 mmol) of glycidyl-isopropylether (Fluka, purum) and stirred at 50° C. for 18 hours. The mixture is concentrated in the rotary evaporator to a wet paste and re-dispersed in 28.2 g of dimethylacetamide. 5.35 g (10.8 mmol) of the UV-absorber acrylate [see reaction scheme] is dissolved in 74 g of dimethylacetamide is added and the mixture stirred at 50° C. for 20 hours. 500 ml of ethanol is added which leads to the precipitation of the modified particles. The product is isolated by centrifugation (1 hour, 2000 rpm) and the sedimented product redispersed in 30 g toluene. Yield: 57.3 g dispersion with 14.7 wt. % solid content. Thermogra-phimetric analysis (TGA; heating rate: 10° C./rain from 50° C. to 800° C.): Weight loss: 54.4% corresponding to the organic material. Elemental analysis: found: C, 44.35%, H, 5.30%, N, 8.12%; corresponding to an organic content of 64.9%. Dynamic light scattering (DLS): Average diameter d=107 nm.

EXAMPLE 9

Preparation of Antioxidant Modified Silica Nanoparticles

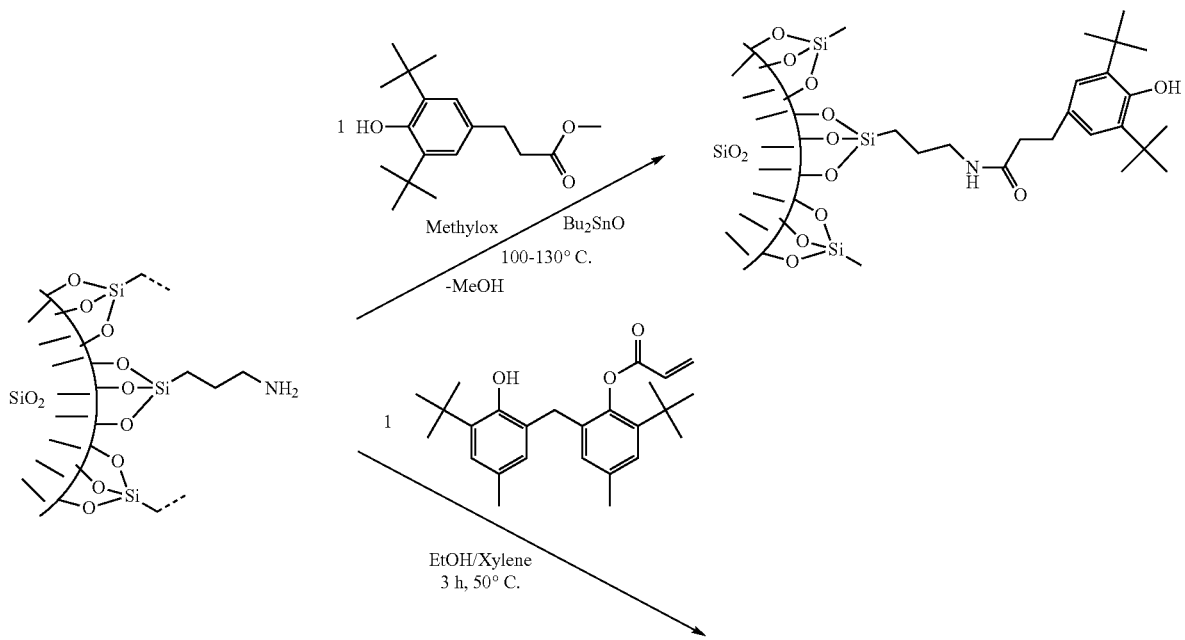

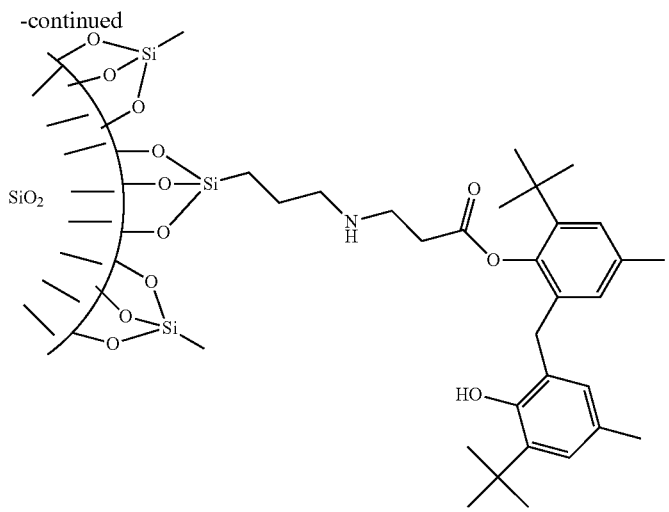

100 g (342 mmol) of methylox (commercial product of Ciba Specialty Chemicals) is melted at 190° C. and 0.3 g of dibutyltinoxide is added. Thereafter, 61.26 g of the dispersion according to Example 1 is added dropwise to this mixture during 45 minutes with good stirring, whereby ethanol is distilled off. The temperature is then rised to 130° C. and kept at there for 15 hours. The reaction mixture is cooled to 60° C. and diluted with 1.5 liter of cyclohexane which leads to the precipitation of the modified particles. The product is isolated by centrifugation (20 minutes, 2000 rpm) and the sedimented product re-dispersed in 60 ml of xylene. Yield: 89.7 g dispersion with 13 wt % solid content. Thermographimetric analysis (TGA; heating rate: 10° C./minute from 50° C. to 600° C.): Weight loss: 39% corresponding to the organic material. Elemental analysis: found: C: 30.72%, H, 4.24%, N, 2.06%: corresponding to an organic content of 43.1%. TEM: Average diameter d=28 nm.

EXAMPLE 10

Preparation of Antioxidant Modified Silica Nanoparticles (See Reaction Scheme in Example 9)

85.54 g (216.8 mmol) of Irganox 3052 FF (commercial product of Ciba Specialty Chemicals) is dissolved in 260 g of xylene at 50° C. and 200 g of the dispersion according to Example 1 is added. The mixture is stirred at 50° C. for 17 hours. All the solvent is evaporated in the rotary evaporator and the solid product dried in vacuo at 50° C. 143 g of a white powder is obtained. Thermographimetric analysis (TGA; heating rate: 10° C./min from 50° C. to 600° C.): Weight loss: 72.1% corresponding to the organic material. Elemental analysis: found: C, 58.05%, 7.47%, N, 2.33%: corresponding to an organic content of 75.4%. TEM: Average diameter d=21 nm.

EXAMPLE 11

Preparation of Polyethyleneglycol Modified Silica Nanoparticles

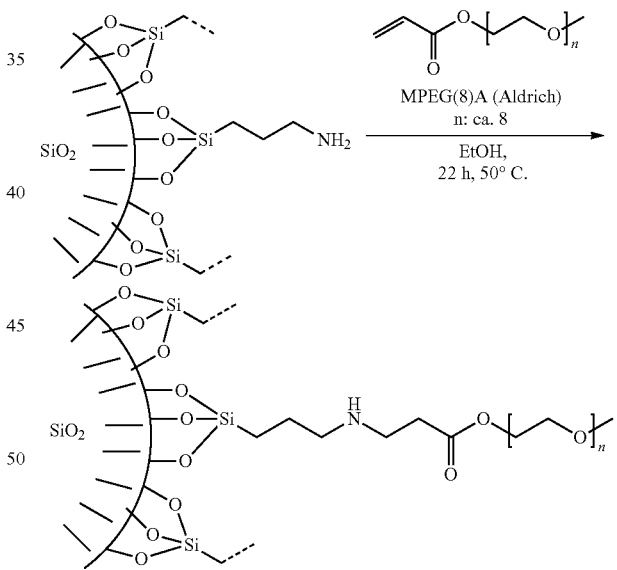

To 60 g of the dispersion according to Example 1 is added 35.91 g (79.1 mmol) of poly(ethyleneglycol)methyl ether acrylate [MPEG(8)acrylate, CAS 32171-39-4, Aldrich, MW=454] at room temperature. The mixture is stirred at 50° C. for 22 hours. The solvent is evaporated in the rotary evaporator to obtain a transparent oil. The product verified by $^1$H NMR that there are no residual acrylic double bonds left. The product is than dispersed in 150 ml acetic acid butyl ester to give 199.5 g of a dispersion with 26.35 wt. % solid content. Thermographimetric analysis (TGA; heating rate: 10° C./min from 50° C. to 600° C.): Weight loss: 74.9%, corresponding to the organic material. Elemental analysis: found: C, 42.79%, H, 7.46%, N, 2.09%: corresponding to an organic content of 74.2%. DLS: Average diameter d=151 nm.

EXAMPLE 12

Preparation of Caprolactone Modified Silica Nanoparticles

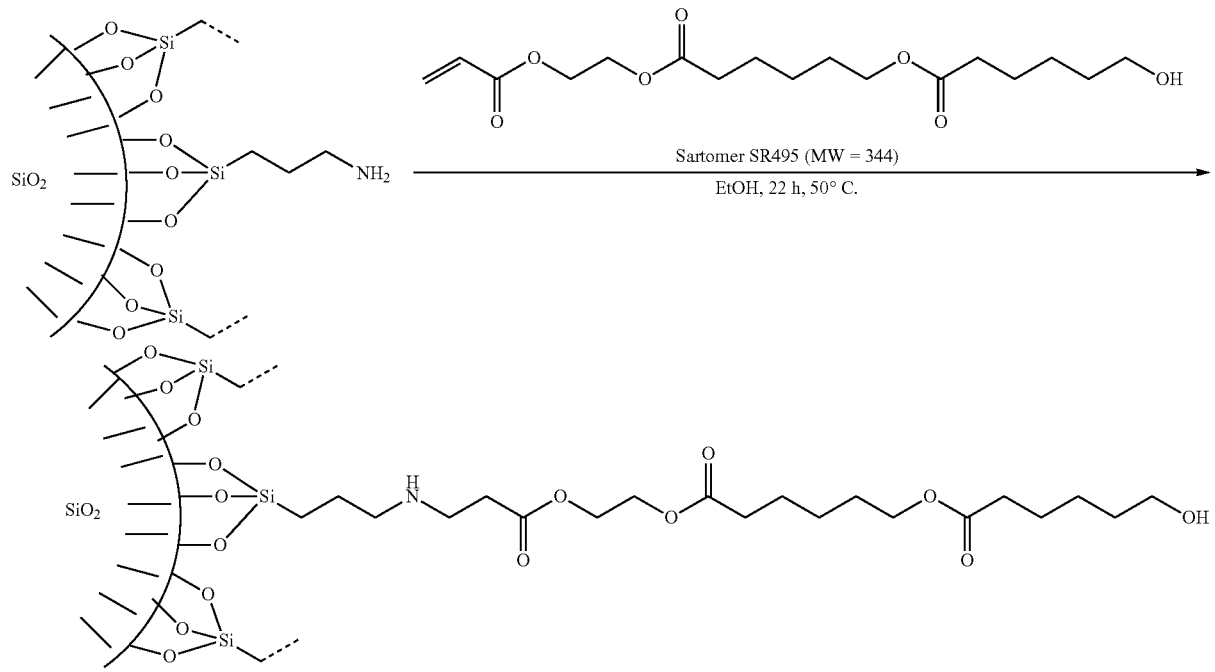

To 60 g of the dispersion prepared according to Example 1 is added 27.21 g (79.1 mmol) of Sartomer SR 495 (MW=344) at room temperature. The mixture is stirred at 50° C. for 22 hours. The solvent is evaporated in the rotary evaporator to obtain a transparent oil. The product is verified by $^1$H-NMR that there are no residual acrylic double bonds left. The product is than dispersed in 130 ml acetic acid butyl ester to give 181.2 g of a dispersion with 24.7 wt. % solid content. Thermographimetric analysis (TGA; heating rate: 10° C./min from 50° C. to 600° C.): Weight loss: 72.2%, corresponding to the organic material. Elemental analysis: found: C, 43.71%, H, 6.94%, N, 2.45%: corresponding to an organic content of 71.8%. DLS: Average diameter d=80-120 nm.

EXAMPLE 13

Preparation of Hindered Amine Light Stabilizer Modified Silica Nanoparticles

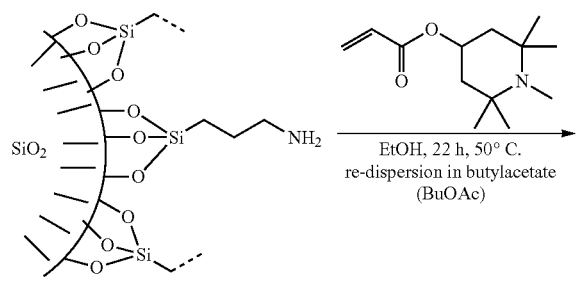

-continued

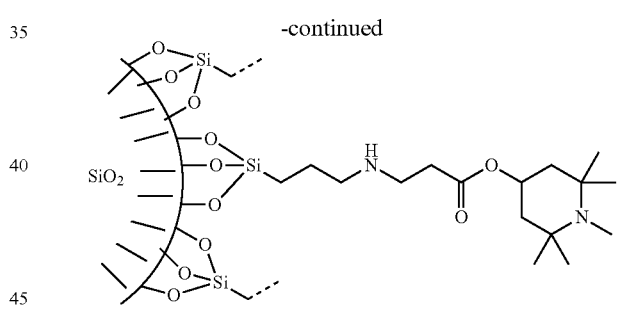

To 66.3 g of the dispersion prepared according to Example 1 is added 17.9 g (80.3 mmol) of a HALS-acrylate derivative [prepared by acylation of 4-hydroxy-1,2,2,6,6-pentamethyl-piperidine with acryloylchloride] in 60 ml of ethanol at room temperature. The mixture is stirred at 50° C. for 20 hours. The amount of solvent is halved by evaporation in the rotary evaporator. By adding 100 ml of hexane the product precipitates and is separated by centrifugation. After re-dispersing the product in acetic acid butyl ester (BuOAc) a dispersion with 6.2 wt. % solid content is obtained. The product is verified by $^1$H-NMR that there are no residual acrylic double bonds left. Thermographimetric analysis (TGA; heating rate: 10° C./min from 25° C. to 600° C.): Weight loss: 19.2%, corresponding to the organic material. Elemental analysis: found: C, 11.45%, H, 2.16%, N, 1.98%: corresponding to an organic content of 17.3%. DLS: Average diameter d=107 nm.

EXAMPLE 14

Preparation of Photoinitiator and Propyl Methacrylate Modified Silica Nanoparticles

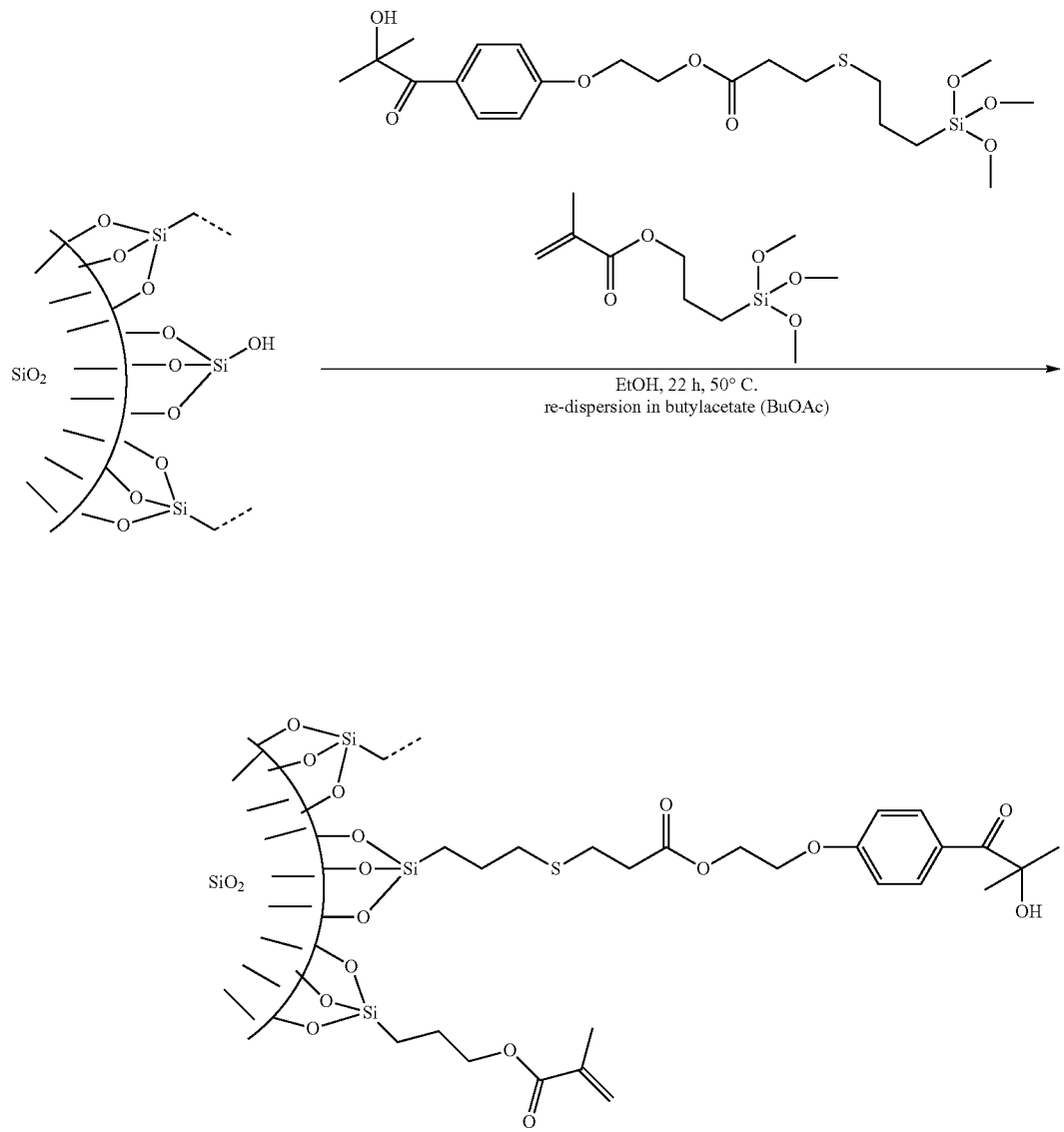

100 g of Ludox TMA® [available from Helm AG; 34% nanosilica dispersion in water] is mixed with 100 ml of ethanol. To this mixture is added 11.7 g (25.6 mmol) of a photoinitiator [see reaction scheme] and 12.7 g (51 mmol) of 3-(trimethoxysilyl)propyl methacrylate at room temperature. The mixture is stirred at 50° C. for 20 hours. The amount of solvent is halved by evaporation in the rotary evaporator. By adding 150 ml of cyclohexane the product precipitates and is separated by centrifugation. After re-dispersing the product in butylacetate (BuOAc) a dispersion with 18.6 wt. % solid content is obtained. The ratio of photoinitiator to methacrylic groups is calculated based on analytical data to be 1 to 1.54. Thermographimetric analysis (TGA; heating rate: 10° C./min from 25° C. to 600° C.): Weight loss: 28.6%, corresponding to the organic material. Elemental analysis: found: C, 18.68%, H, 2.64%, O, 9.52%, S, 1.72: corresponding to an organic content of 32.6%. DLS: Average diameter d=54 nm.

EXAMPLE 15

Preparation of UV-Absorber and Poly(Ethyleneglycol)Methylether (MPEG) Modified Silica Nanoparticles

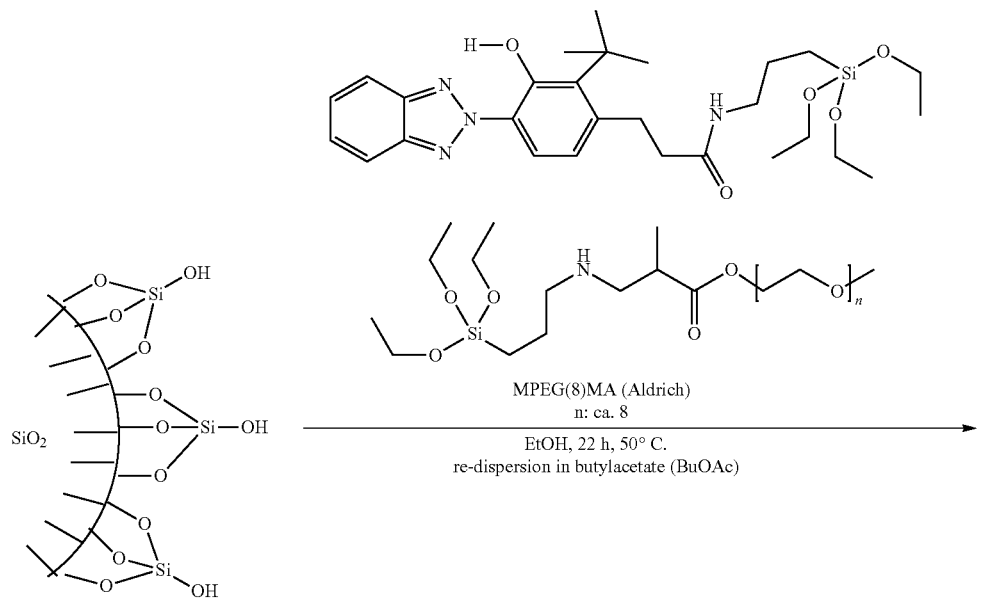

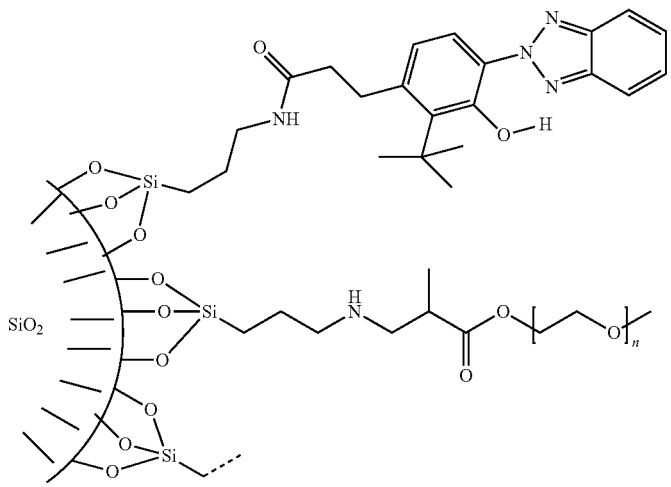

50 g of Ludox TMA® dispersion (Aldrich) is mixed with 100 ml of ethanol. To this mixture is added 22 g (51 mmol) of polyethyleneglycolmethylether triethoxysilane [independently prepared from poly(ethyleneglycol)methylether methacrylate (CAS 26915-72-0, Laporte Performance Chemicals, MW=430 g/mol) by Michael addition with 3-aminopropyl triethoxysilane] and 12.8 g (25.6 mmol) of the UV absorber [independently prepared from the benztriazole derivative and 3-aminopropyl triethoxysilane by amidization reaction] at room temperature. The mixture is stirred at 50° C. for 20 hours. The product precipitates from the reaction mixture and is separated by further centrifugation. After re-dispersing the product in butylacetate (BuOAc) a dispersion with 8.2 wt. % solid content is obtained. Thermographimetric analysis (TGA; heating rate: 10° C./min from 25° C. to 600° C.): Weight loss: 29.7%, corresponding to the organic material. Elemental analysis: found: C, 17.31%, H, 2.82%, N, 2.49: corresponding to an organic content of 30.4%. DLS: Average diameter d=115 nm.

EXAMPLE 16

Preparation of Photoinitiator and Octyl Modified Silica Nanoparticles

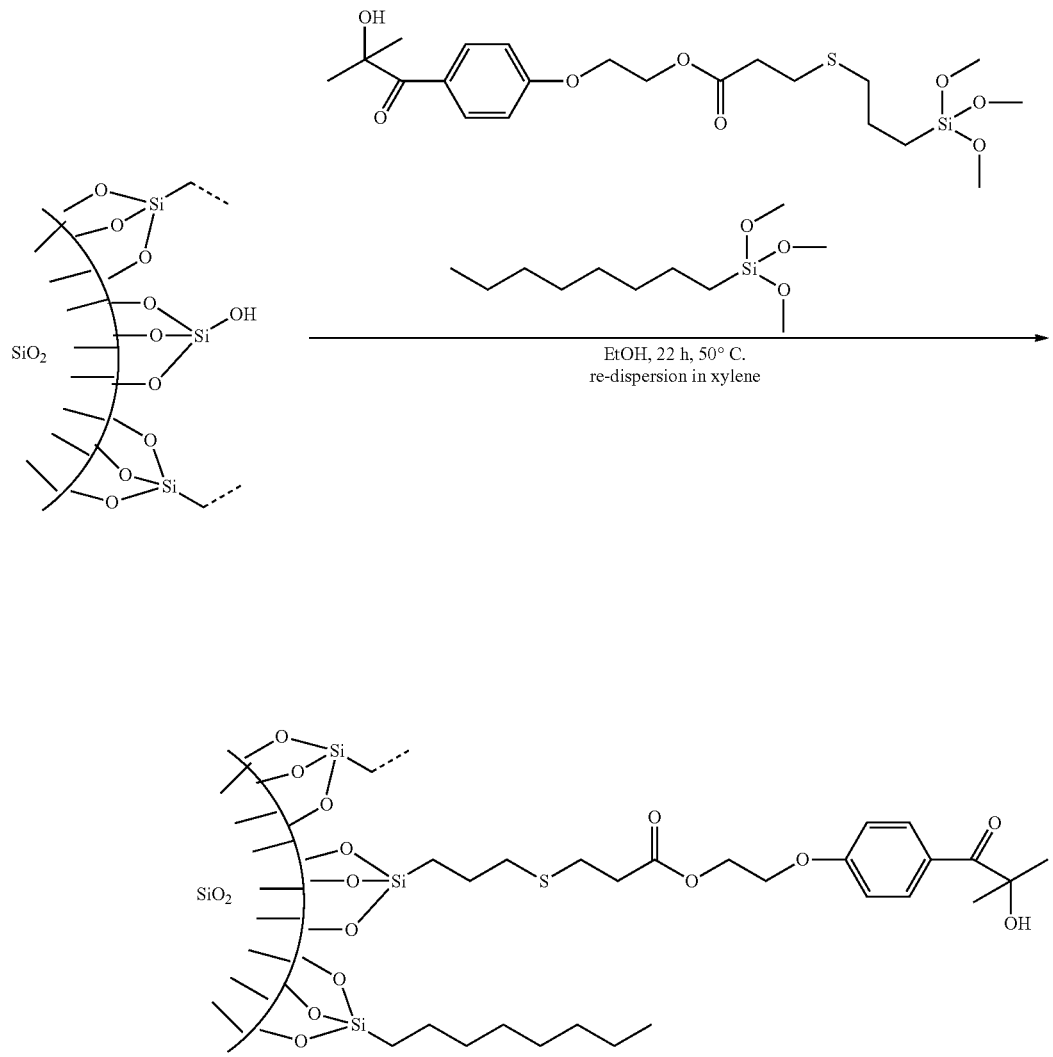

100 g of Ludox TMA® dispersion (Aldrich) is mixed with 100 ml of ethanol. To this mixture is added 4.4 g (9.6 mmol) of the photoinitiator trimethoxysilane [see Example 11 and scheme above] and 16.6 g (67.3 mmol) of octyl trimethoxysilane [CAS 2943-75-1, purum>97% GC, Fluka] at room temperature. The mixture is stirred at 50° C. for 20 hours. By adding 150 ml of hexane the product precipitates and is separated by centrifugation. After re-dispersing the product in xylene a dispersion with 28 wt. % solid content is obtained. Thermographimetric analysis (TGA; heating rate: 10° C./min from 25° C. to 600° C.): Weight loss: 19.7%, corresponding to the organic material. Elemental analysis: found: C, 12.79%, H, 2.18%, O, 2.85%, S, 0.69%: corresponding to an organic content of 18.51%. DLS: Average diameter d=33 nm.

EXAMPLE 17

Preparation of UV-Absorber and Poly(Ethyleneglycol)Methylether (MPEG) Modified Silica Nanoparticles

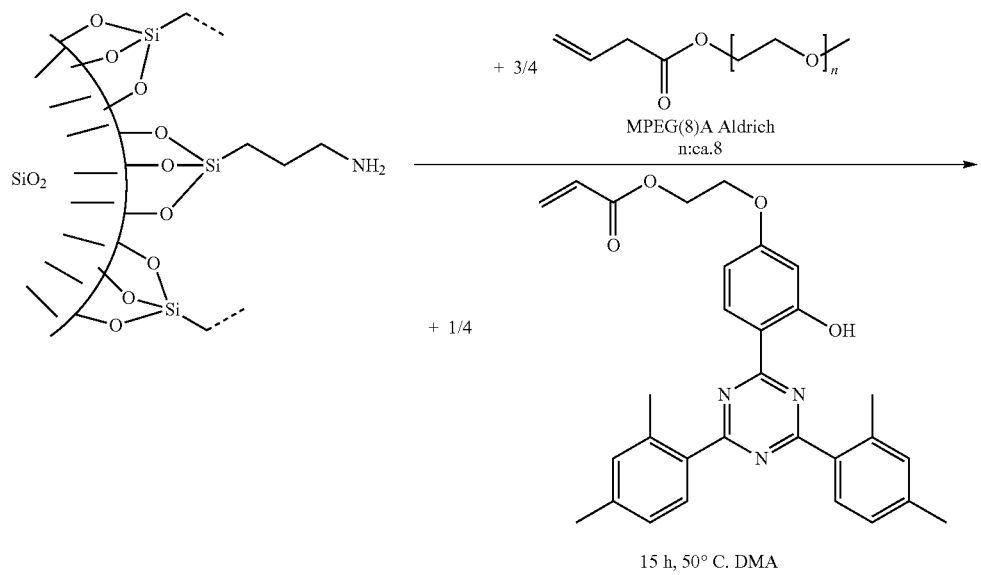

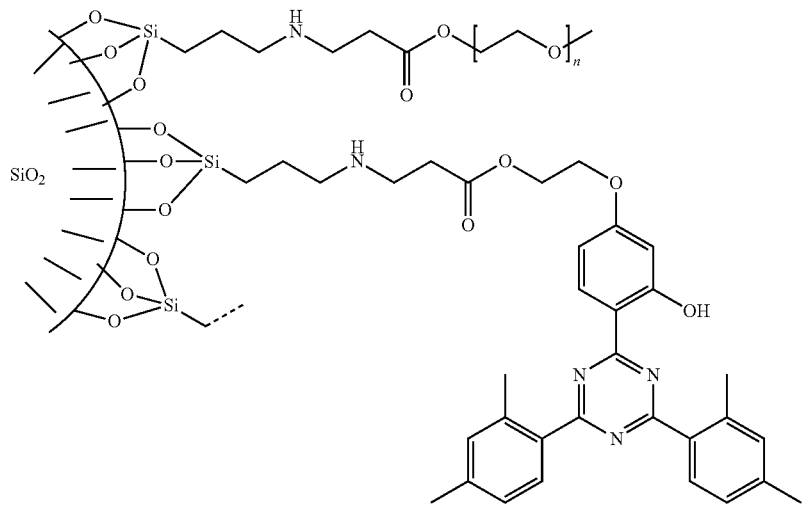

7.5 g (15 mmol) of the UV-absorber acrylate (see scheme above for the structural formula) is dissolved in 120 ml dimethylacetamide (DMA). To this solution is added at room temperature 34 g (75 mmol) of MPEG(8)acrylate [poly(ethyleneglycol)methylether acrylate, CAS 32171-39-4, Aldrich, MW=454 g/mol] and 60 g of the dispersion according to Example 1. The reaction mixture is stirred at 50° C. for 15 hours. The solvent is evaporated in the rotary evaporator to give a yellow oil. The product is verified by $^1$H-NMR that there are no residual acrylic double bonds left. The product is than dispersed in 35 ml of xylene to give 72 g of a dispersion with 47.2 wt. % solid content. Thermographimetric analysis (TGA; heating rate: 10° C./min from 50° C. to 800° C.): Weight loss: 73%, corresponding to the organic material. Elemental analysis: found: C, 44.2%, H, 6.2%, N, 4.7%, O, 14.6%: corresponding to an organic content of 70%. DLS: Average diameter d=310 nm.

EXAMPLE 18

Preparation of Photoinitiator and Poly(Ethyleneglycol)Methylether (MPEG) Modified Silica Nanoparticles

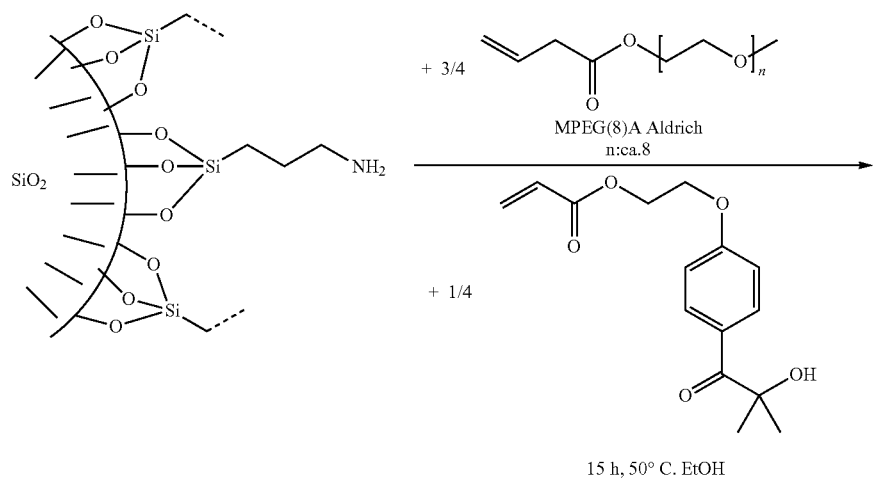

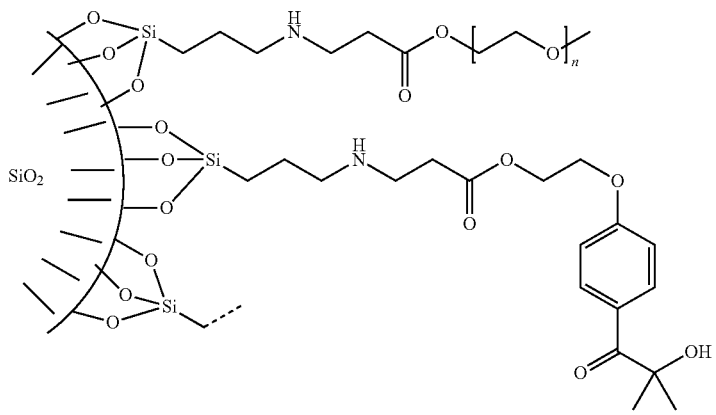

4.2 g (15 mmol) of the photoinitiator acrylate (see scheme above for the structural formula) is dissolved in 50 ml of ethanol. Then is added 34 g (75 mmol) of MPEG(8)acrylate [poly(ethyleneglycol)methylether acrylate, CAS 32171-39-4, Aldrich, MW=454 g/mol] and 60 g of the dispersion according to Example 1 at room temperature. The reaction mixture is stirred at 50° C. for 15 hours. The solvent is evaporated in the rotary evaporator to give a colourless oil. The product is verified by $^1$H-NMR that there are no residual acrylic double bonds left. The product is then dispersed in 35 ml of butyl acetate (BuOAc) to give 64 g of a dispersion with 48.8 wt. % solid content is obtained. Thermographimetric analysis (TGA; heating rate: 10° C./min from 50° C. to 800° C.): Weight loss: 76.9%, corresponding to the organic material. Elemental analysis: found: C, 44.7%, H, 6.4%, N, 2.6%, O, 22.4%: corresponding to an organic content of 76.1%. DLS: Average diameter d=250 nm.

EXAMPLE 19

Preparation of Antioxidant and Poly(Ethyleneglycol)Methylether (MPEG) Modified Silica Nanoparticles

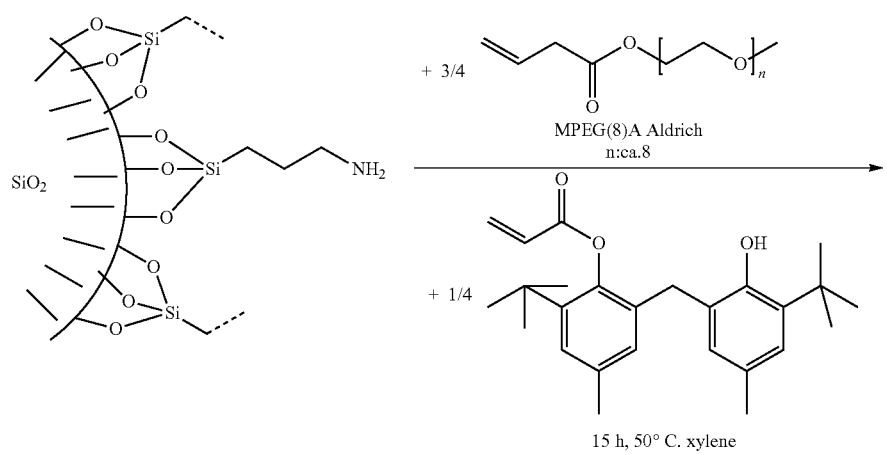

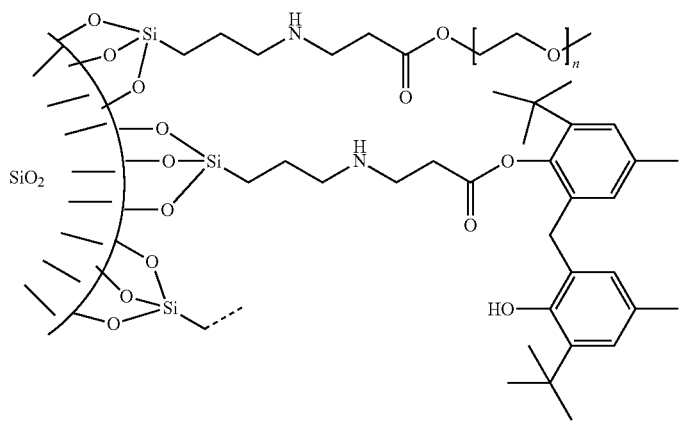

5.9 g (15 mmol) of the antioxidant Irganox 3052 ® [commercial product of Ciba Specialty Chemicals] is dissolved in 50 ml of xylene. Then is added at room temperature 34 g (75 mmol) of MPEG(8)acrylate [poly(ethyleneglycol)methylether acrylate, CAS 32171-39-4, Aldrich, MW=454 g/mol] and 60 g of the dispersion according to Example 1. The reaction mixture is stirred at 50° C. for 15 hours. The solvent is evaporated in the rotary evaporator to give a yellow oil. The product is verified by $^1$H-NMR that there are no residual acrylic double bonds left. The product is then dispersed in 50 ml butyl acetate (BuOAc) to give 80 g of a dispersion with 41.3 wt. % solid content. Thermographimetric analysis (TGA; heating rate: 10° C./min from 50° C. to 800° C.): Weight loss: 76.2%, corresponding to the organic material. Elemental analysis: found: C, 48.§%, H, 6.1%, N, 2.2%, O, 16.2%: corresponding to an organic content of 72.6%. DLS: Average diameter d=260 nm.

EXAMPLE 20

Preparation of HALS and Poly(Ethyleneglycol)Methylether (MPEG) Modified Silica Nanoparticles

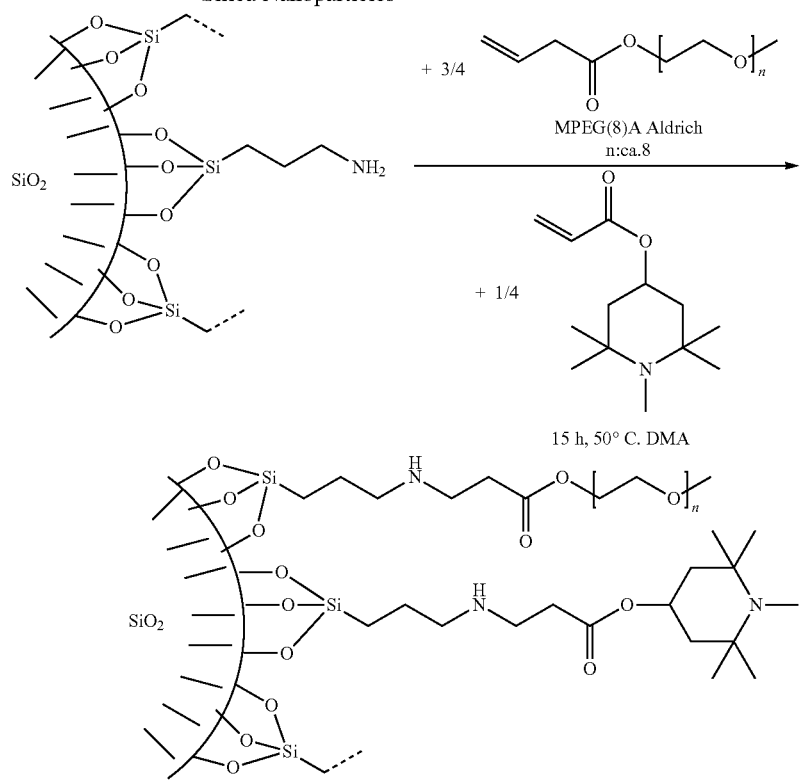

3.4 g (15 mmol) of HALS (see reaction scheme above for structural formula), 34 g (75 mmol) of MPEG(8)acrylate [poly(ethyleneglycol)methylether acrylate, CAS 32171-39-4, Aldrich, MW=454 g/mol] and 60 g of the dispersion according to Example 1 are mixed at room temperature. The reaction mixture is stirred at 50° C. for 15 hours. The solvent is evaporated in the rotary evaporator to give a yellow oil. The product is verified by $^1$H-NMR that there are no residual acrylic double bonds left. The product is then dispersed in 50 ml butyl acetate (BuOAc) to give 80 g of a dispersion with 41.3 wt % solid content. Thermographimetric analysis (TGA; heating rate: 10° C./min from 50° C. to 800° C.): Weight loss: 74.8%, corresponding to the organic material. Elemental analysis: found: C, 43.4%, H, 7.3%, N, 2.4%, O, 18.9%: corresponding to an organic content of 72.4%. DLS: Average diameter d=151 nm.

EXAMPLE 21

Preparation of Poly(n-Butyl Acrylate) Modified Silica Nanoparticles

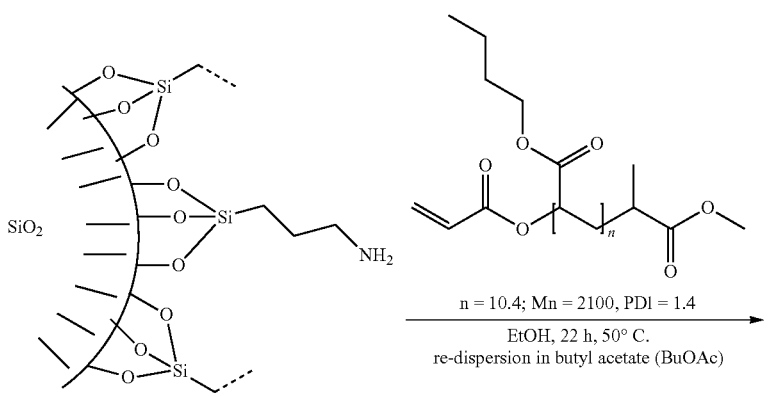

-continued

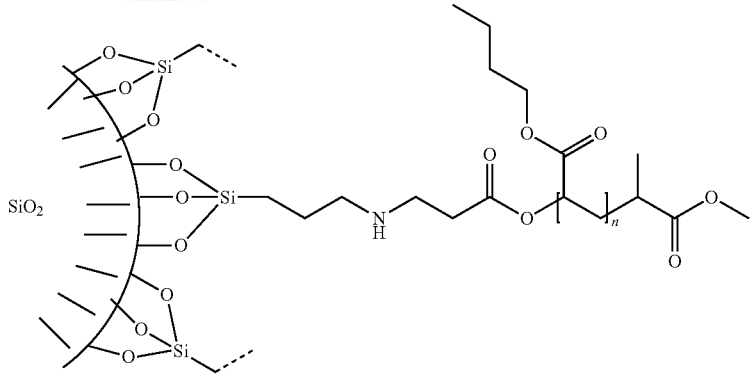

To 200 g of the dispersion prepared according to Example 1 in ethanol, 80.0 g (38 mmol) of poly(n-butyl acrylate) macromonomer with acrylate endgroup [synthesized with ATRP technology according to A. Mühlebach, F. Rime *J. Polym. Sci., Polym. Chem. Ed.,* 2003, 41, 3425; Mn=2100, Mw=2940] is added and the reaction mixture stirred at 50° C. for 18 hours. The volume of this reaction mixture is then reduced to ca. 50 ml by evaporating ethanol/H$_2$O in the rotary evaporator. A total of 200 ml of hexane is added, the mixture shaken vigorously and the two phases separated. The aqueous/ethanolic lower phase is concentrated to a wet paste in the rotary evaporator in vacuo and then re-suspended in 350 ml EtOH to give 506 g of a solution with a solid content of 25.7 wt. %. Thermographimetric analysis (TGA; heating rate: 10° C./min from 50° C. to 800° C.): Weight loss: 21.5% corresponding to the organic material. Elemental analysis: found: C, 11.47%, H, 2.43%, N, 2.70%: corresponding to an organic content of 18%. Dynamic light scattering (DLS): Average diameter d=64.5 nm.

EXAMPLE 22

Preparation of HALS Modified Silica Nanoparticles

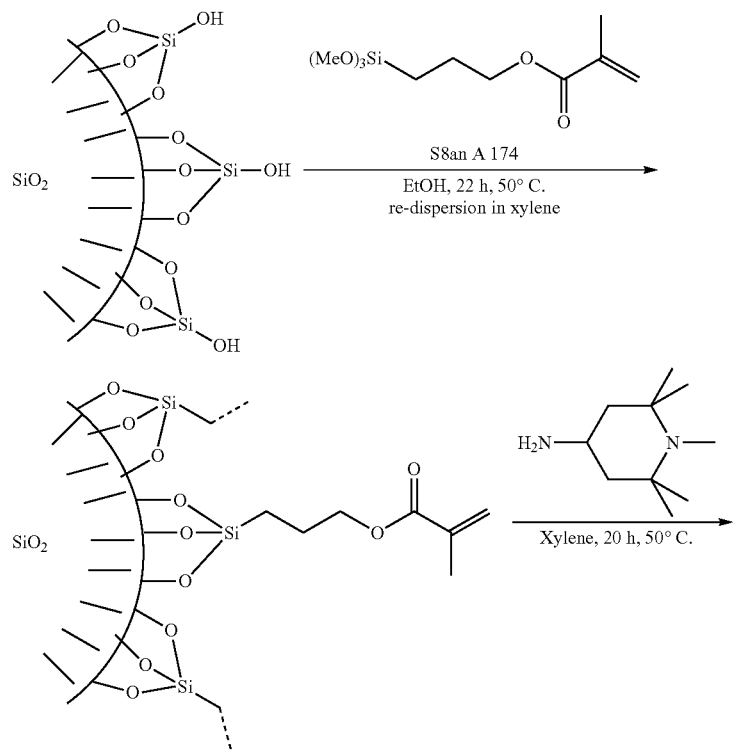

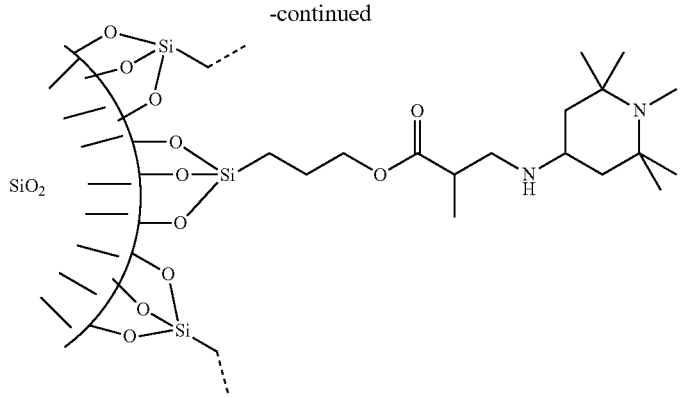

100 g of Ludox TMA® dispersion (Aldrich) is mixed with 100 ml of ethanol. To this mixture is added 16.7 g (67.3 mmol) of 3-methacryloyloxypropyl)-trimethoxysilane [Silan A 174, CAS 2530-85-0, purum 99% GC, Flukas] and the mixture is stirred at 50° C. for 22 hours. By adding 150 ml of hexane the product precipitates and is separated by centrifugation. After re-dispersing the product in 200 ml of xylene 11.4 g (67.3 mmol) 1,2,2,6,6-pentamethyl-4-amino-piperidine (GC purity: 92%) is added and the mixture stirred at 50° C. for 20 hours. A dispersion of HALS modified silica nanoparticles with 25 wt. % solid content is obtained. DLS: d=47 nm. Thermographimetric analysis (TGA; heating rate: 10° C./min from 25° C. to 600° C.): Weight loss: 20.1%, corresponding to the organic material.

EXAMPLE 23

3-Aminopropylsilane Modified Alumina Nanoparticles

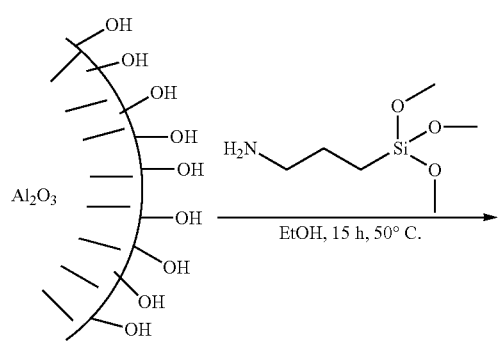

150 g of alumina nanoparticles (Nyacol Corp., Nyacol Al20 DW, 22% nanoalumina dispersion in water) is mixed with 250 mL ethanol (EtOH). 27 g 3-Aminopropyltrimethoxysilane (Fluka purum) are added dropwise to this homogeneous mixture. After the addition, the mixture is heated to 50° C. for 15 hours. The volume of this mixture is then reduced to ca. 1 L by evaporating EtOH/H$_2$O in the rotary evaporator. The obtained solid is redispersed in EtOH to a 11.4 weight-% opaque dispersion.

Analytics:

Thermographimetric analysis (TGA; heating rate: 10° C./min from 50° C. to 800° C.): Weight loss: 27.9 wt. % corresponding to the organic material.

Elemental analysis: found: N, 4.16 wt. %: corresponding to an organic content of 17.3 wt. %. The difference between TGA and EA results is due to the loss of water out of the inorganic matrix and water generated from condensation processes on the surface during thermal treatment.

Transmission Electron Microscopy (TEM): An average diameter of 50 to 60 nm is obtained for the individual primary nanoparticles.

Dynamic light scattering (DLS): Average diameter d=164 nm.

EXAMPLE 24

Polyethylene Glycol (MPEG) Modified Alumina Nanoparticles

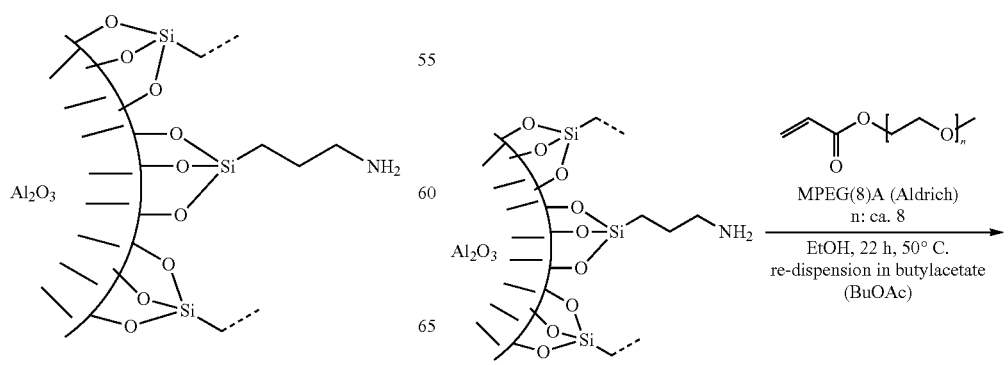

-continued

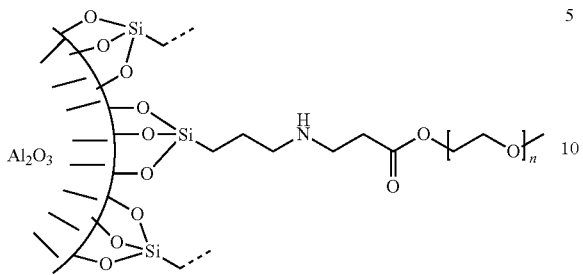

To 50 g of a 3-aminopropylsilan modified alumina nanoparticle dispersion (solid content 6.2 wt %) (obtained according to Example 23) 4.24 g (9.3 mmol) MPEG(8)acrylate (poly(ethyleneglycol)methyl ether acrylate, CAS 32171-39-4, Aldrich, MW=454) is added at room temperature. The mixture is stirred at 50° C. for 15 hours. The solvent is evaporated in the rotavap to obtain a transparent resin. It was verified by $^1$H-NMR that there are no residual acrylic double bonds left. The product is then dispersed in 100 ml BuOAc to obtain a 7.8 wt % dispersion.

Analytics:

Thermographimetric analysis (TGA; heating rate: 10° C./min from 50° C. to 800° C.): Weight loss: 72.6 wt. % corresponding to the organic material.

Elemental analysis: found: N, 1.7 wt. %; C, 36.4 wt %; H, 6.7 wt %.

Dynamic light scattering (DLS): Average diameter d=114 nm.

EXAMPLE 25

Preparation of HALS and Poly(Ethyleneglycol)Methylether (MPEG) Modified Alumina Nanoparticles

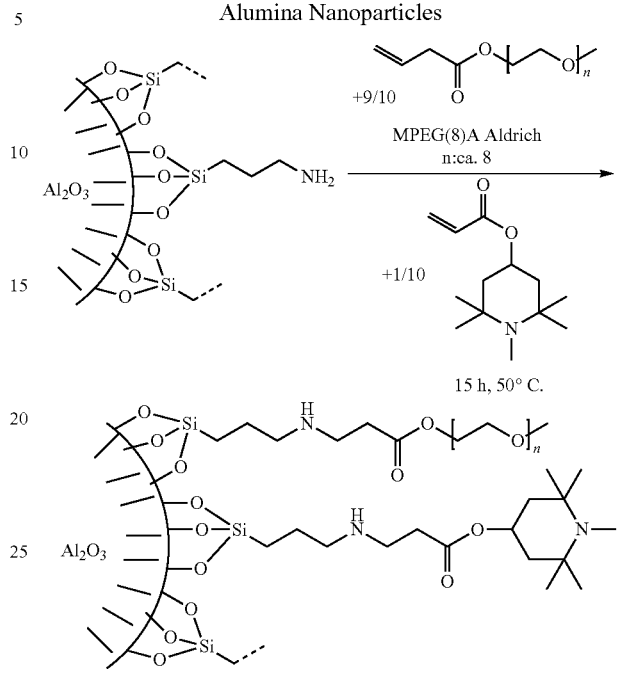

0.39 g (1.7 mmol) of HALS (see reaction scheme above for structural formula), 7.9 g (17.4 mmol) of MPEG(8)acrylate [poly(ethyleneglycol)methylether acrylate, CAS 32171-39-4, Aldrich, MW=454 g/mol] and 25 g of the dispersion according to Example 23 (4.3 wt. % N, solid content 25 wt. %) are mixed at room temperature. The reaction mixture is stirred at 50° C. for 15 hours. The solvent is evaporated in the rotary evaporator to give a yellow resin. The product is verified by $^1$H-NMR that there are no residual acrylic double bonds left. The product is then dispersed in butyl acetate (BuOAc) to give a dispersion with 22.4 wt. % solid content. Thermographimetric analysis (TGA; heating rate: 10° C./min from 50° C. to 800° C.): Weight loss: 77.8%, corresponding to the organic material. Elemental analysis: found: C, 41.3%, H, 7.0%, N, 1.7%. DLS: Average diameter d=100 nm.

EXAMPLE 26

Preparation of Antioxidant and Poly(Ethyleneglycol)Methylether (MPEG) Modified Alumina Nanoparticles

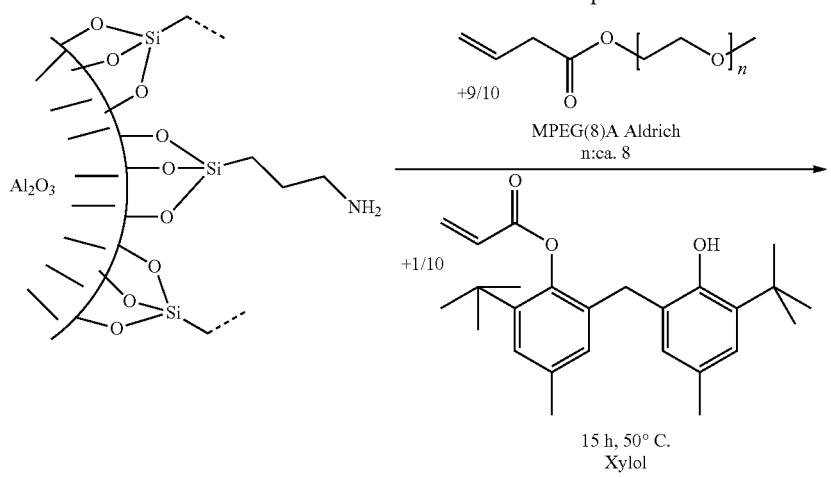

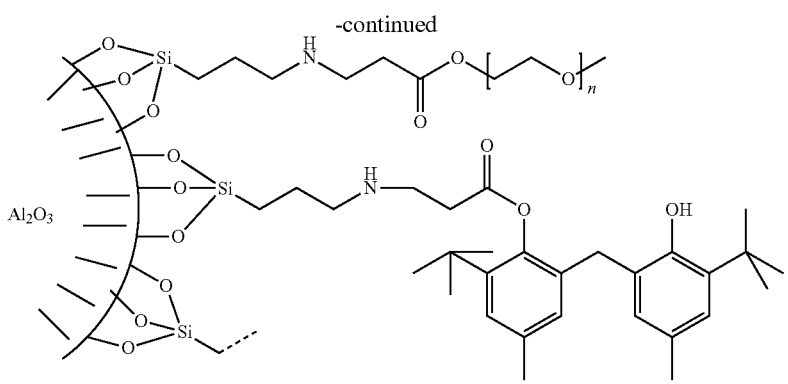

0.69 g (1.7 mmol) of the antioxidant (see reaction scheme above for structural formula) are dissolved in 5 mL xylol and 7.9 g (17.4 mmol) of MPEG(8)acrylate [poly(ethyleneglycol) methylether acrylate, CAS 32171-39-4, Aldrich, MW=454 g/mol] and 25 g of the dispersion according to Example 23 (4.3 wt. % N, solid content 25 wt. %) are mixed at room temperature. The reaction mixture is stirred at 50° C. for 15 hours. The solvent is evaporated in the rotary evaporator to give a transparent resin. The product is verified by $^1$H-NMR that there are no residual acrylic double bonds left. The product is then dispersed in butyl acetate (BuOAc) to give a dispersion with 30.8 wt. % solid content. Thermographimetric analysis (TGA; heating rate: 10° C./min from 50° C. to 800° C.): Weight loss: 79.8%, corresponding to the organic material. Elemental analysis: found: C, 42.9%, H, 6.9%, N, 1.4%. DLS: Average diameter d=105 nm.

EXAMPLE 27

Cinnamic Acid Amide-3-Propyl Trimethoxy Silane Reacted with Unmodified Silica Nanoparticles a) Preparation of Cinnamic Acid Amide-3-Propyltrimethoxysilane

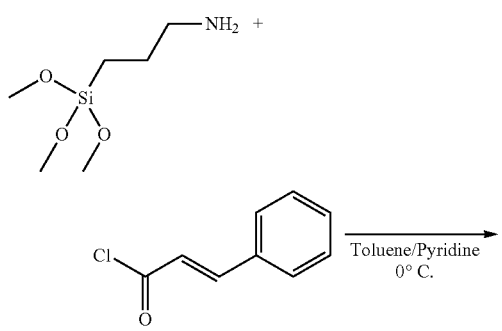

Toluene/Pyridine
0° C.

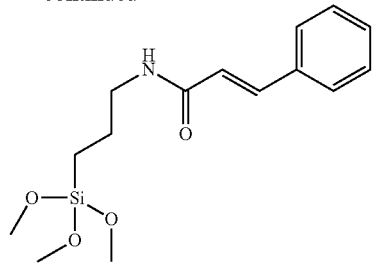

Solution A consisting of 10 g of cinnamic acid chloride (cinnamoyl chloride, Fluka) dissolved at a temperature of 0° C. in 50 g of toluene, is run under stirring into Solution B, consisting of 12.2 g of 3-amino-propyl-trimethoxysilane (APS, purum Fluka) in a mixture of 50 g of dry toluene and 60 g of dry pyridine at a temperature of 0° C. A pale yellow product precipitates and the stirring is continued for additional 2 hours at a temperature of 0° C., then 12 hours at room temperature.

The reaction mixture is poured into 300 ml of deionized water, the yellow organic phase is washed and separated. After evaporation of the solvent (toluene) in a rotary evaporator at a temperature of 40° C. (60 hPa), the residual solvent is removed from the orange oil in vacuum (100 hPa) at a temperature of 70° C. during 16 hours.

14.61 g of the product are obtained as orange oil (theory=18.57 g). The structure is confirmed by $^1$H-NMR and elemental analysis:

Calculated: C, 58.22%; H, 7.49%; N, 4.53%; Si, 9.08%; O, 20.68% found: C, 60.12%; H, 6.66%; N, 4.59%; Si, 9.20%; O, 19.43% b) Reaction of Cinnamic Acid Amide-3-Propyl Trimethoxy Silane with Silica Nanoparticles

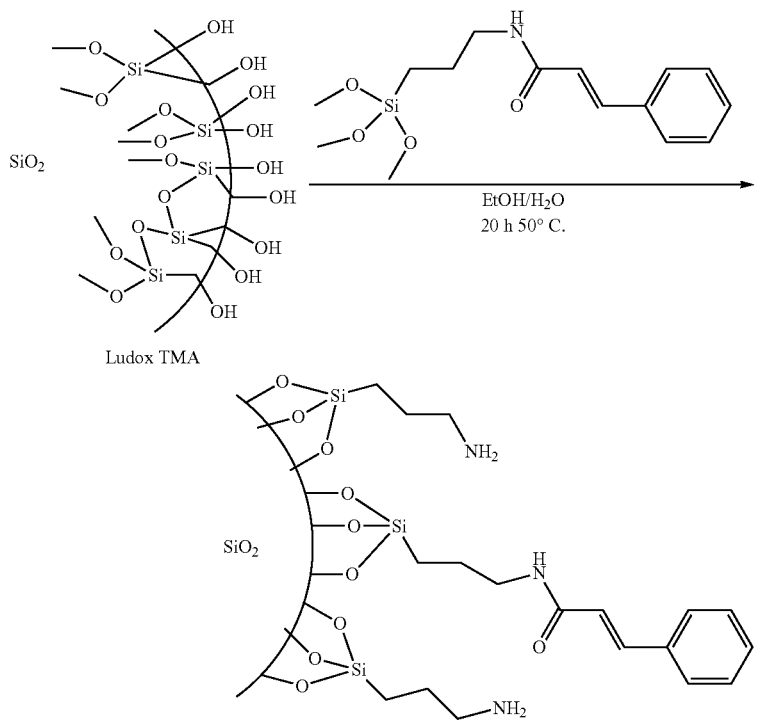

Ludox TMA

Solution C:

2 g of cinnamic acid amide-3-propyltrimethoxysilane (orange oil) are dissolved in 35 g of ethanol. This solution is added within about 5 seconds under vigorously stirring to a solution of 20.3 g of Ludox TMA (colloidal silica, 34 wt. % suspension in deionized water) in 70 g of ethanol at room temperature. The milky suspension is stirred and heated at a temperature of 50° C. for 20 hours followed by additional stirring at room temperature for 12 hours. After completion of the reaction, 80 g of n-hexane are added and stirring is continued for 2 hours to homogenize the mixture. The suspension is centrifuged (4500 rpm) and the obtained residual is redispersed in 160 g of xylene, washed, centrifuged and redispersed thrice until no educt is found in the washing liquid (controlled by TLC).

The white gel is separated and dispersed in xylene.

EXAMPLE 28

Preparation of Hindered Amine Light Stabilizer Modified Silica Nanoparticles a) Preparation of succinic acid methylester amide-4-(2,2,6,6)-tetramethyl-1-methyl-piperidine

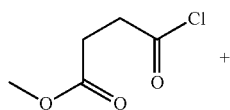

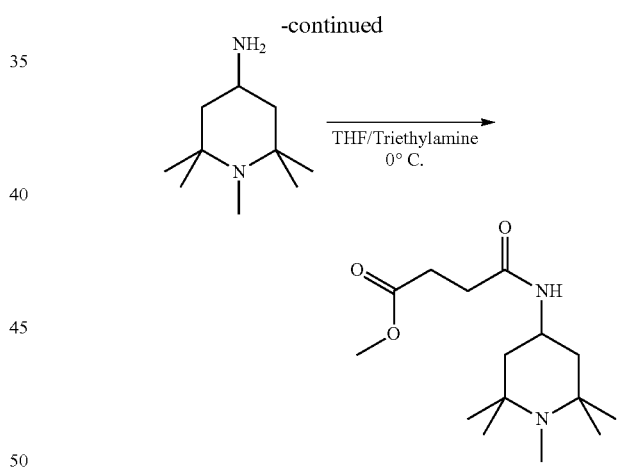

Solution A consisting of 2.4 g of succinic acid methylester chloride (Fluka) dissolved at a temperature of 0° C. in 10 g of tetrahydrofuran (THF), is run under nitrogen and stirring subsequent into Solution B, consisting of 3 g of 4-amino-2, 2,6,6-tetramethyl-1-methyl piperidine into a mixture of 10 g of dry tetrahydrofuran (THF) and 1 g of triethyl amine at a temperature of 0° C. A white product precipitates and stirring is continued for additional 2 hours at a temperature of 0° C., then 12 hours at room temperature.

The product containing solvent is filtered off and the white solid is washed with 20 g of THF. The pale yellow THF-solution is evaporated from the solvent in a rotary evaporator at a temperature of 50° C. (65 hPa), the residual solvent is removed from the bright orange oil in vacuum (100 hPa) at a temperature of 70° C. during 16 hours.

Yield: 4.35 g, obtained as an orange paste.

The structure is confirmed by $^1$H-NMR, LC-MS and IR with absorbances at 1559 and 1632 cm$^1$.

b) Preparation of the Hindered Amine Light Stabilizer Modified Silica Nanoparticles

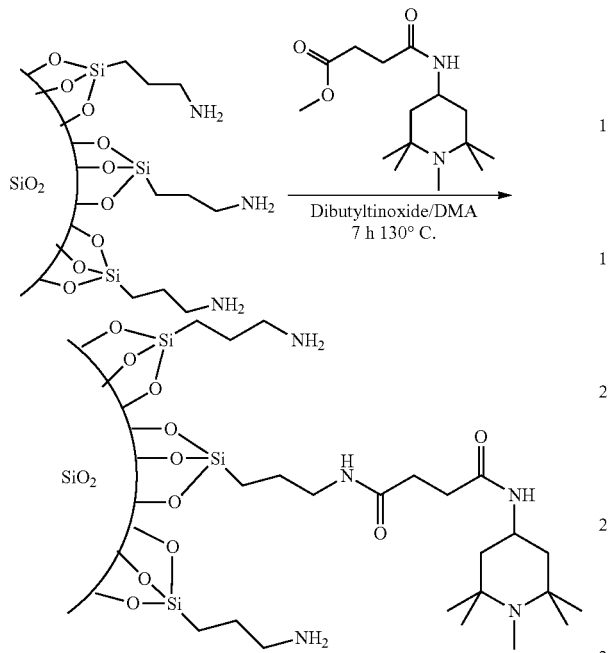

Solution C:

22 g of a 27.3% suspension of 3-aminopropylsilane modified silica nanoparticles in ethanol are mixed with 20 g of dimethylacetamide (DMA), homogenized and the ethanol is removed with the rotary evaporator at a temperature of 50° C. (85 hPa).

This solution is added within 5 seconds under stirring to a mixture consisting of 0.75 g of succinic acid methylester 4-amido-(2,2,6,6)-tetramethyl-1-methyl-piperidine (see example above) and 0.12 g of dibutyltinoxide dissolved in 10 g of dimethylacetamide (DMA). The milky reaction mixture is stirred and heated to a temperature of 130° C. for 7 hours whereby methanol is distilled off. Thereafter, the mixture is cooled to room temperature and stirred for 1 hour, combined with 70 g of tetrahydrofuran (THF) and stirred for additional 16 hours. The suspension is centrifuged (4500 rpm), the isolated product re-dispersed in 80 g of tetrahydrofuran, washed and centrifuged. The obtained white gel is separated and dispersed in xylene.

Thermogravimetric analysis (TGA; heating rate: 10° C./min from 25° C. to 800° C.): Weight loss: 24.7%, corresponding to the organic material.

Elemental analysis: found: C, 15.73%; H, 3.54%; N, 5.09%.

TEM: Average diameter d=60 nm (visible core).

The IR shows a weak band at 1571 and ~1650 cm$^{-1}$ corresponding to the amide-bond.

The described dispersion is finally reacted with poly(ethyleneglycol)methyl ether acrylate [MPEG(8)acrylate, CAS 32171-39-4, Aldrich, MW=454] at 50° C. for 22 hours. The suspension is centrifugated (4500 rpm), the isolated product re-dispersed in ethanol, washed and centrifugated twice. The solvent is evaporated in the rotary evaporator to obtain a transparent oil. It is verified by $^1$H-NMR that there are no residual acrylic double bonds left.

To convert residual amino groups, reactions with different acrylates or anhydrides as acetic acid anhydride etc., are possible.

EXAMPLE 29

Preparation of UV-Absorber Modified Silica Nanoparticles a) Preparation of the Precursor

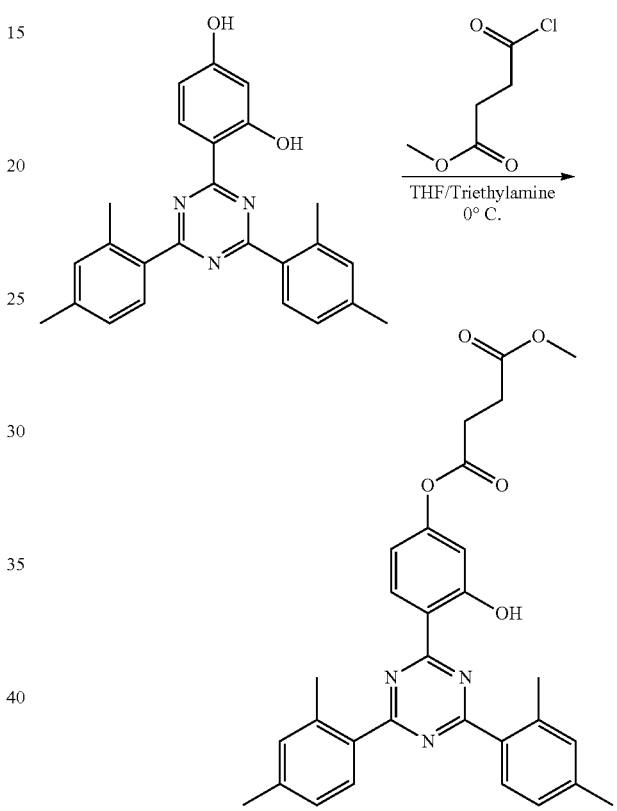

Solution A consisting of 2.4 g of succinic add methyl ester chloride (Fluka) dissolved at a temperature of 0° C. in 10 g of tetrahydrofuran (THF), is run under nitrogen and stirring subsequent into Solution B, consisting of 6.37 g of the UV-absorber (indicated in the above reaction scheme) in a mixture of 10 g of dry tetrahydrofuran (THF) and 1 g of triethylamine at a temperature of 0° C. An additional amount of 1 g triethylamine is added and stirring is continued for additional 2 hours at a temperature of 0° C., then 16 hours at room temperature.

The product mixture is poured into 200 ml of deionized water and the pH is adapted from 10.2 to 3.2 by addition of 3.26 g of 4% aqueous hydrochloric acid. The mixture is stirred for 40 minutes and then the pale precipitated product is filtered off and washed thrice with 200 ml of water.

The residual water is removed during 16 hours from the pale brownish product in vacuum at a temperature of 79° C. (100 hPa).

Yield: 7.75 g (95% of theory)

The structure is confirmed by $^1$H-NMR, UV-VIS and IR spectroscopy.

Elemental analysis:
Calculated: C, 70.44%; H, 5.71%; N, 8.21%; O, 15.64%
found C, 70.45%; H, 5.77%; N, 8.20%; O, 15.96% b) Preparation of the UV-Absorber Modified Silica Nanoparticles

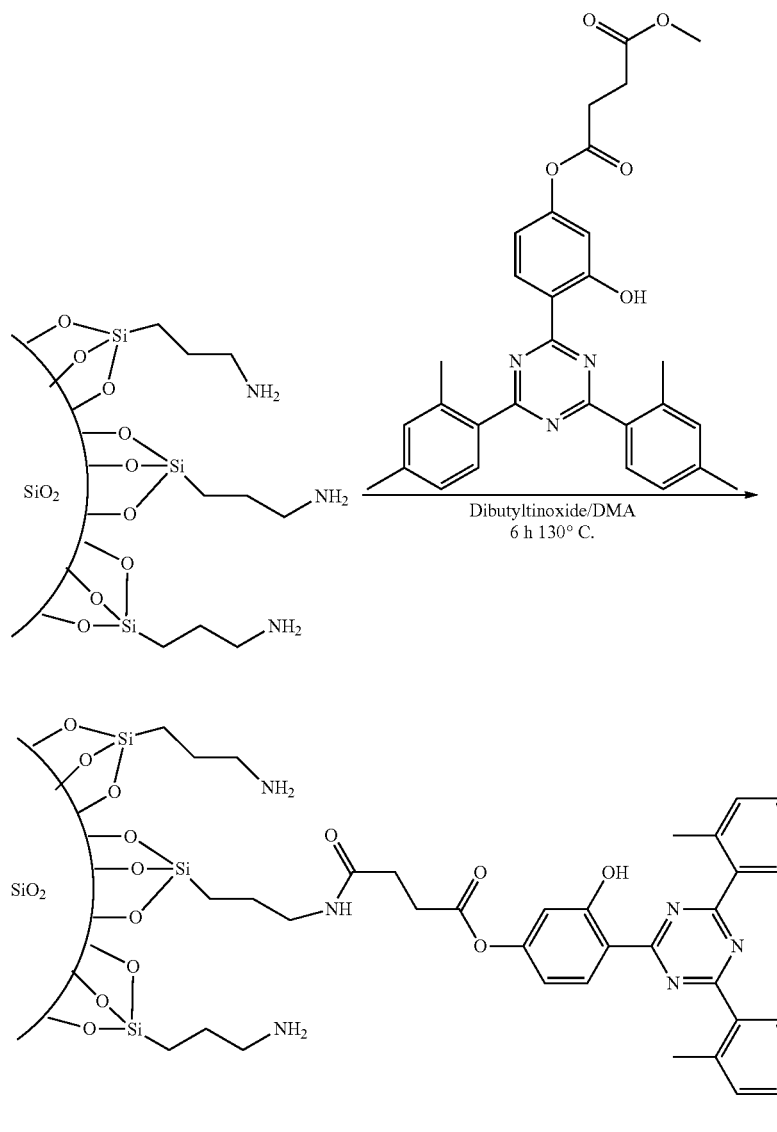

Solution C:

24 g of a 25% suspension of 3-aminopropylsilane modified silica nanoparticles in ethanol are mixed with 30 g of dimethylacetamide (DMA), homogenized and the ethanol is removed with the rotary evaporator at a temperature of 50° C. (85 hPa).

This solution is added within 5 seconds under stirring to a mixture consisting of 0.75 g of the UV-absorber obtained as given above under a) and 0.05 g of dibutyltinoxide dissolved in 30 g dimethylacetamide (DMA). The milky yellowish reaction mixture is stirred and heated to a temperature of 130° C. for 6 hours whereby methanol is distilled off. Thereafter, the mixture is cooled to room temperature and stirred for 1 hour, combined with 140 g of tetrahydrofuran (THF) and stirred for 30 minutes, then 140 g of n-hexane are added and the mixture is stirred for additional 16 hours. The suspension is centrifugated (4500 rpm), the isolated product redispersed in 80 g of xylene, washed and centrifugated. The obtained white gel is separated and dispersed up to ten times in xylene.

Thermogravimetric analysis (TGA; heating rate: 10° C./rain from 25° C. to 800° C.): Weight loss: 18.5%, corresponding to the organic material, Elemental analysis: found: C, 12.08%; H, 2.23%; N, 2.88%.

TEM: Average diameter d=~50 nm (visible core).

The IR shows a band at 1562 and ~1644 $cm^{-1}$ corresponding to the amide-bond.

The described dispersion is finally reacted with poly(ethyleneglycol)methyl ether acrylate [MPEG(8)acrylate, CAS 32171-39-4, Aldrich, MW=454] at 50° C. for 22 hours. The suspension is centrifugated (4500 rpm), the isolated product re-dispersed in ethanol, washed and centrifugated twice. The solvent is evaporated in the rotary evaporator to obtain a transparent oil. It is verified by $^1$H-NMR that there are no residual acrylic double bonds left.

To convert residual amino groups, reactions with different acrylates or anhydrides as acetic acid anhydride etc., are possible.

EXAMPLE 30

Preparation of Hindered Amine Light Stabilizer and Polyethyleneglycol Modified Silica Nanoparticles a) Preparation of 1:1 3-Aminopropyl/Polyethyleneglycol Modified Silica Nanoparticles

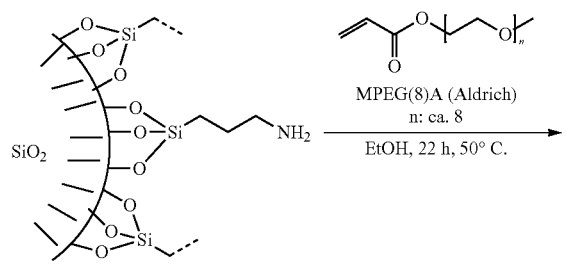

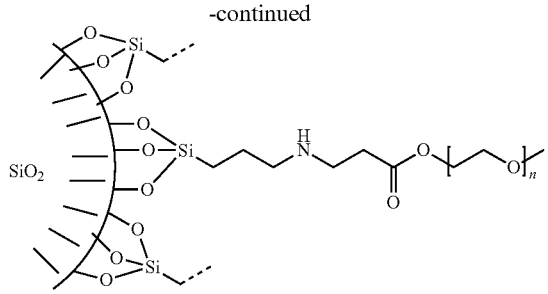

To 60 g of the dispersion according to Example 1 is added 17.94 g (39.55 mmol) of poly(ethyleneglycol)methyl ether acrylate [MPEG(8)acrylate, CAS 32171-39-4, Aldrich, MW=454] at room temperature. The mixture is stirred at 50° C. for 22 hours. The solvent is evaporated in the rotary evaporator to obtain a transparent oil. It is verified by ¹H-NMR that there are no residual acrylic double bonds left. The product is then dispersed in ethanol to give a dispersion with 45.2 wt. % solid content.

b) Preparation of the Hindered Amine Light Stabilizer and Polyethyleneglycol Modified Silica Nanoparticles

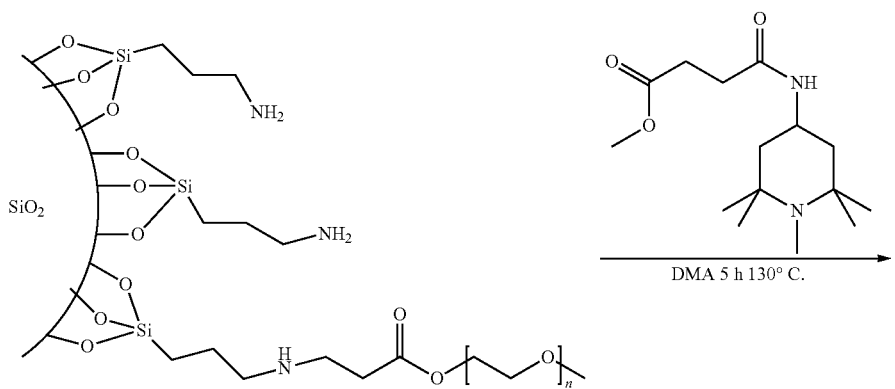

13.3 g of a 45.2% suspension of 1:1 3-aminopropylsilane/ MPEG-aminopropylsilane modified silica nanoparticles in ethanol as described above under a) are mixed with 30 g of dimethylacetamide (DMA), homogenized and the ethanol is removed with the rotary evaporator at a temperature of 45° C. (70 hPa).

This solution is added within 5 seconds under stirring to a mixture consisting of 1 g of the hindered amine light stabilizer (succinic acid methylester 4-amido-(2,2,6,6)-tetramethyl-1-methyl-piperidine; see the formula given in the above reaction scheme) and 60 mg of dibutyltinoxide dissolved in 20 g of dimethylacetamide (DMA). The yellowish reaction mixture is stirred and heated to a temperature of 130° C. for 5 hours whereby methanol is distilled off. Thereafter, the mixture is cooled to 50° C., combined with 140 g of tetrahydrofuran (THF) and 140 g of n-hexane and stirred for additional 18 hours. The suspension is centrifugated (4500 rpm), the isolated product re-dispersed in 160 g of xylene, washed and centrifugated twice. The obtained white gel is separated and dispersed in xylene.

Thermogravimetric analysis (TGA; heating rate: 10° C./min from 25° C. to 800° C.): Weight loss: 33.9%, corresponding to the organic material.

Elemental analysis: found: C, 21.72%; H, 3.92%; N, 5.25%.

TEM: Average diameter d=~80 nm (visible core).

The IR shows a band at 1555 and 1642 cm$^{-1}$ corresponding to the amide-bond.

The described dispersion is finally reacted with poly(ethyleneglycol)methyl ether acrylate [MPEG(8)acrylate, CAS 32171-39-4, Aldrich, MW=454] at 50° C. for 22 hours. The suspension is centrifugated (4500 rpm), the isolated product re-dispersed in ethanol, washed and centrifugated twice. The solvent is evaporated in the rotary evaporator to obtain a transparent oil. It is verified by $^1$H-NMR that there are no residual acrylic double bonds left.

To convert residual amino groups, reactions with different acrylates or anhydrides as acetic acid anhydride etc., are possible.

EXAMPLE 31

Preparation of Hindered Amine Light Stabilizer, UV-Absorber and Polyethyleneglycol Modified Silica Nanoparticles

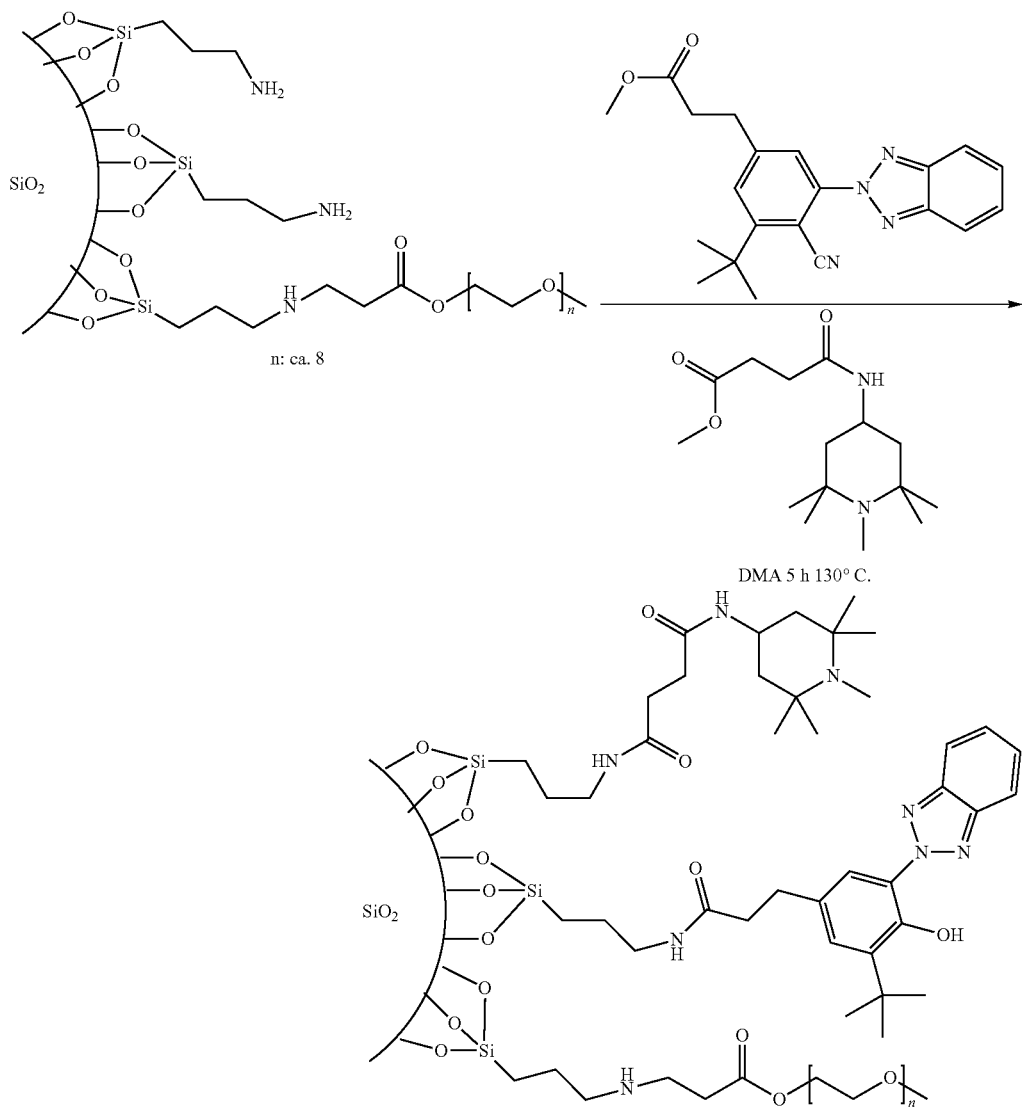

13.3 g of a 45.2% suspension of 1:1 3-aminopropylsilane/ MPEG-aminopropylsilane modified silica nanoparticle in ethanol as described above are mixed with 30 g of dimethylacetamide (DMA), homogenized and the ethanol is removed with the rotary evaporator at a temperature of 45° C. (75 hPa). This solution is added within 5 seconds under stirring to a mixture consisting of 1 g of the hindered amine light stabilizer (succinic add methylester 4-amido-(2,2,6,6)tetramethyl-1-methyl-piperidine; see the formula given in the above reaction scheme), 1 g of the benztriazole UV-absorber (see the formula given in the above reaction scheme) and 120 mg of dibutyltinoxide dissolved in 20 g of dimethylacetamide (DMA). The yellowish reaction mixture is stirred and heated to a temperature of 130° C. for 5 hours whereby methanol is distilled off. Thereafter, the mixture is cooled to 50° C., combined with 200 g of tetrahydrofuran (THF) and 200 g of n-hexane and stirred for additional 16 hours. The suspension is centrifugated (4500 rpm), the isolated product re-dispersed in 160 g of xylene, washed and centrifugated twice. The obtained gel is separated and dispersed in xylene.

Elemental analysis: found: C: 23.37%; H, 4.11%; N, 5.58%.

TEM: Average diameter d=~50 nm (visible core).

The described dispersion is finally reacted with poly(ethyleneglycol)methyl ether acrylate [MPEG(8)acrylate, CAS 32171-39-4, Aldrich, MW=454] at 50° C. for 22 hours. The suspension is centrifugated (4500 rpm), the isolated product re-dispersed in ethanol, washed and centrifugated twice. The solvent is evaporated in the rotary evaporator to obtain a transparent oil. It is verified by $^1$H-NMR that there are no residual acrylic double bonds left.

To convert residual amino groups, reactions with different acrylates or anhydrides as acetic acid anhydride etc., are possible.

EXAMPLE 32

Scratch Resistance of Polyurethane Coatings a) Preparation of the Polyol Component 54.8 g of Macrynal SM 510n (60% supply form from Solutia), 11.5 g of butylglycol acetate, 4.70 g of Solvesso 100 (obtained from Exxon), 5.68 g of Methyl isobutyl ketone, 0.07 g of zinc octoate and 0.15 g of BYK 300 (Byk-Chemie, Germany, anti-foaming agent) are mixed to give 76.9 of the polyol component.

b) Scratch Resistance of Polyurethane Coatings

A specific amount (see Table 1) of surface functionalized silica nanoparticle dispersions as prepared according to Examples 1-12 are incorporated into 7.7 g of the polyol component [Example 32a]. The amount of each silica nanoparticle dispersion is calculated to be 5 wt.-% SiO$_2$ of the final clear coat formulation. These formulations are treated with 2.8 g of Desmodur N 75® (Isocyanate from Bayer). The resulting clear coat formulation (solids content 50%) is subsequently applied as transparent topcoat at a dry film thickness of 40 µm onto steel panels (10 cm×30 cm) precoated with a black basecoat. After application, the clear coat is cured at 120° C. for 45 minutes.

The scratch resistance of the coated panels is measured using the following method: The 20° gloss of the panels is measured 48 hours after curing (DIN 67 530). The panels are subsequently exposed to scratching by an Amtec Kistler apparatus according to DIN concept 55668 for the number of cycles as indicated in Table 1. The 20° gloss is measured again on the scratched area of each test panel. The results are summarized in Table 1.

TABLE 1

| Example | Sample | wt.-% silica | Initial gloss | gloss after 10 cycles | gloss after 20 cycles |
|---|---|---|---|---|---|
| 32a[a] | — | — | 84 | 76 | 71 |
| 32b[b] | Example 2 | 5 | 84 | 78 | 75 |
| 32c[b] | Example 4 | 5 | 85 | 81 | 74 |
| 32d[b] | Example 7 | 5 | 87 | 78 | 74 |
| 32e[b] | Example 13 | 5 | 86 | 80 | 78 |
| 32f[b] | Example 15 | 5 | 86 | 77 | 76 |
| 32g[b] | Example 19 | 5 | 86 | 77 | 73 |

[a]Comparison Example.
[b]Example according to the invention.

EXAMPLE 33

Preparation of a Scratch Resistant Coating

The following formulation is prepared:

| | Wt % |
|---|---|
| Ebecryl 604 (75% Epoxyacrylate in HDDA; Cytec) | 89 |
| Sartomer SR 344 (Polyethylenglykol 400 Diacrylat; Cray Valley) | 10 |
| Ebecryl 350 (Silikondiacrylat; Cytec) | 1 |

20 g of the above formulation is mixed with 18 g of the dispersion obtained according to Example 14 (comprising the corresponding surface functionalized silica nanoparticle). The resulting homogenized formulation is applied to a white-based chipboard by a 150 µm slit coater. The panel with the applied coating is placed in an oven at 40° C. for 10 minutes to evaporate the solvent, which has been incorporated through the nano particle dispersion. The coatings are cured with two 80 W/cm mercury medium pressure lamps at a belt speed of 5 m/min using a PPG equipment from AETEC. A hard and scratch resistant coating is obtained.

What is claimed is:
1. A functionalized nanoparticle comprising on a surface covalently bound radical of the formula (I) and a covalently bound radical of formula (II):

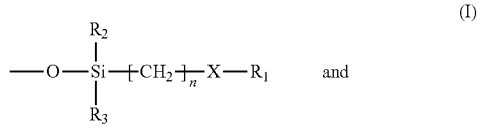

and

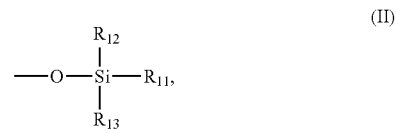

wherein the functionalized nanoparticle is a SiO$_2$ nanoparticle;

X is oxygen; sulfur; or

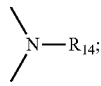

R$_1$ is a photoinitiator having as formula selected from the group consisting of

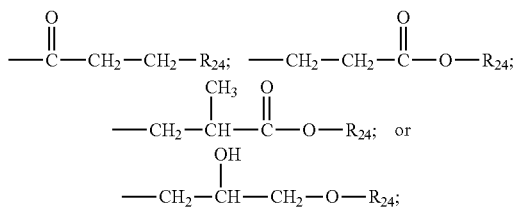

R$_2$ and R$_3$ are each independently hydrogen; C$_1$-C$_{25}$ alkyl; C$_3$-C$_{25}$alkyl, which is interrupted by oxygen or sulfur; C$_2$-C$_{24}$alkenyl; phenyl; C$_7$-C$_9$-phenylalkyl; —OR$_5$;

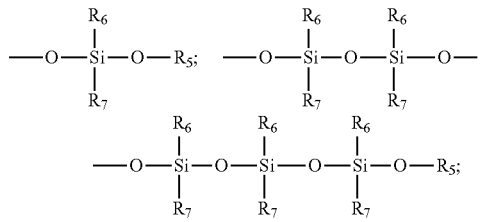

R$_4$ is hydrogen; C$_1$-C$_{25}$alkyl; or C$_3$-C$_{25}$alkyl, which is interrupted by oxygen or sulfur;

R$_5$ is hydrogen; C$_1$-C$_{25}$alkyl; which is interrupted by oxygen or sulfur; C$_2$-C$_{24}$alkenyl; phenyl; C$_7$-C$_9$phenylalkyl;

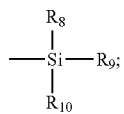

or the nanoparticle surface,

R$_6$ and R$_7$ are each independently hydrogen; C$_1$-C$_{25}$alkyl; C$_3$-C$_{25}$alkyl, which is interrupted by oxygen or sulfur; C$_2$ phenyl; C$_7$-C$_9$-phenylalkyl; or —OR$_5$;

R$_8$, R$_9$ and R$_{10}$ are each independently hydrogen; C$_1$-C$_{25}$alkyl; C$_3$-C$_{25}$alkyl, which is interrupted by oxygen or sulfur; C$_2$-C$_{24}$alkenyl; phenyl; or C$_7$-C$_9$phenylalkyl;

R$_{11}$ is C$_1$-C$_{25}$alkyl; C$_3$-C$_{25}$alkyl, which is interrupted by oxygen, sulfur or

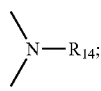

amino-, mercapto-, or hydroxyl substituted C$_2$-C$_{24}$alkyl; amino-, mercapto-, or hydroxyl substituted C$_2$-C$_{24}$alkyl, which is interrupted by oxygen, sulfur, or

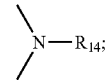

C$_2$-C$_{24}$alkenyl; C$_5$-C$_{12}$cycloalkyl; C$_5$-C$_2$cycloalkenyl; a polymerizable group; or a polymer;

R$_{12}$ and R$_{13}$ are each independently hydrogen; C$_1$-C$_{25}$alkyl; C$_3$-C$_{25}$alkyl, which is interrupted by oxygen or sulfur; C$_2$-C$_{24}$alkenyl; phenyl; C$_7$-C$_9$-phenylalkyl; —OR$_{15}$;

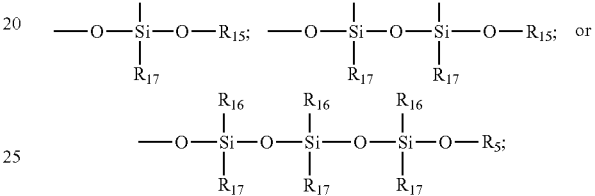

R$_{14}$ is hydrogen; C$_1$-C$_{25}$alkyl; or C$_3$-C$_{25}$alkyl, which is interrupted by oxygen or sulfur;

R$_{15}$ is hydrogen; C$_1$-C$_{25}$alkyl; C$_3$-C$_{75}$alkyl, which is interrupted by oxygen or sulfur;

C$_2$-C$_{24}$alkenyl; phenyl; C$_7$-C$_9$-phenylalkyl;

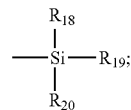

or the nanoparticle surface,

R$_{16}$ and R$_{17}$ are each independently hydrogen; C$_1$-C$_{25}$alkyl; C$_3$-C$_{25}$alkyl, which is interrupted by oxygen or sulfur; C$_2$-C$_{24}$alkenyl; phenyl; C$_7$-C$_9$-phenylalkyl; —OR$_{15}$, R$_{18}$, R$_{19}$ and R$_{20}$ are each independently hydrogen; C$_1$-C$_{25}$alkyl; C$_3$-C$_{25}$alkyl, which is interrupted by oxygen or sulfur; C$_2$-C$_{24}$alkenyl; phenyl; or C$_7$-C$_9$phenylalkyl,

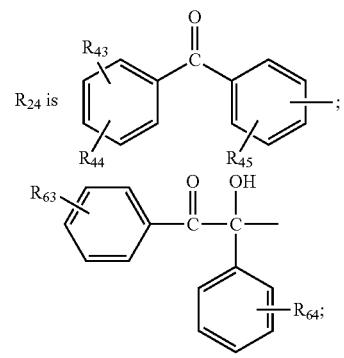

-continued

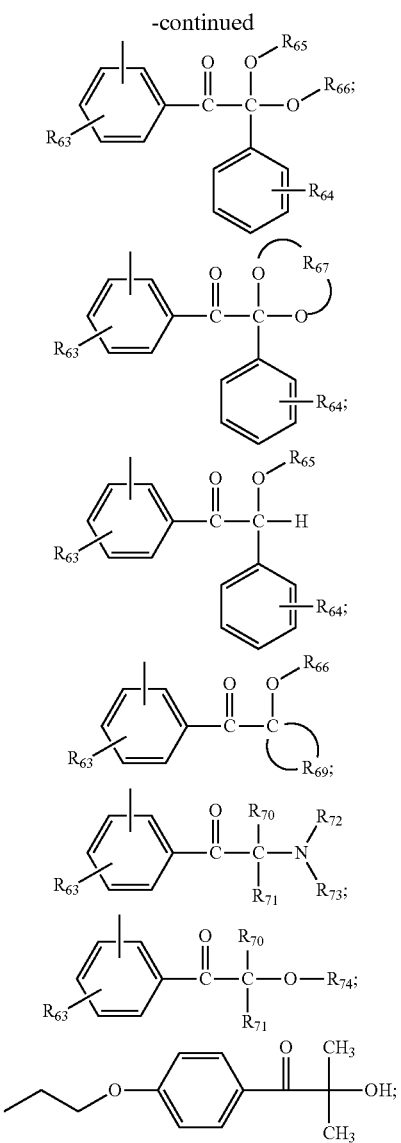

$R_{43}$ and $R_{44}$ are each independently hydrogen; $C_1$-$C_{18}$alkoxy; or di($C_1$-$C_4$alkyl)amino;
$R_{45}$ is hydrogen; $C_1$-$C_{18}$alkyl; or $C_1$-$C_{18}$alkoxy;
$R_{63}$ and $R_{64}$ are each independently hydrogen; $C_1$-$C_{18}$alkoxy; $C_1$-$C_4$alkylthio; morpholinyl; or $C_7$-$C_9$phenylalkyl of phenyl;
$R_{65}$ and $R_{66}$ are each independently $C_1$-$C_{18}$alkyl;
$R_{67}$ is $C_2$-$C_4$alkylene;
$R_{68}$ is hydrogen or $C_1$-$C_{18}$alkyl;
$R_{69}$ is $C_3$-$C_7$alkylene;
$R_{70}$ and $R_{71}$ are each independently $C_1$-$C_8$alkyl or $C_7$-$C_9$-phenylalkyl;
$R_{72}$ and $R_{73}$ are each independently $C_1$-$C_8$alkyl; or $R_{72}$ and $R_{73}$ are together —$CH_2CH_2$—O—$CH_2CH_2$— thus forming with the nitrogen atom to which they are attached a morpholinyl ring;
$R_{74}$ is hydrogen; $C_1$-$C_{18}$alkyl; or $C_7$-$C_9$-phenylalkyl; and
n is 1, 2, 3, 4, 5, 6, 7 or 8.

2. The functionalized nanoparticle according to claim 1, wherein n is 3.

3. The functionalized nanoparticle according to claim 1, wherein $R_4$ is hydrogen or $C_1$-$C_4$alkyl.

4. The functionalized nanoparticle according to claim 1, wherein
$R_{11}$ is $C_1$-$C_{18}$alkyl; $C_3$-$C_{18}$alkyl, which is interrupted by oxygen or sulfur; or 3-aminopropyl.

5. The functionalized nanoparticle according to claim 1, wherein the functionalized nanoparticle has a spherical shape.

6. The functionalized nanoparticle according to claim 1, wherein the functionalized nanoparticle has a particle size of 10 to 1000 nm.

7. A composition comprising:
a component (a), which is an organic material subject to oxidative, thermal, or light induced degradation, and
a component (b), which is at least one functionalized nanoparticle according to claim 1,
wherein the composition is a coating composition and the component (a) is an organic film-forming binder.

8. The composition according to claim 7, wherein the component (a) is a synthetic polymer.

9. The composition according to claim 7, wherein the component (b) is present in an amount from 0.01 to 80%, based on a weight of the component (a).

10. The composition according to claim 7, wherein additional additives are present besides the components (a) and (b).

11. A process for photoinitiating in-situ polymerization or hardening of a pre-polymeric nanocomposite or sol to a nanocomposite material, which comprises incorporating therein, or applying thereto, at least one functionalized nanoparticle according to claim 1.

12. A functionalized nanoparticle comprising on a surface covalently bound radical of the formula (I) and a covalently bound radical of formula (II):

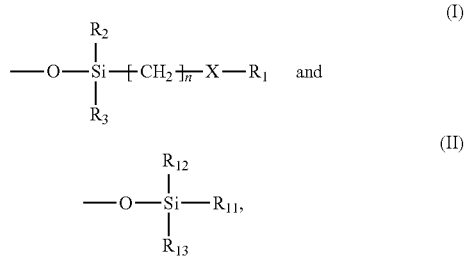

wherein the functionalized nanoparticle is a $SiO_2$ nanoparticle;
X is oxygen; sulfur; or

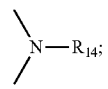

$R_1$ is a photoinitiator having as formula selected from the group consisting of

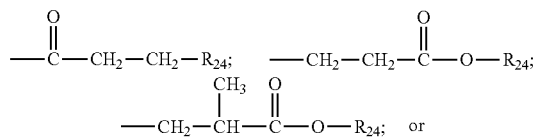

-continued $$-CH_2-\underset{\underset{OH}{|}}{CH}-CH_2-O-R_{24};$$

$R_2$ and $R_3$ are each independently hydrogen; $C_1$-$C_{25}$alkyl; $C_3$-$C_{25}$alkyl, which is interrupted by oxygen or sulfur; $C_2$-$C_{24}$alkenyl; phenyl; $C_7$-$C_9$-phenylalkyl; —$OR_5$;

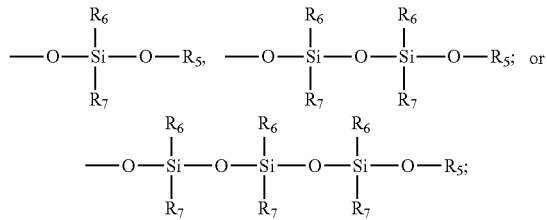

$R_4$ is hydrogen; $C_1$-$C_{25}$alkyl; or $C_3$-$C_{25}$alkyl, which is interrupted by oxygen or sulfur;

$R_5$ is hydrogen; $C_1$-$C_{25}$alkyl; $C_3$-$C_{25}$alkyl, which is interrupted by oxygen or sulfur;

$C_2$-$C_{24}$alkenyl; phenyl; $C_7$-$C_9$phenylalkyl;

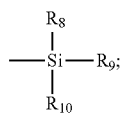

or the nanoparticle surface, $R_6$ and $R_7$ are each independently hydrogen; $C_1$-$C_{25}$alkyl; $C_3$-$C_{25}$alkyl, which is interrupted by oxygen or sulfur; $C_2$-$C_{24}$alkenyl; phenyl; $C_7$-$C_9$-phenylalkyl; or —$OR_5$;

$R_8$, $R_9$ and $R_{10}$ are each independently hydrogen; $C_1$-$C_{25}$alkyl; $C_3$-$C_{25}$alkyl, which is interrupted by oxygen or sulfur; $C_2$-$C_{24}$alkenyl; phenyl; or $C_7$-$C_9$phenylalkyl;

$R_{11}$ is $C_1$-$C_{25}$alkyl; $C_3$-$C_{25}$alkyl, which is interrupted by oxygen, sulfur or

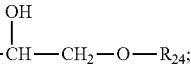

amino-, mercapto-, or hydroxyl substituted $C_2$-$C_{24}$alkyl; amino-, mercapto-, or hydroxyl substituted $C_2$-$C_{24}$alkyl, which is interrupted by oxygen, sulfur, or

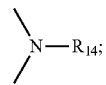

$C_2$-$C_{24}$alkenyl; $C_5$-$C_{12}$cycloalkyl; $C_5$-$C_{12}$cycloalkenyl; a polymerizable group; or a polymer;

$R_{12}$ and $R_{13}$ are each independently hydrogen; $C_1$-$C_{25}$alkyl; $C_3$-$C_{25}$alkyl, which is interrupted by oxygen or sulfur; $C_2$-$C_{24}$alkenyl; phenyl; $C_7$-$C_9$-phenylalkyl; —$OR_{15}$;

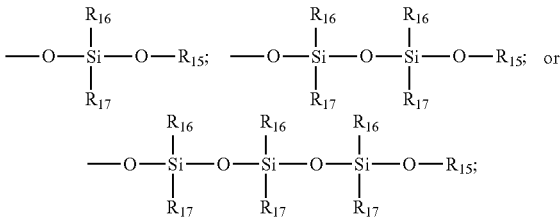

$R_{14}$ is hydrogen; $C_1$-$C_{25}$alkyl; or $C_3$-$C_{25}$alkyl, which is interrupted by oxygen or sulfur;

$R_{15}$ is hydrogen; $C_1$-$C_{25}$alkyl; $C_3$-$C_{25}$alkyl, which is interrupted by oxygen or sulfur;

$C_2$-$C_{24}$alkenyl; phenyl; $C_7$-$C_9$-phenylalkyl;

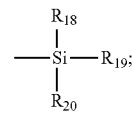

or the nanoparticle surface, $R_{16}$ and $R_{17}$ are each independently hydrogen; $C_1$-$C_{25}$alkyl; $C_3$-$C_{15}$alkyl, which is interrupted by oxygen or sulfur; $C_2$-$C_{24}$alkenyl; phenyl; $C_7$-$C_9$-phenylalkyl; or —$OR_{15}$, $R_{18}$, $R_{19}$ and $R_{20}$ are each independently hydrogen; $C_1$-$C_{25}$alkyl; $C_3$-$C_{25}$alkyl, which is interrupted by oxygen or sulfur; $C_2$-$C_{24}$alkenyl; phenyl; or $C_7$-$C_9$phenylalkyl, $R_{24}$ is

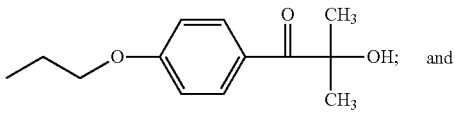 [SMILES: CCCOc1ccc(C(=O)C(C)(C)O)cc1 ; "and"]

and n is 1, 2, 3, 4, 5, 6, 7 or 8.

* * * * *

UNITED STATES PATENT AND TRADEMARK OFFICE
CERTIFICATE OF CORRECTION

PATENT NO. : 8,877,954 B2
APPLICATION NO. : 13/930848
DATED : November 4, 2014
INVENTOR(S) : Thomas Giesenberg et al.

It is certified that error appears in the above-identified patent and that said Letters Patent is hereby corrected as shown below:

In the Claims

At column 83, claim 1, line number 41, "$R_5$ is hydrogen; $C_1$-$C_{25}$alkyl; which is interrupted by oxygen or sulfur" should read --$R_5$ is hydrogen; $C_1$-$C_{25}$alkyl; $C_3$-$C_{25}$alkyl, which is interrupted by oxygen or sulfur--

At column 83, claim 1, line number 53, "which is interrupted by oxygen or sulfur; $C_2$ phenyl;" should read --which is interrupted by oxygen or sulfur; $C_2$-$C_{24}$alkenyl; phenyl;--

At column 84, claim 1, line number 11, "$C_5$-$C_2$cycloalkenyl; a polymerizable group;" should read --$C_5$-$C_{12}$cycloalkenyl; a polymerizable group;--

At column 84, claim 1, line number 31, "$R_{15}$ is hydrogen; $C_1$-$C_{25}$alkyl; $C_3$-$C_{75}$alkyl, which" should read --$R_{15}$ is hydrogen; $C_1$-$C_{25}$alkyl; $C_3$-$C_{25}$alkyl, which--

At column 85, claim 1, line number 35,

" 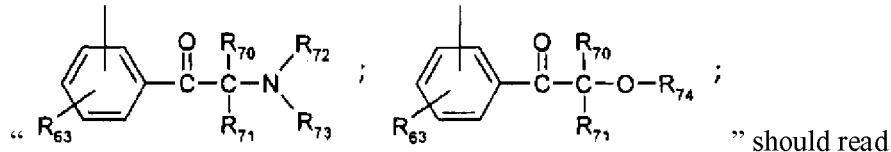 " should read

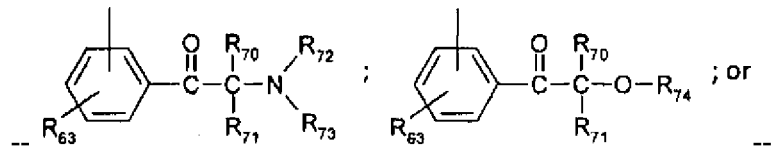 --

At column 85, claim 1, line 46, "$R_{43}$ and $R_{44}$ are each independently hydrogen; $C_1$-$C_{18}$alkoxy;" should read --$R_{43}$ and $R_{44}$ are each independently hydrogen; $C_1$-$C_{18}$alkyl; $C_1$-$C_{18}$alkoxy--

Signed and Sealed this
Ninth Day of June, 2015

Michelle K. Lee
*Director of the United States Patent and Trademark Office*

CERTIFICATE OF CORRECTION (continued)
U.S. Pat. No. 8,877,954 B2

At column 85, claim 1, line 49, "$R_{63}$ and $R_{64}$ are each independently hydrogen; $C_1$-$C_{18}$alkoxy;" should read --$R_{63}$ and $R_{64}$ are each independently hydrogen; $C_1$-$C_{18}$alkyl; $C_1$-$C_{18}$alkoxy;--

At column 85, claim 1, line 50, "morpholinyl; or $C_7$-$C_9$phenylalkyl of phenyl;" should read --morpholinyl; $C_7$-$C_9$phenylalkyl or phenyl--

At column 88, claim 12, line 38, "$C_1$-$C_{25}$alkyl; $C_3$-$C_{15}$alkyl, which is interrupted by oxygen or sulfur;" should read --$C_1$-$C_{25}$alkyl; $C_3$-$C_{25}$alkyl, which is interrupted by oxygen or sulfur;--